United States Patent
Ye

(12) United States Patent (10) Patent No.: US 7,196,847 B2
Ye (45) Date of Patent: Mar. 27, 2007

(54) DEVICE AND METHOD FOR AN OPTICAL TUNABLE POLARIZATION INTERFACE FILTER

(76) Inventor: Chun Ye, Rehjantie 4 as 3, FIN-87200 Kajaani (FI)

( * ) Notice: Subject to any disclaimer, the term of this patent is extended or adjusted under 35 U.S.C. 154(b) by 0 days.

(21) Appl. No.: 10/538,825

(22) PCT Filed: Dec. 19, 2003

(86) PCT No.: PCT/FI03/00977

§ 371 (c)(1),
(2), (4) Date: Jun. 13, 2005

(87) PCT Pub. No.: WO2004/057413

PCT Pub. Date: Jul. 8, 2004

(65) Prior Publication Data

US 2006/0056029 A1 Mar. 16, 2006

(30) Foreign Application Priority Data

Dec. 20, 2002 (FI) ................................. 20022249

(51) Int. Cl.
*G02B 5/30* (2006.01)

(52) U.S. Cl. .................. 359/501; 359/498; 359/497

(58) Field of Classification Search ................ 359/501, 359/498, 499, 497
See application file for complete search history.

(56) References Cited

U.S. PATENT DOCUMENTS 4,129,357 A * 12/1978 Frosch et al. ............... 359/497
2001/0010593 A1 * 8/2001 Terahara et al. ............ 359/484
2004/0001255 A1 * 1/2004 Fratello ....................... 359/484

OTHER PUBLICATIONS

Chun Ye, "Wavelength-tunable spectral filters based on the optical rotatory dispersion effect", Aug. 1, 2003, Applied Optics, vol. 42, No. 22, pp. 4505-4513.*
Chun Ye, "Construction of an optical rotator using quarter-wave plates and an optical retarder", Oct. 1995, Optical Engineering, vol. 34, No. 10, pp. 3031-3035.*

* cited by examiner

*Primary Examiner*—Arnel Lavarias
*Assistant Examiner*—Derek S. Chapel
(74) *Attorney, Agent, or Firm*—Rolf Fasth; Fasth Law Offices

(57) ABSTRACT

The tuner has constituent component for constructing a tunable or switchable spectral filter, including single and multiple stage filters and fitters without intermediate polarizer, over a wavelength range. It has elements arranged in cascade along a light beam axis including a dispersive polarization rotator that has its rotation angle $\rho(\lambda)$ varying as a function of light wavelength lambda over the wavelength range.

65 Claims, 18 Drawing Sheets

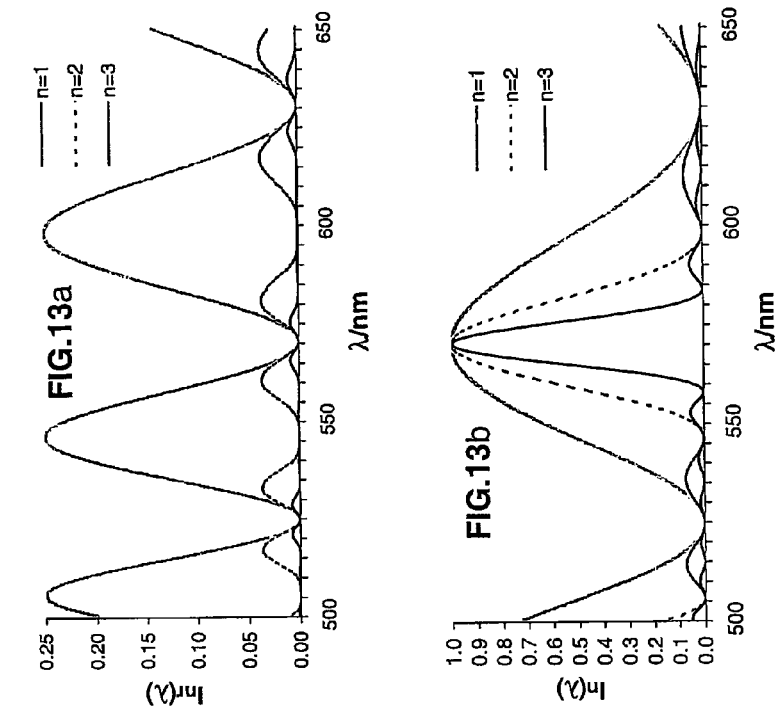
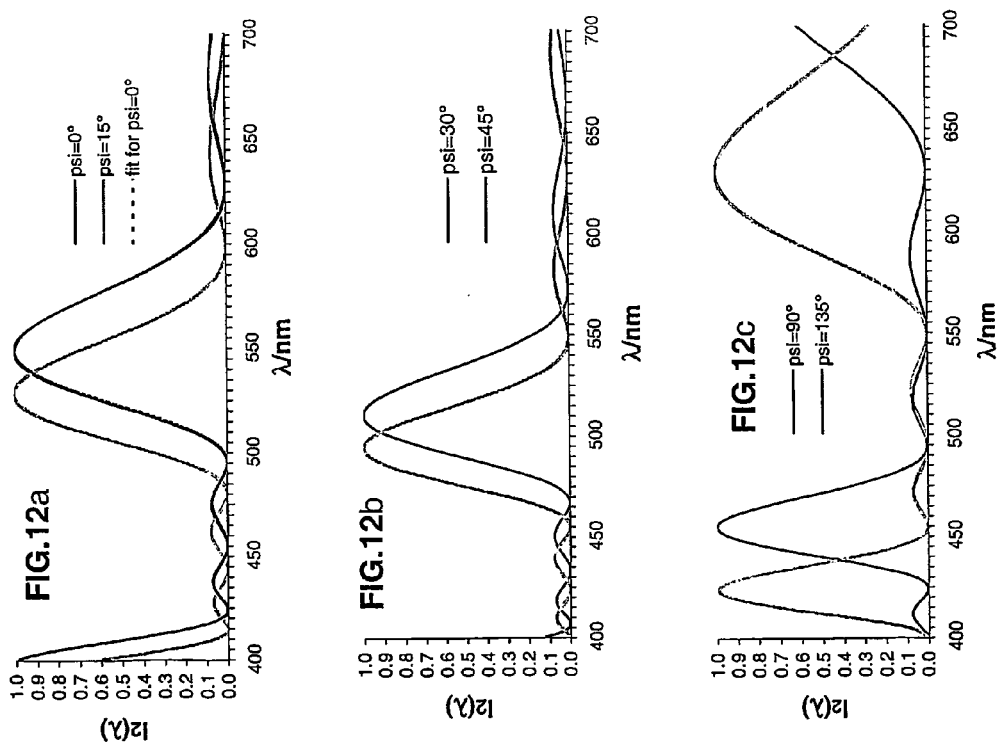

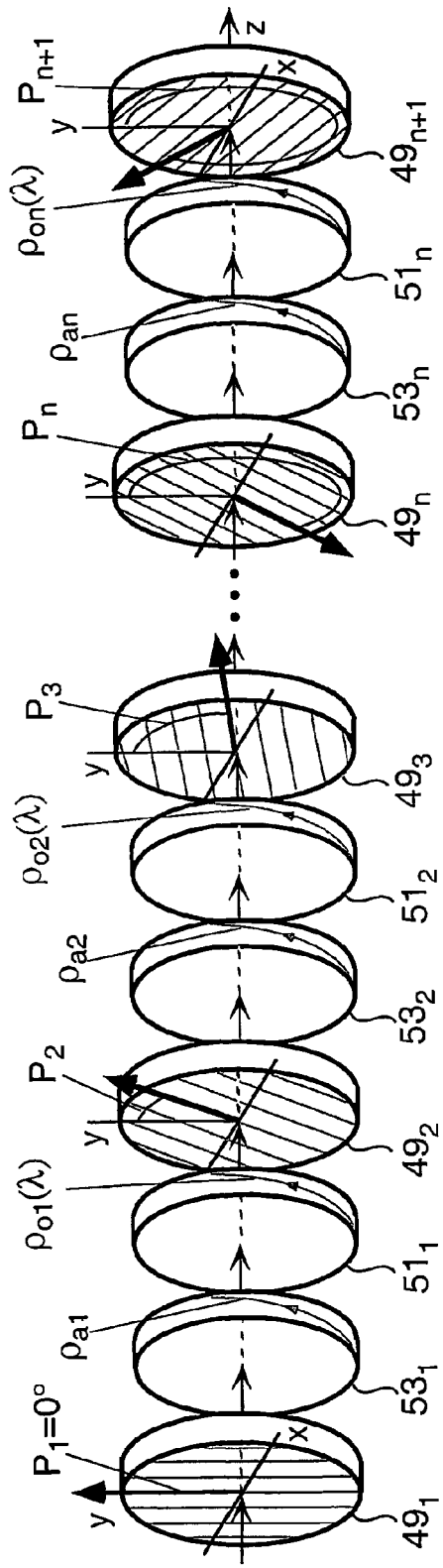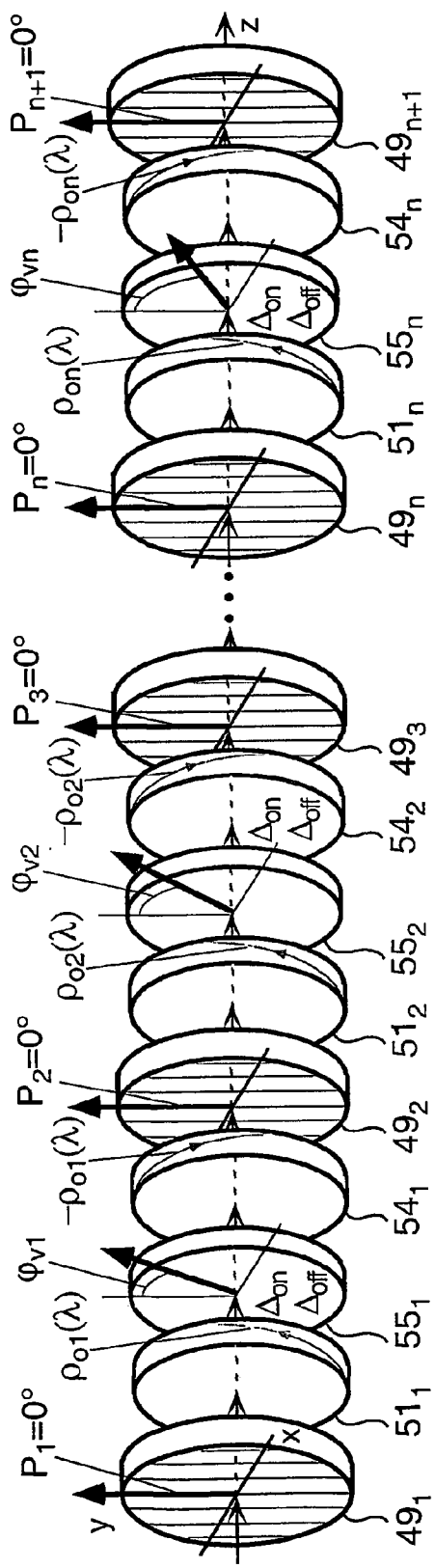
FIG. 16
FIG. 17

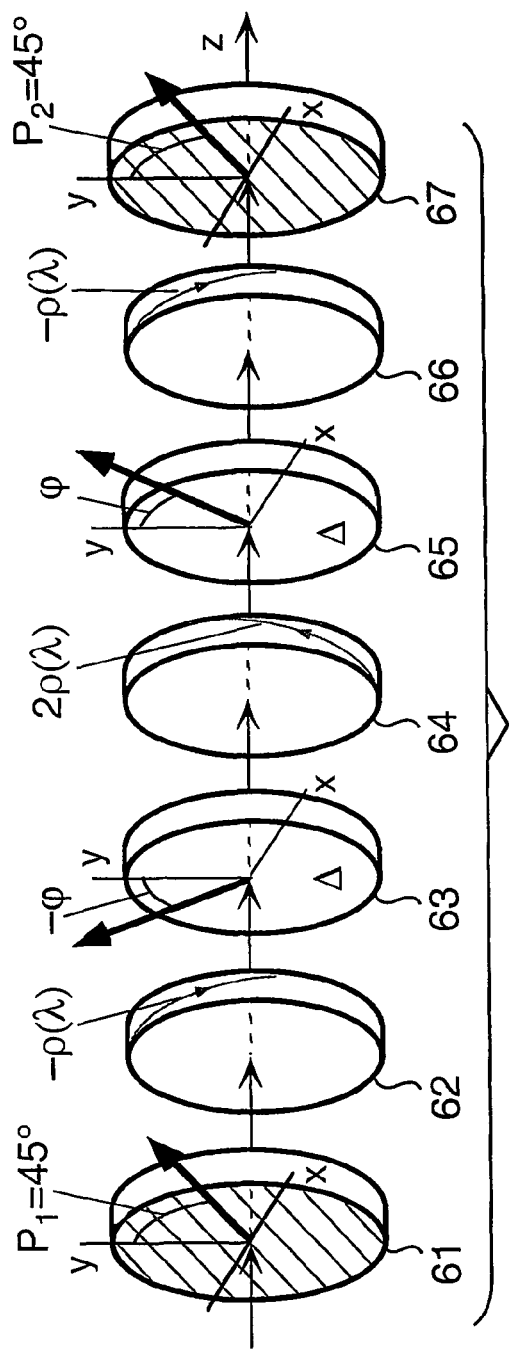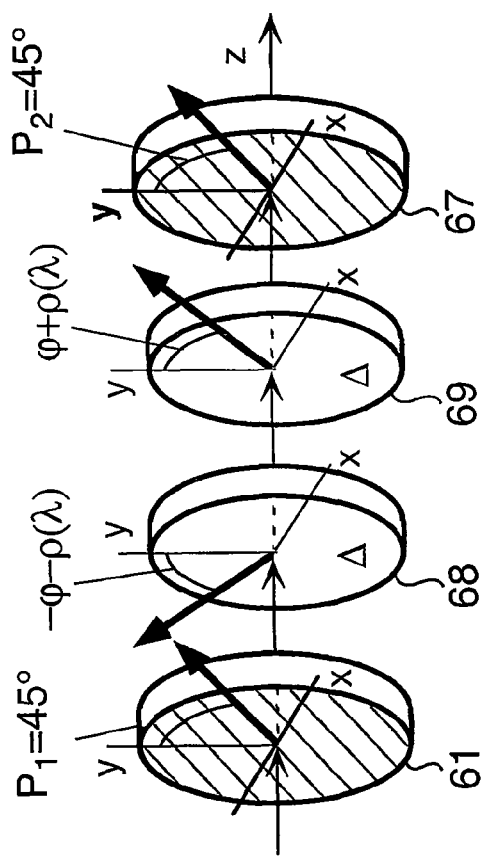
FIG. 18

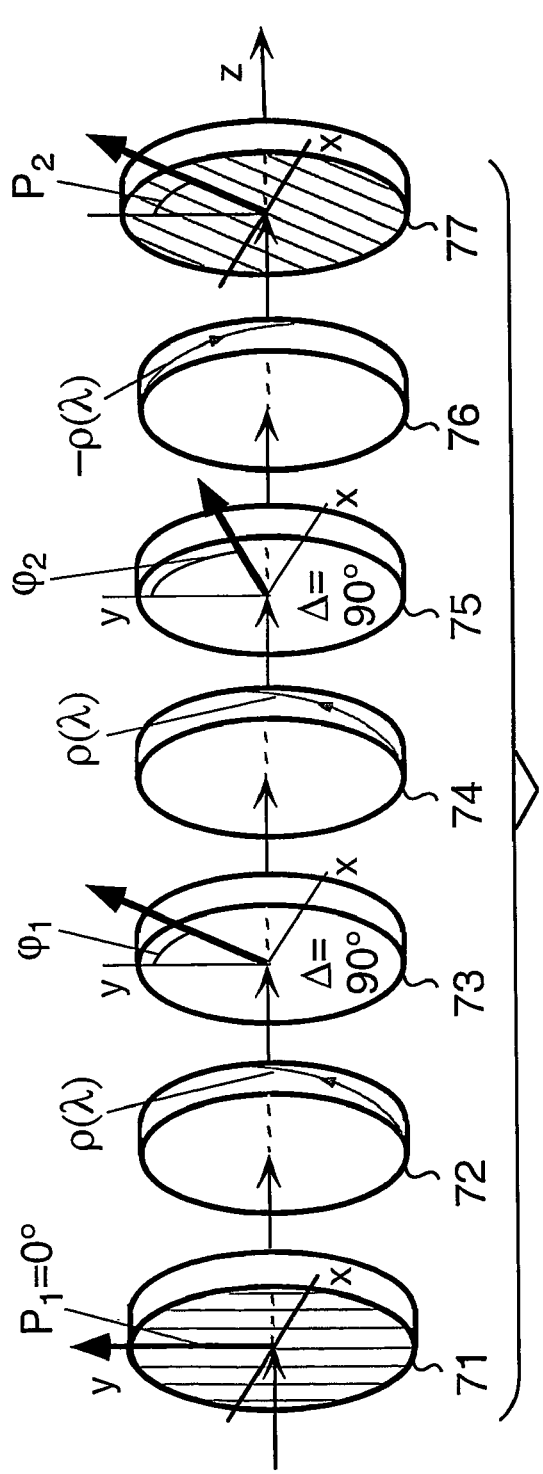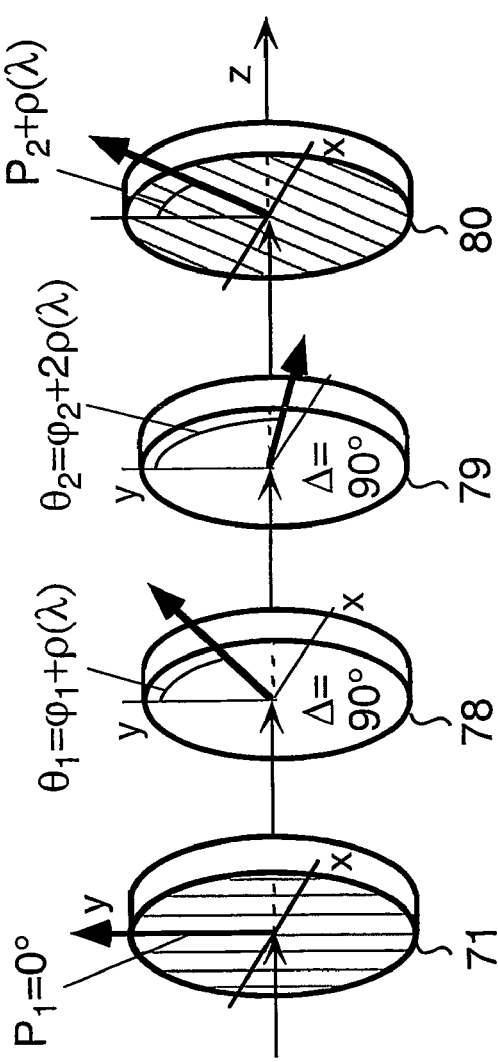
FIG. 22

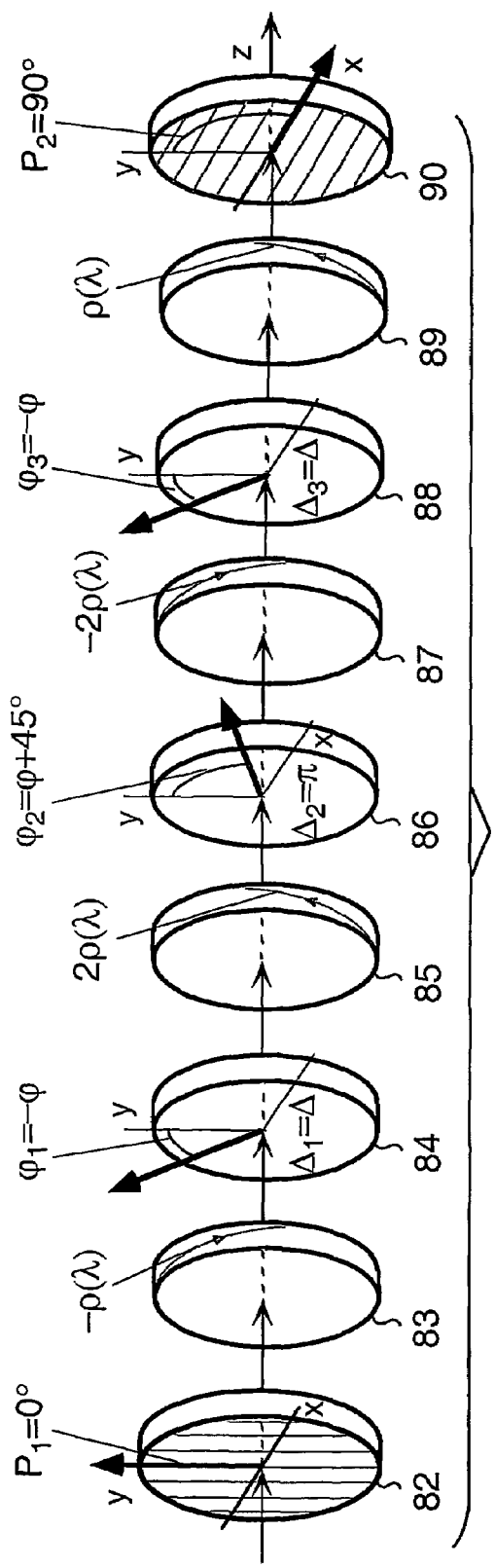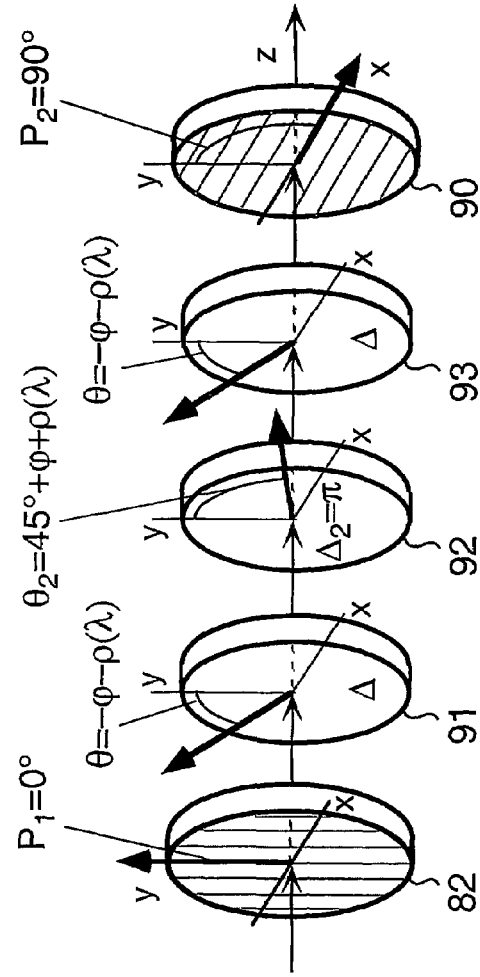
FIG. 25

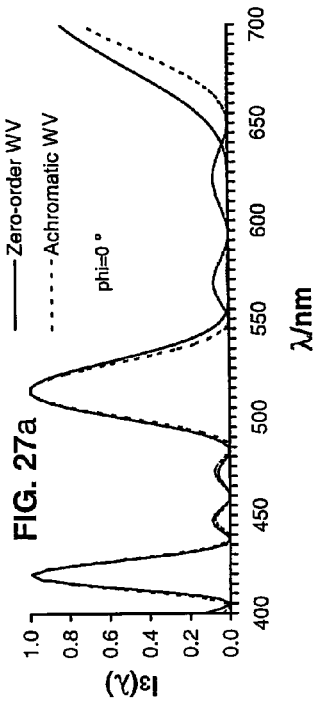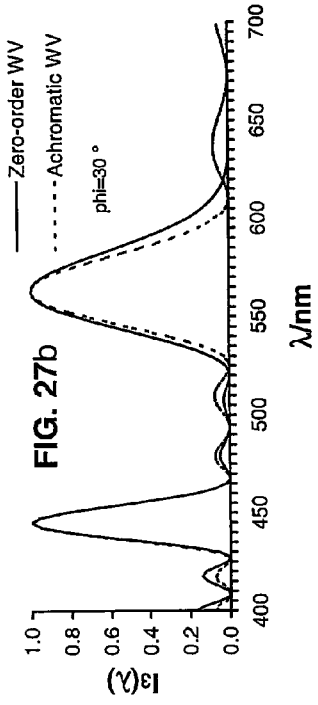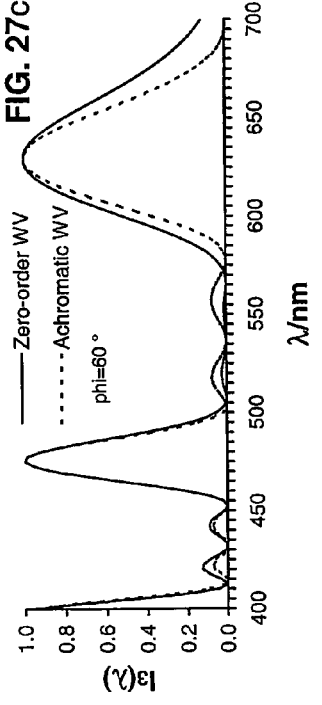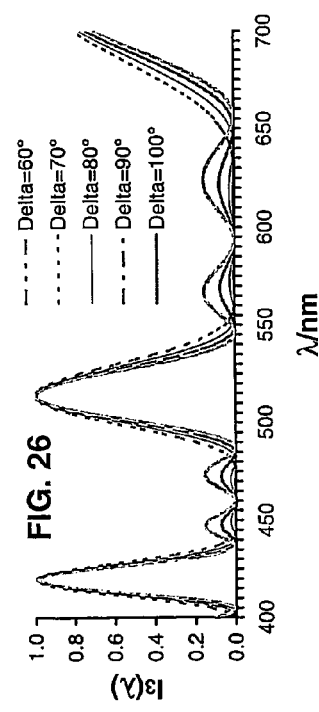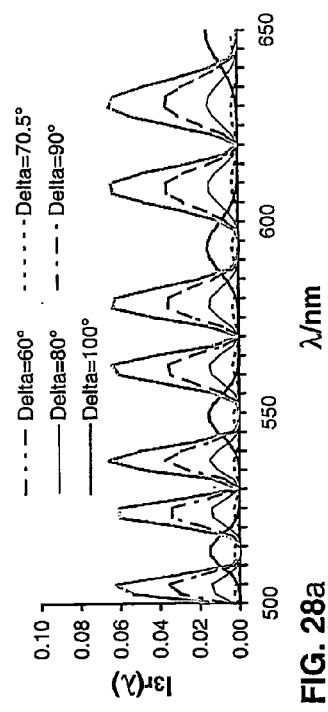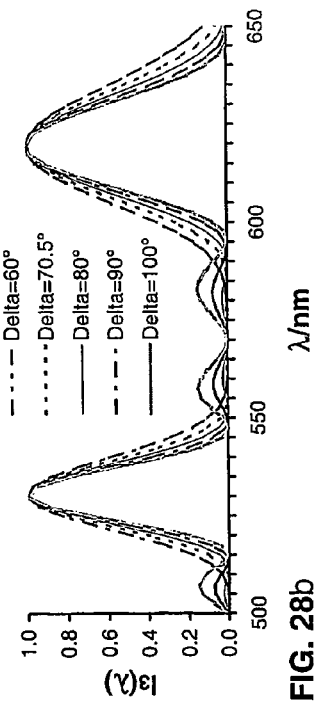

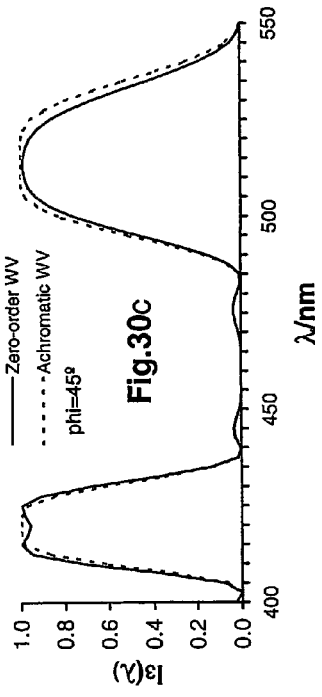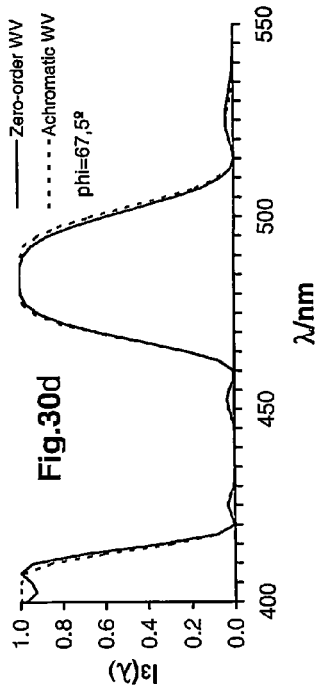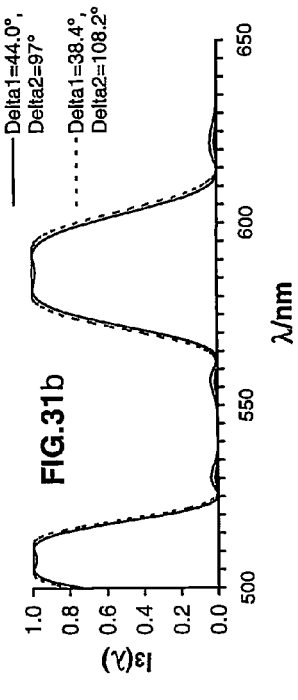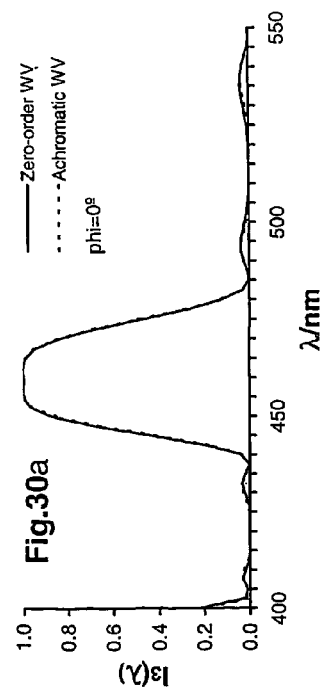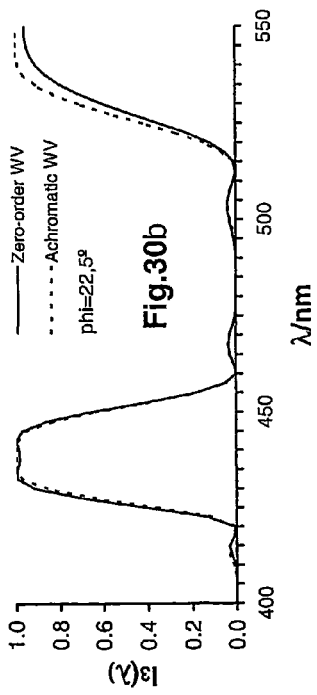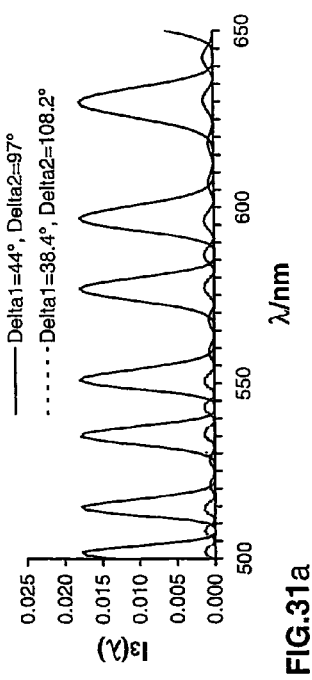

DEVICE AND METHOD FOR AN OPTICAL TUNABLE POLARIZATION INTERFACE FILTER

PRIOR APPLICATIONS

This is a US national phase patent application that claims priority from PCT/FI2003/000977, filed 19 Dec. 2003 that is based on Finnish Patent Application No. 20022249 filed 20 Dec. 2002.

FIELD OF THE INVENTION

This invention generally relates to wavelength-tunable optical polarization interference filters, more particularly, to a new concept for constructing tunable spectral filters and new spectral filters developed based on this concept.

BACKGROUND OF THE INVENTION

Polarization is the phenomenon, which is exhibited when a transverse wave is polarized. Light is a transverse electromagnetic wave that vibrates in a direction perpendicular to the direction of propagation. Ordinary light is unpolarized, consisting of a mixture of waves vibrating in all directions. In an unpolarized wave, the vibrations in a plane perpendicular to the ray appear to be oriented in all directions with equal probability. Light is said to be polarized if the direction of the vibrations is completely predicable and remains constant for some reason.

There are different ways for producing linearly polarized light, for example by using so called polarizers. A polarizer is a device from which the emergent beam is linearly polarized. The direction of vibration of the emergent linearly polarized light is a property of the polarizer and is referred as the polarizer's axis. Since most polarizers operate in transmission, a frequently met term is transmission axis. A polarizer is transparent only to incident light polarized in the direction of the polarizer's axis. Thus, the combination of two polarizers is opaque when the polarizers are oriented with their axes perpendicular to each other. If the second polarizer is rotated with the axis no longer perpendicular to that of the first one, the amount of light transmitted gradually increases until the two polarizers are parallel to each other.

The plane of a polarized light can also be rotated by a fixed angle when it passes through a medium or a device called optical rotator or Faraday rotator. The direction and the amount of the rotation (rotation angle) depend on the initial properties and thickness of the medium or device.

A retarder or waveplate is a device that resolves a light wave into two orthogonal linear polarization components along two particular orthogonal directions fixed in the retarder and produces a phase shift between them. The phase shift is a property of the retarder, referred as the retarder's retardation ($\Delta$) and the particular direction with respect to which retardation is produced is known as the reference axis of the retarder. The angle of the reference axis of a retarder in a system containing it is referred as the retarder's orientation angle ($\phi$). The most common retarders introduce phase shift or retardation of 90° and 180° and they are called quarter-wave and half-wave retarders. A normal birefringent retarder is a plane-parallel plate of birefringent material whose optic axis is parallel to faces of the plate.

Polarization interference filters or birefringent filters are based on the interference of polarized light. Such filters consist of birefringent plates and polarizers. The retardation $\Delta = \Delta(\lambda)$ of a birefringent plate is dispersive, i.e. depending on the wavelength $\lambda$ of light incident on it. The dispersion of the parameter retardation $\Delta(\lambda)$ forms the basis of a birefringent filter with the transmitted light intensity varying as a function of the wavelength $\lambda$. The initial birefringent filters are not tunable, having their wavelength selections of light fixed.

Their tuning methods are introduced below and further in more detail in the section FURTHER BACKGROUND.

The spectral transmission, or simply transmission, of a (spectral) filter is a property of the filter, defined as the light intensity transmitted by the filter varying as a function of the wavelength of incident light relative to the light intensity incident on the filter. The latter can be considered constant in most cases so that the spectral transmission or transmission of a filter is equivalent to the intensity transmitted by the filter as a function of light wavelength.

The polarization interference filter or birefringent filter is a kind of active filter with the transmission of the filter under control of the designer. The filter can be manufactured to have very high resolution and system performance. Another advantage is its superior image quality so that it is known as the image-quality filter and especially suitable to be used in imaging equipment. Further major advantages include possibly high acceptance angle and large clear aperture. The birefringent filter has proven an effective tool in astronomical research and it has unique value especially in solar physics. Due to its superior image quality the filter has been widely used in imaging equipment, such as microscopes and imaging spectrometers. The filter has also been used as tuning devices in monochromator and tunable laser. Some other important applications include optical telecommunication and radar, imaging and projection, color pattern analysis and display, remote sensing and space-based devices.

The birefringent filter was first invented by Lyot (Lyot, B. (1933) Comptes Rendus 197:1593). The basic Lyot filter (Yariv, A. and Yeh, P. (1984) *Optical Waves in Crystals*, Chapter 5, John Wiley and Sons, New York) consists of a set of birefringent crystal plates sandwiched by parallel polarizers. The thickness of each birefringent plate is twice that of its preceding one and all the plates are oriented at an azimuth angle of 45°. Another type of birefringent filter is Šolc filter (Šolc (1965), *J. Opt. Soc. Am.* 55:621). A Šolc type filter is an optical network comprising identical birefringent plates arranged in series between a pair of polarizers and oriented properly. A Lyot filter generally requires fewer birefringent plates than an equivalent Šolc filter. However, the Šolc filter uses no intermediate polarizer, therefore can provide higher transmission. The theory and art of the Lyot and Šolc filters as well as their tuning methods have been reviewed and/or discussed by Evans (Evans, John W. (1949) J. Opt. Soc. Am. 39:229) and Title and Rosenberg (Title, A. M. and Rosenberg, W. J. (1981) Opt. Eng. 20:815). Also of interest are articles of Gunning and Lotspeich et al (Gunning, W. J. (1981) Opt. Eng. 20:837; Lotspeich, J. F., Stephens, R. R. and Henderson, D. M. (1981) Opt. Eng. 20:830).

Birefringent plates used in a Lyot or Šolc type filter are parallel plates or sheets made by crystal materials such as quartz and calcite cut such that the optic axis is parallel to the plate surface, or by other birefringent materials. The crystal materials are suitable for applications requiring high resolution and/or low wave-front distortion. The other birefringent materials include, but not limited to, polymer materials, such as polyvinyl alcohol and polycarbonate, and liquid crystal polymer films. These materials are attractive, permitting filters of large clear aperture and/or low costs, with this enabling many potential applications of the filter. The initial Lyot or Šolc filter is not tunable. The usefulness of an optical spectral filter will be greatly increased if its wavelength-selection is tunable. Tuning a birefringent filter is to simultaneously change or shift the retardation of all the constituent birefringent plates of this filter. Conventionally there are three basic technologies for tuning birefringent filters, i.e. direct method, rotating-element method and electro-optic tuning. The direct method is to change the physical thickness of the tuned birefringent plate, for example, by using wedge-shaped retardation plates in pairs. Although it is simple, but it is not the most practical tuning method because a change in the optical path is undesirable for imaging systems and temperature control is needed.

The rotating-element method is to use achromatic retarders, usually birefringent achromatic waveplates. This is a very effective tuning method used in practice. A tunable birefringent filter using this method can be manufactured to reach very high resolution and system performance. According to the art (see below), generally three achromatic waveplates are required for tuning a single birefringent plate. In special cases, the number of the achromatic waveplates required can be reduced, but at least one achromatic quarter-wave plate is necessary. An achromatic waveplate usually used for this purpose is a compound component manufactured by combining two or more single birefringent plates. To tune a single element plate, thus it is normal to require several birefringent plates in average or even more so that an assembled tunable filter becomes a fairly complex optical-mechanical assembly although its initial wavelength-fixed structure could comprise only a few plates. Also for this reason, the manufacture costs of a tunable filter made by birefringent crystal material based on this method are very high and further enhancement of the resolution, system performance or transmission is seriously restricted. On the other hand, it is the high expense and complex structure of a tunable birefringent filter that prevents its many potential applications. Another liability for a filter using achromatic waveplate(s) is the restriction of the achromatic waveplate (s) on the spectral range of the filter. For such filter, usually it is the operating spectral range of the achromatic waveplate (s) that determines and seriously restricts the wavelength range of the filter. Broadband achromatic waveplates are very difficult and expensive to be made.

For the electro-optic tuning there is no moving part and the speed of tuning can be very high. Optical spectral filters that can be rapidly tuned are attractive especially in applications of signal processing, color display, space-based platforms, remote sensing and wavelength division multiplexing. Tunable birefringent filters can be constructed by using electro-optic crystal plates or modulators (see e.g., Gunning, W. J. (1981) Opt. Eng. 20:837; Lotspeich, J. F., Stephens, R. R. and Henderson, D. M. (1981) Opt. Eng. 20:830). There are many versions of the filter design and they are developed based on the basic Lyot or Šolc filter structures or in analog with the mechanical tuning methods. Tuning can be accomplished by electrically changing the birefringence of electro-optic birefringent plates or replacing a rotating achromatic waveplate with its electro-optic equivalent. The main disadvantage of the electro-optic tuning is small clear aperture and field-of-view. Another limitation is that the transmission of a filter of several stages can significantly be reduced by the electrodes for a longitudinal electric field or the voltages required for an aperture up to several centimeters becomes extremely high alternatively if a transverse electric field is used. In addition, the electro-optic tuning is very expensive.

As an alternative to electro-optic materials, liquid crystal (LC) cells or switches have been used for constructing switchable and tunable filters based on the Lyot or Šolc structures or the basic configurations of the mechanical tuning methods (see, e.g. Tarry, H. A. (1975) Elect. Lett. 18:47; Scheffer et al, U.S. Pat. No. 4,019,808; Kaye, W. I., U.S. Pat. No. 4,394,069; Johnson et al, U.S. Pat. Nos. 5,132,826 and 5,231,521; Miller, P. U.S. Pat. No. 5,689,317; Sharp et al, U.S. Pat. No. 6,091,462). There are various LC devices (refer e.g. Saleh, B. E. A. and Teich, M. C. "Fundamentals of photonics", John Wiley & Sons Inc, 1991; Clark, N. A. et al. (1983) Mol. Cryst. and Liq. Cryst. 94:213; and Anderson et al (1987) Appl. Phys. Left. 51:640). They include, for example, nematic and homeotropically aligned nematic LC cells, ferroelectric LC (FLC) cells, surface-stabilized ferroelectric LC (SSFLC) cells, smectic A* (SmA*) LC cells and distorted helix ferroelectric LC (DHF) cells, and twisted-nematic polarization rotators. While having drawbacks such as viewing angle and contrast ratio, the liquid crystal device has a few attractive features including compact size, low cost, large clear aperture and low power requirement so that it is particularly useful not only in display technology but also in many other applications.

As the prior art demonstrates, the existing methods for constructing tunable birefringent spectral filters require expensive and complex structure and/or they are restricted for their liabilities.

SUMMARY OF THE INVENTION

Normal optical rotators or Faraday rotators generally only useful for a single predetermined wavelength or over a very narrow spectral range and it exhibits dispersion effect with the rotation angle strongly depending on the wavelength of light. The dispersion for an optical rotator or a Faraday rotator is not desired in most cases because it rotates light by different angles depending on the wavelength of the light. The optical rotatory dispersion is well known and it is conventionally recognized as an undesirable effect in most applications of the optical rotator or Faraday rotator. Due to this reason, efforts are given to develop achromatic optical and Faraday rotators.

The present invention provides a completely new concept for constructing tunable polarization interference spectral filters, which is simpler, but more powerful than the existing methods. The new concept of the invention is developed based on the optical rotatory dispersion and it enables not only the construction of tunable birefringent spectral filters in a significantly simpler way than the art, but also the development of new-featured spectral filters.

An aspect of the invention is recognition of the value of the dispersion effect of the optical rotation in constructing and developing tunable spectral filters, which are initially tunable.

According to the new concept, the dispersion of a polarization rotation can be made use of to form the wavelength selection of light by its proper combination with an orientation-sensitive element such as polarizer or retarder. Unlike the optical retardation, the optical rotation is a parameter closely related to the orientation angle of a polarizing element. Due to this feature, a tunable filter in accordance with the invention is initially tunable and has simpler or much simpler structure than an equivalent one in the art. The filter has its basic transmission profile determined by the polarization rotator(s) used and its tunability can simply be achieved by rotating the filter's relevant constituent polarizing element(s) and/or changing the rotation angle(s) of the filter's polarization rotator(s) if possible. Furthermore, tunable and switchable spectral filters, including new-featured ones, can be developed, which are operated mechanically, electrically or electro-magnetically, or continuously or discretely, depending on the constituent elements selected.

This invention further provides tunable birefringent spectral filters developed based on the new concept, which either are completely new or have more compact arrangements than equivalents in the art. The filters of the invention use normal optical rotator(s) and/or Faraday rotator(s) or them as the key element(s) in combination with additional optical retarder(s) such as birefringent retarder(s) and equivalent LC cell(s), preferably achromatic or zero-order retarder(s), or LC polarization rotator(s). The spectral filters disclosed in this invention include single-stage and multiple-stage filters, including those requiring no achromatic retarder, and filters without intermediate polarizers, including those equivalent to Šolc type two-plate and three-plate filters and Lyot two-stage filters, and a square-waveform band-pass filter. They have the basic feature of mechanical tunability and can further be electrically tunable or switchable or further have the bandwidth of spectral transmission adjustable if active components such as Faraday rotator(s) and/or proper LC cells are used. A filter of the invention using the Faraday rotator(s) can further function as a one-way device that transmit and tunably filter light in one direction, but block the backward light.

The suitable polarization rotators of the invention can be any dispersive polarization rotators such as normal optical rotators, i.e. quartz optical rotator, and Faraday rotators. The suitable optical retarders include birefringent waveplates, preferably achromatic or zero-order waveplates, or their electrical equivalents such as LC electrically rotatable retarders and LC variable retarders or their equivalents including electro-optical modulator, photoelastic and magnetic modulator. The LC electrically rotatable retarders can be selected from the group consisting of SmA* cells, DHF LC cells, SSFLC cells, planar aligned smectic C* cells and ternary state antiferroelectric-effect LC cells. The LC variable retarders can be nematic and homeotropically aligned nematic LC cells for instance. The spectral filters of the invention can be used or can be adapted to be used in the reflection mode.

The principle, advantages and features of this invention will become more apparent from the following description, when read in conjunction with the accompanying drawings. The invention contains different embodiments, which describe filters featured by their transmission curves given in the text and suitable for use for different situations. Furthermore, comparisons with equivalent filters in the art, and comments and suggestions for their features and applications and for their selection of the elements from which they are composed of are also given.

BRIEF DESCRIPTION OF THE DRAWINGS

FIG. 6, comprising

FIG. 12, comprising FIGS. 12a–12c, is a graph showing measured transmission profiles $I_2(\lambda)$ of a two-stage spectral filter of the invention constructed according to the embodiment of FIG. 11 for n=2 for tuning angle $\psi=0°$, $\psi=15°$ (FIG. 12a), $\psi=30°$, $\psi=45°$ (FIG. 12b), and $\psi=90°$, $\psi=135°$ (FIG. 12c) versus light wavelength $\lambda$.

FIG. 13, comprising FIGS. 13a–13b, shows calculated round trip transmission $I_{1r}(\lambda)$, $I_{2r}(\lambda)$ and $I_{3r}(\lambda)$ (FIG. 13a) of a single-stage, a two-stage and a three-stage one-direction filters of the invention using Faraday rotators, in accordance with the embodiments of FIG. 7 and FIG. 11 for n=2, 3, versus light wavelength $\lambda$ compared with the forward transmission curves $I_1(\lambda)$, $I_2(\lambda)$ and $I_3(\lambda)$ (FIG. 13b).

FIG. 16 depicts an n-stage (n=2, 3, 4, . . . ) tunable filter of the invention with each stage containing a dispersive optical rotator in combination with an active polarization rotator between polarizers in accordance with the embodiment of FIG. 9.

FIG. 17 depicts an n-stage (n=2, 3, 4, . . . ) tunable filter of the invention with each stage containing a pair of optical rotators having equal and opposite rotations in combination with a variable retarder between polarizers in accordance with the embodiment of FIG. 10.

FIG. 18 depicts the arrangement of a two-tuner spectral filter in accordance with the present invention, containing three dispersive polarization rotators and two identical retarders arranged between polarizers. The filter is equivalent to a Šolc type two-plate filter when quarter-wave retarders are used, and is mechanically tunable and can further be electrically tunable, switchable or one-direction tunable or can further have the bandwidth adjustable depending on the constituent elements selected for use.

FIG. 21, comprising

FIG. 22 depicts the arrangement of a three-tuner spectral filter in accordance with the present invention, containing three dispersive polarization rotators and two quarter-wave retarders arranged between polarizers. The filter acts as a lossless Lyot two-stage filter and is mechanically, electrically or one-direction-electrically tunable depending on the constituent elements selected for use.

FIG. 23, comprising

FIG. 25 depicts the arrangement of a further three-tuner spectral filter in accordance with the present invention, containing four dispersive polarization rotators and three retarders arranged between polarizers. The filter is equivalent to a Šolc type three-plate filter or a Lyot two-stage filter with proper retarders and is mechanically tunable and can be further electrically tunable, switchable or one-direction-electrically tunable or can further have the bandwidth of its spectral transmission adjustable depending on the constituent elements selected for use.

FIG. 26 is a graph showing a set of calculated transmission profiles $I_3(\lambda)$ of a spectral filter in accordance with the embodiment in FIG. 25 with the first and third retarders having the retardation $\Delta=60°$, $\Delta=70°$, $\Delta=80°$, $\Delta=90°$ and $\Delta=100°$, respectively, versus light wavelength $\lambda$.

FIG. 27, comprising FIGS. 27a–27c, shows a set of calculated tuned transmission profiles $I_3(\lambda)$ of the spectral filter as calculated in FIG. 26 when the first and third retarders are zero-order waveplates (solid line) or achromatic quarter-wave plates (dotted line) for tuning angles $\phi=0°$ (FIG. 27a), $\phi=30°$ (FIG. 27b) and $\phi=60°$ (FIG. 27c) versus light wavelength $\lambda$.

FIG. 28, comprising FIGS. 28a–28b, shows the calculated round trip transmission curves $I_{3r}(\lambda)$ of a one-direction filter using Faraday rotators in accordance with the embodiment of the invention in FIG. 25 versus light wavelength $\lambda$ as a function of retardation $\Delta=60°$, $\Delta=70.5°$, $\Delta=80°$ and $\Delta=90°$ of the first and third retarders (FIG. 28a), compared with the forward transmission $I_3(\lambda)$ (FIG. 28b).

FIG. 30, comprising FIGS. 30a–30d, shows a set of calculated tuned transmission profiles $I_3(\lambda)$ of a band-pass filter in accordance with the embodiment in FIG. 29 versus light wavelength $\lambda$ for tuning angle ($\phi=0°$ (FIG. 30a), $\phi=22.5°$ (FIG. 30b), ($\phi=45°$ (FIG. 30c), and $\phi=67.5°$ (FIG. 30d) when using achromatic retarders (dotted line) with the retardation $\Delta_1=44°$ and $\Delta_2=97°$ or zero-order retarders (solid line) with the retardation $\Delta_1=44°$ and $\Delta_2=97°$, both at 463 nm.

FIG. 31, comprising FIGS. 31a–31b, shows the calculated round trip transmission curves $I_{3r}(\lambda)$ of a one-direction band-pass filter using Faraday rotators in accordance with the embodiment of the invention in FIG. 29 versus light wavelength $\lambda$ (FIG. 31a), compared with the forward transmission $I_3(\lambda)$ (FIG. 31b). The filter is assumed to have the retardation of the first and third retarders $\Delta_1=44°$ and the retardation of the second retarder $\Delta_2=97°$ (solid line), and $\Delta_1=38.4°$ and $\Delta_2=108.2°$ (dotted line).

FURTHER BACKGROUND

Figure 1:
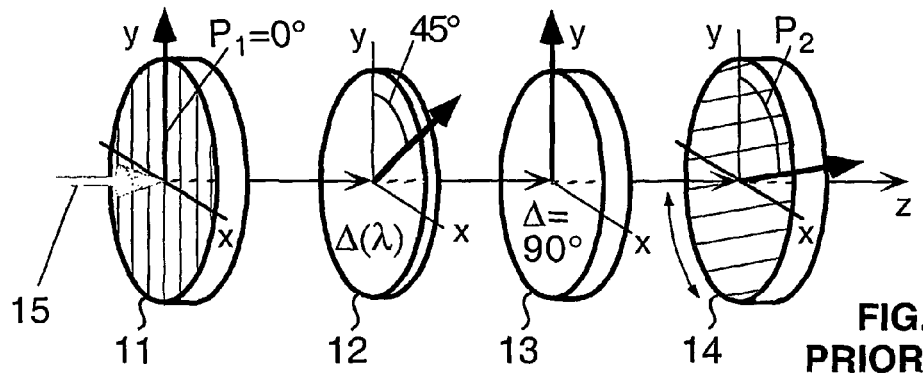
FIG. 1 illustrates a polarizer-rotating single-stage birefringent tunable filter according to the prior art, which comprises a birefringent plate and an achromatic quarter-wave plate arranged in cascade between polarizers.

Further background is given for the tuning technique of the prior art using achromatic wave plates in order to facilitate a comprehension of the present invention. FIG. 1 schematically illustrates the arrangement of a polarizer-rotating tunable single-stage filter of the art. The filter of FIG. 1 comprises an entrance polarizer 11 (azimuth $P_1$), a birefringent plate 12, an achromatic quarter-wave plate 13 and an exit polarizer 14 (azimuth $P_2$). A light beam 15 is incident on the filter of FIG. 1 and passes through the polarizer 11 and the subsequent elements as well at normal incidence, i.e. parallel to the axis z, respectively. Also for any optical arrangement to be described in the following, its incident light beam will pass through the arrangement at normal incidence, i.e. parallel to the z-axis in the drawings. The birefringent plate 12 is oriented with its fast axis at an angle of 45° relative to the polarizer 11, which has its transmission axis assumed to be parallel to the y-axis, i.e. $P_1=0°$. The quarter-wave plate 13 is achromatic over the spectral range of the filter and oriented parallel to the polarizer 11. The waveplate 13 usually is a compound component manufactured by using two or more parallel birefringent plates, which are arranged in cascade and properly oriented such that their combination is equivalent to a retarder having its retardation approximately constant and orientation angle constant or approximately constant in the wavelength range. By means of the Mueller matrix or Jones matrix formulation (e.g. R. M. A. Azzam and N. M. Bashara, "Ellipsometry and Polarized Light", North-Holland, N.Y., 1988), the light intensity transmitted by the filter of FIG. 1 can be calculated as given by $$I = I_0 \cos^2\left(P_2 - \frac{\Delta}{2}\right), \quad (1)$$

where $I_0$ is the incident light intensity of the polarizer 11, $P_2$ is the azimuth angle of the polarizer 14 related to the polarizer 11 and $\Delta=\Delta(\lambda)$ is the retardation or phase angle of the birefringent plate 12. The retardation $\Delta$ of a birefringent plate is a wavelength-dependent parameter as described by the following well-known quality $$\Delta = \frac{2\pi d(n_s - n_f)}{\lambda}, \quad (2)$$

where $\lambda$ is the light wavelength, $d(n_s-n_f)$ is called the retardance, d is the thickness of the birefringent plate, $n_s-n_f$ is the birefringence of the plate material, $n_s$ is the slow index at wavelength $\lambda$, and $n_f$ is the fast index. The transmission of the filter of FIG. 1 is determined by the retardation $\Delta(\lambda)$ and the transmission profile can be tuned by rotating the exit polarizer 14 to change the angle $P_2$.

Figure 2:
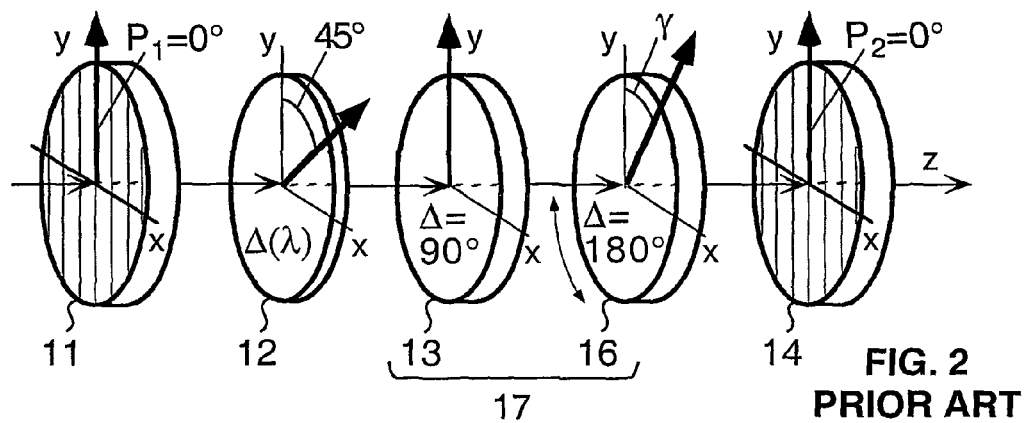
FIG. 2 illustrates a polarizer-fixed single-stage birefringent tunable filter according to the prior art, which comprises a birefringent plate, a fixed achromatic quarter-wave plate and a rotatable achromatic half-wave plate arranged in cascade between polarizers.

Rotation of the exit polarized 14 is not desirable for some applications and it can be avoided by introducing a rotatable achromatic half-wave plate before the polarizer 14 in accordance with the prior art. FIG. 2 schematically illustrates the so modified arrangement, which is formed from the filter of FIG. 1 by inserting an achromatic half-wave plate 16 before the polarizer 14. For the filter of FIG. 2, the exit polarizer 14 may remain stationary. When rotating the half-wave plate 16 such that its fast axis has an angle of $\gamma$ related to that of the entrance polarizer 11, the light intensity behind the polarizer 14 will be exactly equal to what produced by adding retardation $\delta\Delta=4\gamma$ to the birefringent plate 12. The quarter-wave plate 13 and the half-wave plate 16 form a two-plate tuning element or tuner 17.

Figure 3:
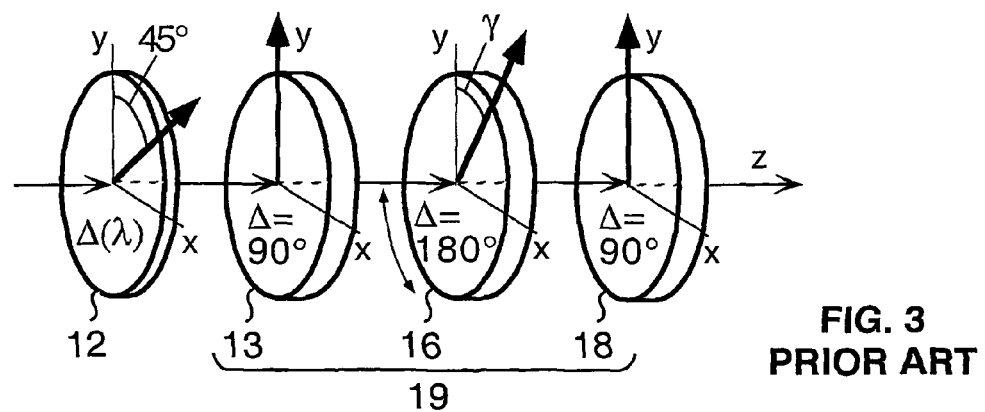
FIG. 3 illustrates a tuning arrangement of the prior art, which comprises two achromatic quarter-wave plates and a rotatable achromatic half-wave plate and can be used for tuning a birefringent plate arbitrarily positioned in an optical network.

The birefringent plate 12 to be tuned in FIG. 1 or FIG. 2 is followed by a polarizer (polarizer 14) without the waveplate 13 or the tuner 17. FIG. 3 schematically shows a more general arrangement suitable for use for tuning a birefringent plate in a filter, e.g. Šolc type filter, which is not preceded or followed by a polarizer. It is a further development of the tuning arrangement in FIG. 2 by adding an additional, fixed quarter-wave plate 18 after the rotatable half-wave plate 16 with its axis parallel to the quarter-wave plate 13. The combination of the waveplates 13, 16 and 18 acts as a variable phase shifter 19 with its axis parallel to that of the birefringent plate 12 and adds a phase shift equal to four times the orientation angle $\gamma$ of the waveplate 16 to the retardation $\Delta(\lambda)$ of the plate 12. A tunable birefringent filter using the three-plate tuner of the prior art becomes increasingly complex as the number of the constituent plates increases.

Figure 4:
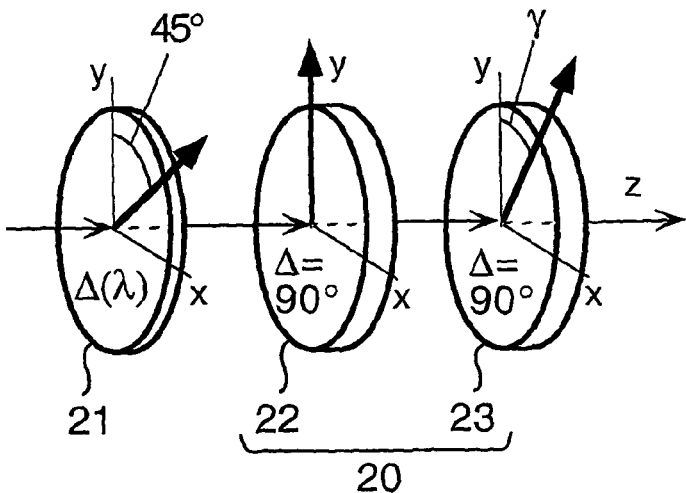
FIG. 4 illustrates a two-plate tuner of the prior art as described by John W. Evans, which comprises two achromatic quarter-wave plates.
Figure 5:
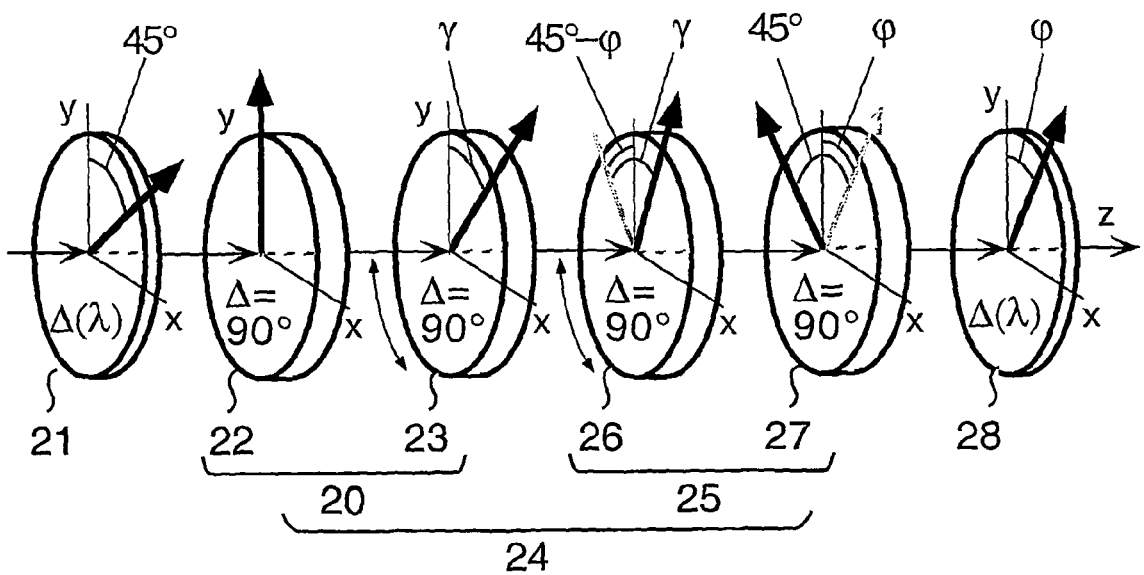
FIG. 5 illustrates a double two-plate tuner of the prior art as described by Carl F. Buhrer, which comprises a pair of complementary two-plate tuners of FIG. 4 and can be used to simultaneously tune two identical birefringent crystal plates in a birefringent filter.

Evans (J. W. Evans "The Birefringent Filter", J. Opt. Soc. Am., 39, 1949, pp. 229–242) described a two-plate tuner as shown in FIG. 4. This two-plate tuner 20 comprises a fixed quarter-wave plate 22 and a rotatable quarter-wave plate 23 arranged in cascade after a birefringent plate 21 for tuning. The quarter-wave plate 22 has its axis oriented at an angle of 45° from the axis of the plate 21. The combination of the quarter-wave plates 22 and 23 is equivalent to a phase shifter followed by an optical rotator. The phase shift produced when the quarter-wave plate 23 has angle $\gamma$ related to the wave plate 22 is equal to $\pi+2\gamma$. The major disadvantage of the two-plate tuner is the rotation of the coordinate axes caused by the rotator. Based on the two-plate tuner of Evans, Buhrer (Buhrer Carl F., U.S. Pat. No. 4,678,287) developed a double tuner for simultaneous and equal tuning of two birefringent plates. His double tuner comprises a pair of complementary two-plate tuners having equal and opposite physical rotations compensated for with each other. One arrangement of his double tuner 24 is shown in FIG. 5 and it comprises two fixed quarter-wave plates 22 and 27 and two rotatable quarter-wave plates 23 and 26 arranged in series between two identical birefringent plates 21 and 28 for tuning. The waveplates 22 and 23 are oriented relative to the birefringent plate 21 to form a two-plate tuner 20 as described above. The waveplates 26 and 27 are oriented, relative to the birefringent plate 28, to form another two-plate tuner 25 such that the tuners 20 and 25 face each other with their rotation, which are equal, but in opposite senses, compensated for with each other.

DETAILED DESCRIPTION OF THE PREFERRED EMBODIMENTS

The elements of the filters or optical systems of this invention are optically connected in cascade. In the drawings, the same number appearing in one drawing refers to the same element. The same number appearing in more than one drawing refers to elements of the same feature, which can replace each other. The term "polarization rotator" is defined in this description as a component or device serving for rotating polarized light. Thus a polarization rotator may be an optical rotator or a Faraday rotator or some others, e.g. a liquid crystal polarization rotator. The term "retarder" is any element or device capable of changing the phase of an optical beam. The phase shift or retardation ($\Delta$) introduced by a retarder may be wavelength-dependent ($\Delta(\lambda)$), for example as described by Equation (2), or achromatic over a wavelength range. In addition to polarization rotators, the filters of the invention utilize retarders, preferably selected from birefringent achromatic or zero-order retarders or waveplates, and liquid crystal retarders including LC variable retarders and LC (electrically) rotatable retarders or equivalents. The retarder materials include, but not limited to, crystals, such as quartz and calcite, polymers, such as polyvinyl alcohol and polycarbonate, and liquid crystal materials. An achromatic retarder has the retardation $\Delta$ equal or approximately equal to a predetermined value over a spectral range and can be manufactured by using two or more single birefringent plates (see e.g. Pancharatnam, S. (1955) Proc. Indian Acad. Sci. 41:137; Beckers, J. M. (1971) Appl. Opt. 10:973). A zero-order retarder has its retardance usually equal to $\lambda/4$ or $\lambda/2$, instead of $(k+¼)$, or $(k+½)\lambda$ (k=1, 2, 3, . . . ), for a certain wavelength. Note that a retardation $\Delta=\pi$ or $\Delta=180°$ is equal to a half-wave ($\lambda/2$) retardance. A LC variable retarder or equivalents, such as electro-optical, photo-elastic or magnetic modulators, has its retardation electrically variable, while a LC rotatable retarder has fixed retardation, but the orientation of its optic axis electrically rotatable. A retarder may be a compound component. The term "compound retarder" is used for a device comprising two or more individual retarders or waveplates optically coupled in cascade and equivalent to a retarder. As used herein the term retarder is to be understood as including all such elements or devices or equivalents. The term "polarizer" is any element or device for generating or analyzing polarized light. The specific embodiments described herein preferably use linear polarizers, which are desirable for many filtering applications. The azimuth P of a polarizer refers to the orientation of its transmission axis and the orientation angle ($\phi$) of a retarder refers to the angle of the optic axis of this retarder, both relative to a selected reference axis. In the illustrations containing polarizing elements, the axis orientation of a polarizer or retarder is represented by a bold arrow. For an electrically rotatable retarder, whose orientation can be switched between two alternative states, its orientation angle is given by $\phi_{on}$ and $\phi_{off}$. For a retarder, whose retardation can be electrically switched between two alternative values, its retardation is given by $\Delta_{on}$ and $\Delta_{off}$.

The present invention provides a new concept for constructing tunable spectral filters, which uses the optical rotatory dispersion. A polarization rotator such as the optical rotator or the Faraday rotator exhibits dispersion effect with its rotation angle depending on or strongly depending on the wavelength of light, typically increasing as the wavelength decreases. A component or device whose Mueller matrix M or equivalently Jones matrix J is of the form $$M = \begin{bmatrix} 1 & 0 & 0 & 0 \\ 0 & \cos 2\rho & \sin 2\rho & 0 \\ 0 & -\sin 2\rho & \cos 2\rho & 0 \\ 0 & 0 & 0 & 1 \end{bmatrix} \text{ or } J = \begin{bmatrix} \cos\rho & \sin\rho \\ -\sin\rho & \cos\rho \end{bmatrix} \quad (3a, b)$$

is defined as an optical rotator (e.g. Azzam, R. M. A. and Bashara, N. M. "Ellipsometry and Polarized Light", North-Holland, N.Y., 1988), where $\rho=\rho(\lambda)$ is the rotation angle. Normal optical rotator is a plane parallel plate of crystal quartz (e.g. CVI Laser Corporation, Albuquerque, N. Mex. U. S. A.) or other crystal materials exhibiting circular birefringence, e.g. silver thiogallate (AgGaS$_2$), cut such that the optical axis is perpendicular to the plate surface. A quartz optical rotator is also a single quartz plate, although cut in a way different from that for a waveplate made of quartz crystal. In general, a commercially available quartz rotator is not more expensive than a quartz waveplate of equivalent quality. Conventionally, an optical rotator can be used for rotating polarized light by a fixed angle. However, it is generally only useful for a single predetermined wavelength or over a very narrow spectral range. A normal optical rotator is non-achromatic, having the rotation angle $\rho(\lambda)$ typically proportional to the rotator thickness and inversely proportional to the square of light wavelength (e.g. ref. B. E. A. Saleh and M. C. Teich "Fundamentals of photonics", John Wiley & Sons Inc, 1991).

Certain materials exhibiting the Faraday effect (e.g. ref. B. E. A. Saleh and M. C. Teich "Fundamentals of photonics", John Wiley & Sons Inc, 1991) also act as polarization rotators. A Faraday rotation is different from an optical rotation only in that the sense of a Faraday rotation is governed by the direction of the magnetic field and is invariant to the propagation direction of the light. Thus, Equation (3) may also be used to describe a Faraday rotator if the propagation of the light wave in the reversal direction is not discussed. There are a lot of glasses and materials exhibiting the Faraday effect available for making Faraday rotators and the Faraday rotator glasses include, but not limited to, Terbium-gallium-garnet (TGG), Yttrium-iron-garnet (YIG) and Terbium-aluminum-garnet (TbAlG). For a Faraday rotator, the rotation angle $\rho_f(\lambda)$ is proportional to the rotator thickness d, the magnetic flux density B and a quantity called the Verdet constant V, which is strongly wavelength dependent. For different materials, Verdet constants $V=V(\lambda)$ show different wavelength dependence, depending on the materials' intrinsic property, but generally increase rapidly as wavelength decrease. The rotation angle of a Faraday rotator is electrically changeable by adjusting the magnetic flux density applied.

Figure 6C:
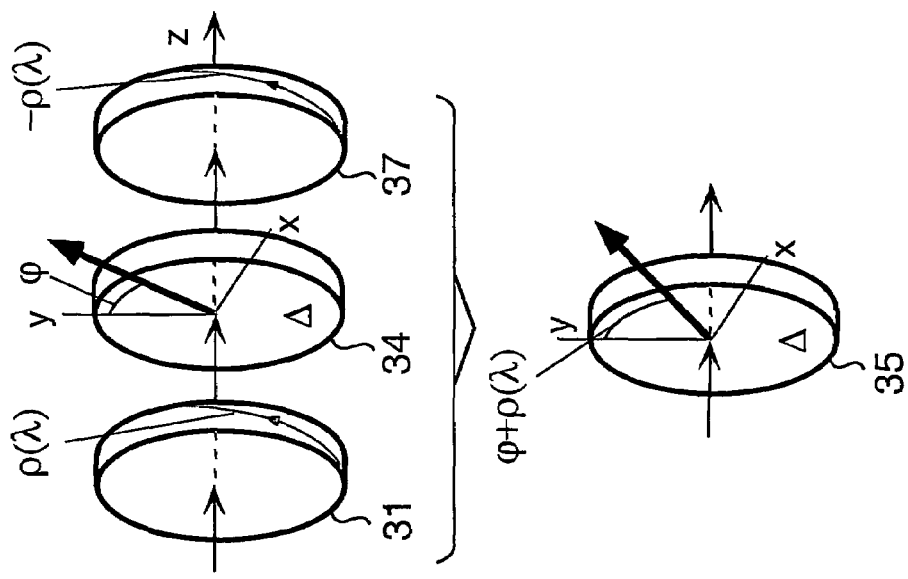
FIGS. 6a–6c, depicts tuners in accordance with the present invention used for constructing a spectral filter, which make use of a dispersive polarization rotation to form an initially-tunable wavelength selection of light by its combination with a polarizer (FIG. 6a), a retarder (FIG. 6b) and a retarder and another dispersive polarization rotator (FIG. 6c), respectively.
Figure 6B:
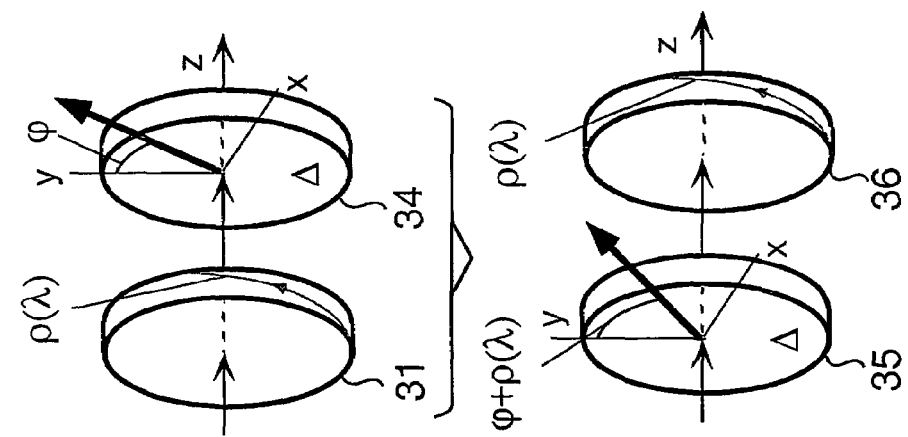
Figure 6A:
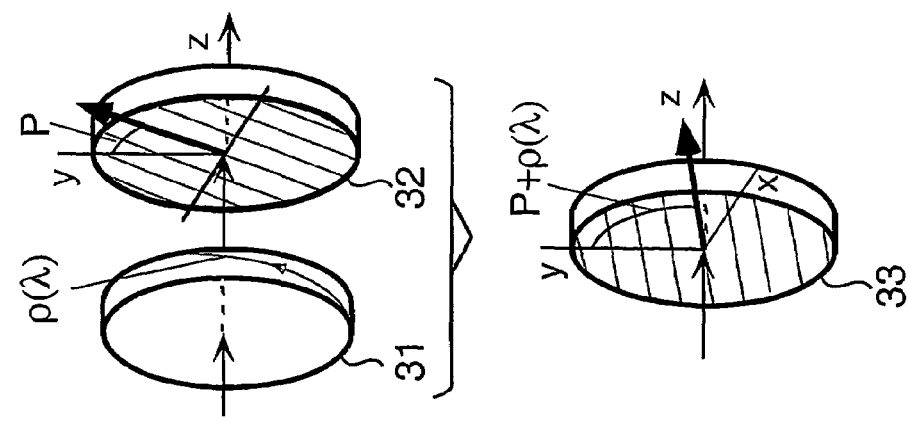

The dispersion effect of an optical rotation or a Faraday rotation is not desired in most conventional applications. For this reason, efforts have been given to develop achromatic optical rotators whose rotation is approximately wavelength-independent over a spectral range (Displaytech, Inc., Longmont, Colo. U. S. A.; Koester, C. J. (1959), J. Opt. Soc. Am., 49:405). It is also well known that a broadband Faraday isolator achieves its wide bandwidth by compensating for the dispersion of the Faraday rotator used (e.g. Electro-Optics Technology, Incorporation, Traverse City, Mich. U. S. A.). The optical rotatory dispersion, an undesirable feature of the optical rotator or the Faraday rotator, is advantageously utilized in the present invention for developing and constructing tunable spectral filters. According to the concept of the invention, the dispersion of a polarization rotation can be transferred into wavelength selection of light by its proper combination with an orientation-sensitive polarizing element such as polarizer or retarder. The transferred wavelength selection is initially tunable by changing the orientation of the polarizing element or varying the polarization rotation, because the optical rotation is a parameter closely related to the orientation angle of a polarizing element. Thus, In accordance with the invention, new type of tuners or tuning elements can be constructed using dispersive polarization rotator(s) in combination with a polarizer or retarder. FIG. 6 schematically shows the arrangements of the tuners of the invention, which transfer a dispersive polarization rotation into wavelength-selection of light according to the concept of the invention when it is combined with a polarizer (FIG. 6a), a retarder (FIG. 6b) and a retarder and another dispersive polarization rotator (FIG. 6c), respectively.

FIG. 6a depicts a tuner of the invention, comprising a dispersive polarization rotator 31 and a polarizer 32, which is assumed to be the exit or entrance polarizer of a filter with no polarizing element positioned behind or before it. The polarization rotator 31 has its rotation angle $\rho(\lambda)$ varying as a function of light wavelength $\lambda$ and is followed (as in FIG. 6a) or preceded by the polarizer 32, which has its azimuth P relative to a selected reference axis, i.e. y-axis. The polarization rotator 31 may be an optical rotator, e.g. quartz optical rotator, or a Faraday rotator or other equivalent. Because the polarizer is an exit or entrance polarizer, one polarization rotator is sufficient for rotating the polarizer (ref., Ye, C. and Keränen, E. (1997) J. Opt. Soc. Am. A. 14:682). Thus, the combination of the polarization rotator 31 and polarizer 32 is equivalent to a polarizer 33, which has its azimuth equal to $P+\rho(\lambda)$ (as in FIG. 6a) or $P-\rho(\lambda)$ relative to the reference axis. Unlike a normal polarizer conventionally available, the equivalent polarizer 33 shows a wavelength selection when transmitting light, due to its azimuth $P+\rho(\lambda)$, or $P-\rho(\lambda)$, which varies as a function of light wavelength. This wavelength selection is adjustable by rotating the initial polarizer 32 to change its orientation angle P or by varying the rotation angle ρ(λ) if it is variable. An element or a device as the equivalent polarizer 33 is termed the polarizer-tuner in this description.

The tuner of FIG. 6b comprises a polarization rotator 31 (ρ(λ)) followed (as in FIG. 6b) or preceded by a retarder 34 (Δ, φ) when it is mounted in an optical network or in a filter as a constituent element. The retarder 34 (Δ, φ) preferably is achromatic both in the retardation Δ and orientation angle φ over the wavelength range considered. The orientation angle φ of the retarder 34 is measured relative to the selected reference axis of the network or filter, which is assumed also parallel to the y-axis. Candidates for the retarder 34 include birefringent retarders and LC retarders such as LC variable and electrically rotatable retarders. It is well known that generally a retarder can be rotated by inserting it between two polarization rotators having equal and opposite rotation angles (ref., e.g. Azzam, R. M. A. (1975) J. Opt. Soc. Am. 68:518). Thus, the combination of the polarization rotators 31 and the retarder 34 is equivalent to a retarder 35 followed (as in FIG. 6b) or preceded by an optical rotator 36. As specified, the equivalent retarder 35 has the same retardation Δ as the retarder 34 has, but its orientation angle is wavelength-dependent, equal to φ+ρ(λ) (as in FIG. 6b) or φ−ρ(λ), while the equivalent optical rotator 36 has its rotation angle equal to ρ(λ). The equivalent retarder 35 acts as a pure retarder. However, unlike a normal retarder conventionally available, the orientation angle of its optic axis φ+ρ(λ) or φ−ρ(λ) is wavelength-dependent. When the equivalent retarder 35 is in a filter, a change of its orientation angle φ+ρ(λ) or φ−ρ(λ), which can be implemented by rotating the initial retarder 34 to change the angle φ and/or by varying the rotation angle ρ(λ), will result in tuning of the spectral transmission of the network or filter contributed by the parameter ρ(λ). This forms the basis of the tuner in constructing spectral filters. An optical rotator, which follows the equivalent retarder 35, e.g. the equivalent optical rotator 36, will modify the transmission spectrum of the filter, but will introduce no change on the tuning mechanism of the tuner, as it is insensitive of mechanical rotation around the beam axis. An element or a device as the equivalent retarder 35 is termed the retarder-tuner in this description.

The tuner of FIG. 6b can be modified by using a second dispersive polarization rotator 37, which has its rotation angle equal to −ρ(λ) and is inserted behind the retarder 34 (FIG. 6c). The rotators 31 and 37 have equal and opposite rotation angles, i.e. ρ(λ) and −ρ(λ), so that the combination of the rotator 31, retarder 34 and rotator 37 is equivalent to the retarder or retarder-tuner 35, which has the same retardation Δ as the retarder 34 has and its wavelength-dependent orientation angle equal to φ+ρ(λ) (as in FIG. 6c) or φ−ρ(λ). For a more general case, the dispersive polarization rotators 31 and 37 may have different rotation angles, which are in a predetermined ratio relative to the structure of said filter over the wavelength range considered. They may be of the same rotation sense or in opposite rotation senses. In this case, the combination of the polarization rotators 31 and 37 and the retarder 34 can be equivalent to an optical rotator preceded or followed by a retarder-tuner as described above.

The tuners of FIG. 6 can directly be used to develop and construct single-stage and multiple-stage spectral filters, which are Initially tunable. Filters without intermediate polarizer are also possible to be developed by using two tuners of the invention or more with the design parameters of the tuners properly chosen and arranging them in series between polarizers. Using the tuners of the invention, in principle various new tunable filters are possible, including Solc type and Lyot type filters without intermediate polarizer and filters having special transmission waveform. A tuner of the invention can be manufactured as a compound component by assembling its constitution retarder and rotator(s). It is also considerable to design and construct filters with single polarization rotators and retarders, but according to the tuning principle of the tuners of the invention. The present invention further provides tunable spectral filters developed based on the new concept or tuners of the invention. The filters use dispersive polarization rotators such as optical rotator(s) and Faraday rotator(s) or use dispersive polarization rotators as the key element(s) in combination with additional retarder(s) such as birefringent retarder(s) or waveplate(s), and liquid crystal retarder(s) or equivalent(s) or liquid crystal polarization rotator(s). The all filters have the basic feature of mechanical tunability and they can be further electrically tunable or switchable or have the bandwidth adjustable depending on the constituent elements selected. With the Faraday rotator it is further feasible to construct one-way devices that transmit light in one direction with the wavelength selection tunable, but blocks the backward light. The filters of the invention can be arranged under three categories, single-stage filters, multiple-stage filters and filters using no intermediate polarizers. Use of the tuners of the invention in constructing tunable filters will be better explicated through the embodiments to be described below, each presented in an arrangement of single polarization rotators and retarders.

Figure 7:
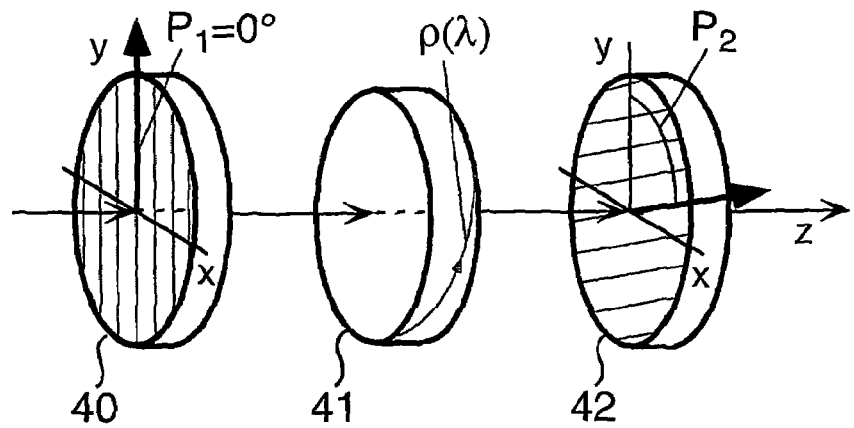
FIG. 7 depicts a single-stage tunable filter of the present invention containing a dispersive polarization rotator between polarizers, which preferably is an optical rotator or a Faraday rotator.

The single-stage filters (FIGS. 7–10) of the invention are independent units defined by polarizer boundaries and the component inside the polarizer boundaries may be a polarization rotator (tuner of FIG. 6a), an optical rotator combined with a half-wave retarder (tuner of FIG. 6b) or an active rotator (tuner of FIG. 6a), or a pair of polarization rotators having equal and opposite rotation angles with a variable retarder sandwiched between them (tuner of FIG. 6c). FIG. 7 schematically illustrates the optical arrangement of a single-stage filter of the invention, which comprises an entrance polarizer 40 (azimuth: $P_1=0$), a polarization rotator 41 and an exit polarizer 42 (azimuth: $P_2$). The polarization rotator 41 is dispersive and has its rotation angle $\rho=\rho(\lambda)$ wavelength-dependent due to its dispersion. The combination of the polarization rotator 41 and exit polarizer 42 forms a polarizer-tuner of FIG. 6a. The spectral transmission or light intensity transmitted by a filter of this description will be calculated by means of the Mueller matrix formulation, i.e. the first element of the Stokes vector of the emerging light beam from the exit polarizer of this filter. Thus, the spectral transmission $I_1=I_1(\lambda)$ of the filter of FIG. 7 can be expressed and calculated as given by $$I_1 = \frac{1}{2}\begin{bmatrix} 1 \\ \cos 2P_2 \\ \sin 2P_2 \\ 0 \end{bmatrix}^{-1} \begin{bmatrix} 1 & 0 & 0 & 0 \\ 0 & \cos 2\rho & \sin 2\rho & 0 \\ 0 & -\sin 2\rho & \cos 2\rho & 0 \\ 0 & 0 & 0 & 1 \end{bmatrix} \begin{bmatrix} 1 \\ \cos 2P_1 \\ \sin 2P_1 \\ 0 \end{bmatrix} = \quad (4)$$

$$\cos^2(P_2 - P_1 + \rho(\lambda)),$$

where $$\begin{bmatrix} 1 \\ \cos 2P_2 \\ \sin 2P_2 \\ 0 \end{bmatrix}^{-1} = [1 \ \cos 2P_2 \sin 2P_2 \ 0]. \quad (5)$$

Equation (4) has the same form as the transmission spectrum of a standard Lyot single-stage filter. However, the filter of FIG. 7 has the wavelength-selection of its spectral transmission $I_1(\lambda)$ determined by the rotation angle $\rho(\lambda)$ of the polarization rotator 41. The filter in FIG. 7 can be tuned by mechanically rotating one of the polarizers 40 and 42 relative to the other or both to change the angle $P_2$-$P_1$. For a practical use, it is desired to rotate the exit polarizer 42 with the entrance polarizer 40 stationary. The filter in FIG. 7 is further tunable by varying the rotation angle $\rho(\lambda)$ if it is adjustable.

According to the invention, the rotator 41 preferably is an optical rotator ($\rho(\lambda)=\rho_o(\lambda)$), e.g. a quartz rotator, typically a plane parallel plate of crystal quartz cut such that the optical axis is perpendicular to the plate surface. The single-stage filter of FIG. 7 using an optical rotator is mechanically tunable and it is advantageous over the prior art in several aspects. Because a quartz rotator is a single plate, although cut in a way different from that for a waveplate made of quartz crystal, the filter has a structure equivalent to that of a Lyot single-stage filter, which is not tunable. As shown in FIG. 1, the Lyot single-stage filter has to use an additional achromatic quarter-wave plate for realizing the tuning. However, compared with the art, the filter of the invention in FIG. 7 is initially tunable, requiring no achromatic waveplate, and thus the birefringent plates required for constructing the achromatic quarter-wave plate are saved. Another advantage of the filter of FIG. 7 is its simpler structure than that of the filter of FIG. 1 so that for the former higher transmission and system performance are expected to reach under the same conditions. As it requires no achromatic retarder, a further important benefit of the embodiment of FIG. 7 is that the obstacle for constructing broadband filters according to the prior art has been removed. Based on the embodiment of FIG. 7, Lyot structure filters (see below) are expected, whose operating spectral range can be as broad as the transmission limit of the quartz crystal allows. Furthermore, the optical rotator possesses the feature of insensitive of any mechanical rotation around the rotator axis. Thus, another outstanding feature of the filter in FIG. 7 is its very simple installation and adjustment. When mounting the filter, only alignment of the polarizers is necessary. The single-stage filter of FIG. 7 using an optical rotator can work also in the reflection mode, e.g. in a reflection microscope. In this case, light goes though the filter twice, i.e. making a round trip, first by transmission and then by reflection from a mirror or sample for instance. The filter of FIG. 7 working in the reflection mode acts as a tunable Šolc two-plate filter with its transmission expressed by $$I_1=\cos^4(P_2-P_1+\rho_o(\lambda)) \quad (6)$$

The filters of the invention to be described below can also work or can be readily adapted to work in the reflection mode. Their spectral transmissions in the reflection mode can be simply obtained by respectively squaring their transmissions in the transmission mode and therefore will be omitted except for those in which Faraday rotator(s) are used.

According to the invention, the polarization rotator 41 in the filter of FIG. 7 may also be a Faraday rotator ($\rho(\lambda)=\rho_f(\lambda)$). A Faraday rotator is specified by its rotation angle, which is wavelength-dependent due to the dispersion effect. There are a lot of magneto-optical glasses available for Faraday rotators. Their Verdet constants $V=V(\lambda)$ show different wavelength dependence, depending on the materials' intrinsic property and spectral range under investigation, although having a general tendency of rapid increase as the wavelength decreases. Depending on the material selected, the Faraday rotation $\rho_f(\lambda)$ can show a dispersion similar to that an equivalent quartz-optical rotation $\rho_o(\lambda)$ does. The spectral profile $I_1=I_1(\lambda)$ of the filter of FIG. 7 using a Faraday rotator is determined by the dispersion of the rotation angle $\rho_f(\lambda)$ of the Faraday rotator used. The filter in FIG. 7 using a Faraday rotator is tunable by varying the rotation angle $\rho_f(\lambda)$ of the Faraday rotator with $\rho_f(\lambda)$=VdB where d is the rotator thickness, B is the magnetic flux density and $V=V(\lambda)$ is the Verdet constant of the rotator material. The tuning is electrical by adjusting the magnetic field B to change the rotation angle $\rho_f(\lambda)$ with the polarizers 40 and 42 preferably stationary and oriented parallel or perpendicular to each other. In addition to the electrical tenability, the filter is mechanically tunable by rotating the exit polarizer 42 relative to the polarizers 40. This feature is useful when the range in which the rotation angle $\rho_f(\lambda)$ varies is not sufficiently large as desired. As a compensation for the electric tunability, it enables adjustment or selection of the wavelength range where the electrical tuning is accomplished.

The single-stage filter of FIG. 7 using a Faraday rotator also requires no achromatic retarder. The wavelength range of the filter can be as broad as the transmission limit of the used magneto-optical material or glass allows. A typical Faraday rotator glass is TGG (Terbium-gallium-garnet) crystal, which is transparent in a broad spectral range of 500–1500 nm and has high Verdet constant, low losses and high damage resistance. The embodiment of FIG. 7 can be used for the construction of broadband tunable filters by using proper Faraday rotators and broadband polarizers. For the filter of FIG. 7 using a Faraday rotator, the phase shift introduced by adjusting the magnetic field B is wavelength-dependent. This is different from the filter of FIG. 7 when the rotator 41 is an optical rotator for which the phase shift caused by rotating the exit polarizer is constant for all wavelengths.

The filter of FIG. 7 using a Faraday rotator can further be electrically switchable with the magnetic field B turned on or off. For this purpose, the polarizer 42 is oriented preferably to be parallel ($P_2$-$P_1$=0°) or perpendicular ($P_2$-$P_1$=90°) to the entrance polarizer 40. The filter acts as an electrical switch in this case with its transmitted light intensity in two subsequently switched states as described by $$I_1 = \begin{cases} 1 & \text{Unswitched} \quad \text{for } P_2-P_1=0° \\ \cos^2(\rho_f(\lambda)) & \text{Switched} \end{cases} \quad (7)$$

or $$I_1 = \begin{cases} 0 & \text{Unswitched} \quad \text{for } P_2-P_1=90° \\ \sin^2(\rho_f(\lambda)) & \text{Switched} \end{cases} \quad (8)$$

For the filter of FIG. 7 another benefit of using the Faraday rotator is that it can function as a one-way device that transmits light in one direction with the same tunable wavelength selection, but blocks the backward light. According to the invention, the filter of FIG. 7 when the rotator 41 is a Faraday rotator acts as a one-direction filter with the polarizer 42 preferably aligned to make an angle of 45° relative to the polarizer 40, i.e. $P_2$-$P_1$=45°. For $P_2$-$P_1$=45, the round trip transmission of the filter is given by $$I_1=\cos^2(45°+\rho_f(\lambda))\cos^2(45°-\rho_f(\lambda)). \quad (9)$$

The single-stage filter of FIG. 7 using a Faraday rotator can work also in the reflection mode when the polarizers 40 and 42 are oriented to be either parallel or perpendicular to each other, i.e. $P_2-P_1=0°$ or $P_2-P_1=90°$. The transmission of the filter working in the reflection mode is $$I_1 = \begin{cases} \cos^4(\rho_f(\lambda)), & P_2 - P_1 = 0° \\ \sin^4(\rho_f(\lambda)), & P_2 - P_1 = 90° \end{cases} \quad (10a, b)$$

To construct high-resolution spectral filters according to the embodiment of FIG. 7, optical rotators or Faraday rotators are required whose rotation angles are much larger than an optical rotator or a Faraday rotator presently available in current applications. The rotation angle of a normal optical rotator or Faraday rotator generally is not larger than 180° (zero-order). For example, an optical rotator presently available usually has a rotation equal to 90° or 45° at its standard wavelength, while a Faraday rotator used in an optical isolator usually has the rotation angle equal to 45° at the center wavelength of the isolator. It is a teaching of the invention to manufacture multi-order optical rotators and Faraday rotators for constructing spectral filters of high resolution according to the invention. The rotation angle of such multi-order rotator is larger or much larger than 180° in the visible range or in a wavelength range of interest. Tellurium dioxide (TeO2) and silver thiogallate (AgGaS$_2$) crystals have much higher rotatory powers than quartz crystals and are candidate materials for making multi-order optical rotators. To have large rotation angle for a Faraday rotator, material exhibiting high Verdet constant shall be selected and/or the rotator thickness and the magnetic flux density applied need to be increased. Magnetic crystals having high Verdet constant include, for example, TGG (terbium Gallium Garnet) crystals.

Figure 8:
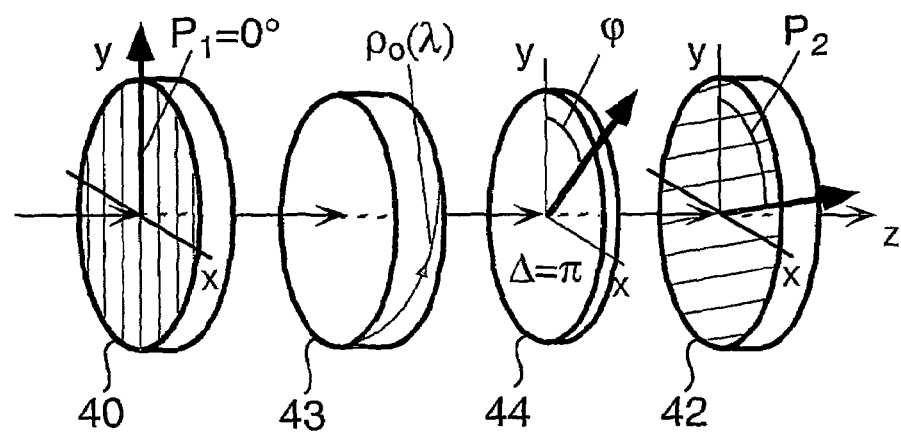
FIG. 8 depicts another single-stage tunable filter of the invention comprising a dispersive optical rotator in combination with a half-wave retarder between polarizers. The retarder preferably is an achromatic or zero-order birefringent retarder or equivalent LC electrically rotatable retarder.

FIG. 8 schematically illustrates another single-stage filter of the present invention, which comprises an entrance polarizer 40 (azimuth: $P_1=0$), an optical rotator 43, a half-wave retarder 44 and an exit polarizer 42 (azimuth: $P_2$). The optical rotator 43 is dispersive, having its rotation angle $\rho=\rho_o(\lambda)$ wavelength-dependent over the wavelength range of the filter. The half-wave retarder 44 preferably is achromatic over the wavelength range of the filter and is oriented with its optic axis at an angle $\phi$ relative to the polarizer 40. The retarder 44 may be behind (as in FIG. 8) or before the rotator 43 with its connection with the retarder 44 equivalent to a tuner as described by FIG. 6b. By means of the Mueller matrix formulation, the transmission $I_1=I_1(\lambda)$ of the filter of FIG. 8 is expressed and calculated as given by $$I_1 = \frac{1}{2}\begin{bmatrix} 1 \\ \cos 2P_2 \\ \cos 2P_2 \\ 0 \end{bmatrix}^{-1} \begin{bmatrix} 1 & 0 & 0 & 0 \\ 0 & \cos 4\varphi & \sin 4\varphi & 0 \\ 0 & \sin 4\varphi & -\cos 4\varphi & 0 \\ 0 & 0 & 0 & -1 \end{bmatrix} \quad (11)$$

$$\begin{bmatrix} 1 & 0 & 0 & 0 \\ 0 & \cos 2\rho_o & \sin 2\rho_o & 0 \\ 0 & -\sin 2\rho_o & \cos 2\rho_o & 0 \\ 0 & 0 & 0 & 1 \end{bmatrix} \begin{bmatrix} 1 \\ \cos 2P_1 \\ \sin 2P_1 \\ 0 \end{bmatrix} =$$

$$\cos^2(P_2 + P_1 - \rho_o(\lambda) - 2\varphi).$$

The spectral profile of the single-stage filter of FIG. 8 is determined by the rotation angle $\rho=\rho_o(\lambda)$ of the optical rotator 43 and the spectral transmission of the filter is tunable by rotating the half-wave retarder 44 relative to the polarizer 40. Unlike the embodiment of FIG. 7, the both polarizers 40 and 42 may remain stationary when tuning the filter of FIG. 8. This feature shall be desirable for improving the image performance. The added phase shift in the transmission $I_1(\lambda)$ by rotating the half-wave retarder 44 is twice the angle by which it is rotated. The tuning can be mechanical or electric depending on the retarder selected for use.

According to the invention, the half-wave retarder 44 preferably is an achromatic or a zero-order birefringent waveplate or an equivalent electrically rotatable LC retarder. The filter of FIG. 8 using a birefringent retarder is mechanically tunable. According to the invention, a zero-order half-wave retarder can be used if the spectral range of the filter is not very broad, which has its retardation equal to 180° at a wavelength inside the wavelength range of the filter, preferably shorter than the center wavelength depending on the design and requirement. Such zero-order retarder may be considered as an approximation to an achromatic half-wave retarder. In this case, the transmission of the filter of FIG. 8 will slightly differ from what described by Equation (11) depending on the wavelength range selected and the tuning angle $\phi$ of the retarder used. The effects caused by using a zero-order retarder as the retarder 44 are slight waveform deformation and sidelobe amplitude change. In applications such as color display, imaging and projection, this is not so important as the benefit to be obtained.

According to the invention, it is preferable to use an equivalent electrically rotatable LC retarder as the retarder 44 when the electric tuning is desired. A suitable LC retarder has the retardation $\Delta_{lc}=180°$ and its optic axis orientation is rotatable when a control voltage is applied. It works as an electrically equivalent of a rotatable half-wave plate. The LC retarder is oriented to have its optic axis at an angle $\phi_{off}$ relative to the entrance polarizer 40 when the control voltage is off. The optic axis is rotated by an angle $\phi_{lc}$ to the orientation $\phi_{on}$ with $\phi_{on}=\phi_{off}+\phi_{lc}$ when the control voltage is on. A phase shift can be introduced by electrically rotating the angle $\phi_{lc}$ with the polarizers 40 and 42 stationary. The rotation of angle $\phi_{lc}$ can be either continuous or discrete depending on the LC retarder used. Candidates for the LC retarder with the optic axis orientation continuously rotatable are SmA* cells and DHF LC cells. For example, the achieved maximum tilt angle is ±38° for the DHF cell. Examples for LC retarders having the optic axis discretely rotatable include stable binary state SSFLC cells and planar aligned smectic C* (SmC*) cells (two optic axis orientations) and ternary state antiferroelectric-effect LC cells (three optic axis orientations). The single-stage filter of FIG. 8 using a LC rotatable retarder can additionally be tunable by mechanically rotating the LC retarder used or the exit polarizer 42 to change the angle $\phi_{off}$ or $P_2$, if so desired. A continuously-tunable LC single-stage filter of the art (see e.g. Johnson, K. M and Sharp, G. D. U.S. Pat. No. 5,132,826) is based on the arrangement of FIG. 2 and it requires a birefringent plate, an achromatic quarter-wave plate and a LC retarder. Compared with the art, however the filter of FIG. 8 uses an optical rotator (also a birefringent plate) and a LC retarder, requiring no achromatic plate at all. In addition, the filter of FIG. 8 is mechanically tunable and its installation and adjustment is simpler.

To construct spectral filters according to the embodiment of FIG. 8, it is desirable to make a new type of LC electrically rotatable half-wave retarder, having the orientation angle of its optic axis varying as a regular function with respect to the light-wavelength. In principle, the orientation angle may be any function, preferably monotone decreasing or increasing with respect to the wavelength over a spectral range. Such LC retarder can be used to replace the retarder 44 and the optical rotator 43 in FIG. 8. It is another teaching of the present invention to construct LC electrically rotatable retarders, the orientation of whose optic axis varies as a predetermined function of the light wavelength, for constructing electrically tunable or switchable spectral filters (see below) without requiring additional polarization rotator(s).

Figure 9:
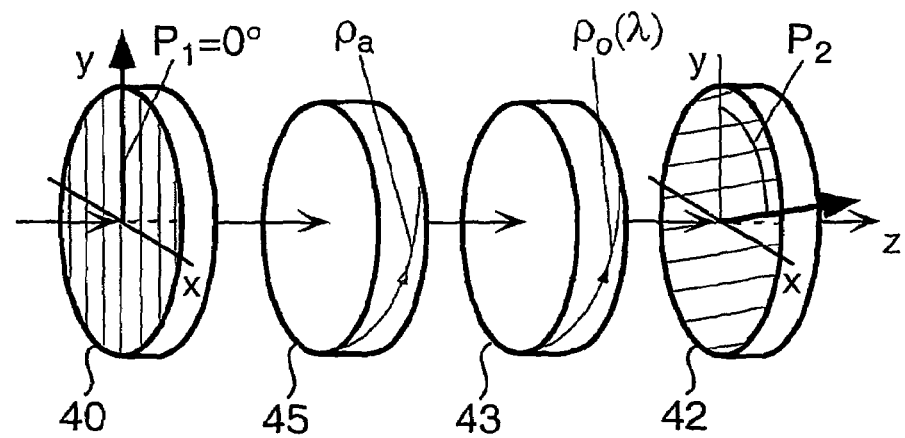
FIG. 9 depicts a further single-stage tunable filter of the invention comprising a dispersive optical rotator in combination with an active polarization rotator between polarizers. The active rotator preferably is a Faraday rotator or a twisted-nematic LC polarization rotator.

A further single-stage filter of the present invention is illustrated in FIG. 9, which use a dispersive optical rotator 43 in combination with an active polarization rotator 45 arranged between an entrance polarizer 40 (azimuth: $P_1=0$) and an exit polarizer 42 (azimuth: $P_2$). The optical rotator 43 can be considered as a passive polarization rotator and it preferably is a quartz rotator, having its rotation angle $\rho=\rho_o(\lambda)$ wavelength-dependent over the wavelength range of the filter. The active polarization rotator 45 has its rotation angle $\rho_a$ adjustable, which may be dispersive or approximately constant over the wavelength range of the filter, and it preferably is a Faraday rotator ($\rho_a=\rho_o(\lambda)$) or proper LC polarization rotator, e.g. twisted-nematic polarization rotator ($\rho_a=\rho_{lc}$) The optical rotator 43 may be before (as in FIG. 9) or behind the active rotator 45 with its combination with the active rotator 45 and exit polarizer 42 equivalent to a polarizer-tuner of FIG. 6a. In FIG. 9, the optical rotator 43 and the active rotator 45 are assumed to have same rotation sense as viewed along the light propagation direction. Based on Equation (4), the spectral transmission of the single-stage filter of FIG. 9 is given by $$I_1=\cos^2(P_2-P_1+\rho_o(\lambda)+\rho_a). \quad (12)$$

When the active polarization rotator 45 is a Faraday rotator, the spectral profile $I_1(\lambda)$ of the filter of FIG. 9 is determined by the sum of the rotation angles $\rho_o(\lambda)$ and $\rho_a=\rho_f(\lambda)$ The filter is electrically tunable by changing the Faraday rotation angle $\rho_f(\lambda)$. The filter of FIG. 9 can serve, for example, as a compensation solution for increasing the resolution of the filter of FIG. 7 when using a Faraday rotator with the Faraday rotation angle not sufficiently large. The filter of FIG. 9 using a Faraday rotator can further act as a one-way device. For this purpose, it is desirable to choose an optical rotator as the passive rotator 43, which has the rotation angle $\rho_o(\lambda)$ similar to or ideally equal to the Faraday rotation angle $\rho_f(\lambda)$. In this case, the exit polarizer 42 is aligned to make an angle of 45° to the polarizer 40 such that the round trip transmission of the filter approaches the minimum depending on agreement between the rotation angles $\rho_o(\lambda)$ and $\rho_f(\lambda)$. It is also preferable to use a twisted-nematic polarization rotator as the active rotator 45. A twisted nematic cell is a thin layer of nematic LC placed between two parallel glass plates and rubbed so that the molecular orientation rotates helically about the axis normal to the plates (the axis of twist). With no electric field applied in the direction of the axis of twist, the cell rotates a linearly polarized light by an angle equal to the angle of twist, usually 90° or 45°. Conversely, when an electric field is applied in the direction of the axis of twist such that the molecules lose their twisted character, it produces no optical rotation. The entrance crystal axis of the twisted-nematic rotator is parallel or perpendicular to the entrance polarizer 40. The twisted-nematic rotator functions as an electrical switch, having the rotation angle or the angle of twist equal to zero or $\rho_{lc}$ by means of application of a proper control voltage or when the electric field is absent. The spectral transmission of the filter of FIG. 9 when using a twisted-nematic rotator is given by $$I_1 = \begin{cases} \cos^2(P_2-P_1+\rho_o(\lambda)+\rho_{lc}) & \text{Unswitched} \\ \cos^2(P_2-P_1+\rho_o(\lambda)) & \text{Switched} \end{cases} \quad (13a, b)$$

The filter has its basic spectral profile determined by the rotation angle $\rho_o(\lambda)$ of the optical rotator 43 and is discretely tunable by electrically switching or unswitching the LC polarization rotator. In addition, the filter of FIG. 9 is mechanically tunable. A phase shift can be introduced by rotating the polarizer 42 to change the angle $P_2-P_1$. This feature, serving as a compensation for the electric tunability, enables a convenient adjustment or shift of the wavelength range where the electric tuning is accomplished.

The rotation angle of a twisted-nematic polarization rotator available at present is approximately constant in a certain spectral range. For the filter application disclosed in the present invention, it is desirable to construct LC polarization rotator whose rotation angle is dispersive, as a regular function with respect to the light wavelength, and electrically variable or switchable. In principle, the rotation angle may be any function, preferably monotone decreasing or increasing with respect to the light wavelength over a spectral range. With such LC polarization rotators, pure LC tunable filters can be constructed according to the invention. For example, a single dispersive LC polarization rotator, which is electrically variable or switchable, can replace the active rotator 45 and the optical rotator 43 in FIG. 9. It is a further teaching of the present invention to construct or develop LC polarization rotators having the rotation angle dispersive and variable for constructing tunable spectral filters.

Figure 10:
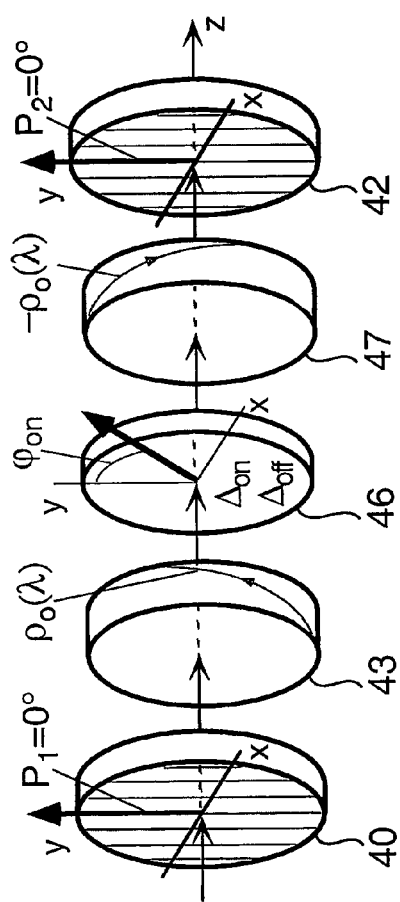
FIG. 10 depicts a single-stage tunable filter of the invention containing a pair of optical rotators having equal and opposite rotations in combination with a variable retarder between polarizers. The retarder preferably is a LC variable retarder or equivalent.

FIG. 10 schematically illustrates a further single-stage filter of the invention, which is electrically switchable and mechanically tunable. An electrically switchable filter is particularly useful in the area of telecommunication. The filter of FIG. 10 comprises a pair of dispersive optical rotators 43 and 47 and a variable retarder 46 arranged between an entrance polarizer 40 ($P_1$) and an exit polarizer 42 ($P_2$) with the retarder 46 sandwiched between the rotators 43 and 47. The rotators 43 ($\rho_o(\lambda)$) and 47 ($-\rho_o(\lambda)$) have equal and opposite rotation angles over the spectral range of the filter. The retarder 46 preferably is a LC variable cell, for example a nematic or homeotropically aligned nematic LC cell, whose retardation is electrically variable by application of a control voltage. The possible benefits of an electrically switchable filter using LC devices include compact size, low cost, large clear aperture and low power requirement. The variable retarder 46 is operated to have its retardation switchable between two alternative states, in which it has the retardation $\Delta_{off}$ and $\Delta_{on}$ respectively equal or approximately equal to 0° and 180° over the wavelength range of the filter. The retarder 46 with non-zero retardation has its optic axis oriented at $\phi_{on}$ relative to the polarizer 40. When the retarder 46 is switched to have $\Delta_{off}$, it acts as an isotropic medium (zero retardation) so that the rotators 43 and 47 are compensated for with each other. In the other switched state $\Delta_{on}$, the combination of the retarder 46 with the rotators 43 and 47 is equivalent to a half-wave retarder-tuner according to FIG. 6c having its orientation angle equal to $\rho_o(\lambda)+\phi_{on}$. Thus, for $P_2=0°$ (as in FIG. 10) the spectral transmission $I_1=I_1(\lambda)$ of the single-stage filter of FIG. 10 can be written as $$I_1 = \begin{cases} 1 & \text{Off-state} \\ \cos^2 2(\rho_o(\lambda)+\varphi_{on}) & \text{On-state} \end{cases} \quad (14a)$$

Alternatively, the filter of FIG. 10 can block light in the off-state when the polarizer 42 is rotated by 90°. For $P_2=90°$, the transmission of the filter is $$I_1 = \begin{cases} 0 & \text{Off-state} \\ \sin^2 2(\rho_o(\lambda)+\varphi_{on}) & \text{On-state} \end{cases} \quad (14b)$$

The filter of FIG. 10 is electrically switchable by switching the retarder 46 subsequently in the switched states $\Delta_{off}$ and $\Delta_{on}$ and its spectral transmission is further tunable by mechanically rotating the retarder 46 about the light beam axis z to change the angle $\phi_{on}$. For this embodiment, it is also considerable to use an electro-optical modulator or equivalent such as photoelastic or magnetic modulator, as the retarder 46. The wavelength range of the filter is determined by the LC variable retarder or modulator to be used such that it can be operated as a retarder having the retardation switchable between 0° and 180° with the dispersive effect negligible.

The present invention further provides multiple-stage tunable filters developed based on the single-stage filters disclosed above, which are independent units defined by polarizer boundaries. A multiple-stage filter of the invention is proper combination of single-stage filters having same structure, but of different sizes, which are arranged in cascade along a light beam axis with the exit polarizer of one stage serving as the entrance polarizer of the following stage. In general, single-stage filters of different structures can also be combined to make a multiple-stage filter.

Figure 11:
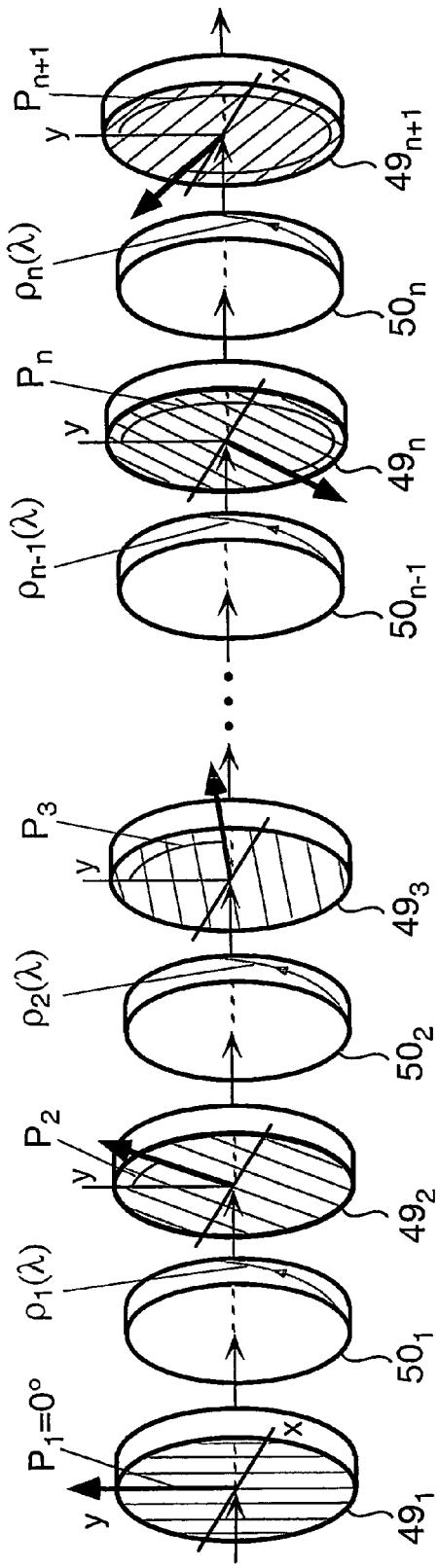
FIG. 11 depicts an n-stage (n=2, 3, 4, . . . ) tunable filter of the invention with each stage containing a dispersive polarization rotator between polarizers in accordance with the embodiment of FIG. 6.

FIG. 11 schematically illustrates an n-stage (n=2, 3, 4, . . . ) filters of the invention, which comprises n+1 linear polarizers $49_1$, $49_2$, $49_3$, . . . , $49_{n+1}$ (azimuth: $P_1$, $P_2$, $P_3$, . . . , $P_{n+1}$) and n dispersive polarization rotators $50_1$, $50_2$, $50_3$, . . . , $50_n$. They are arranged in series to form n stages, each in accordance with the arrangement of FIG. 7, such that the rotator $50_i$ is sandwiched between the polarizers $49_i$ and $49_{i+1}$ (i=1, 2, 3, . . . , n). The polarization rotators $50_1$, $50_2$, $50_3$, . . . , $50_n$ preferably are optical rotators and have their rotation angles specified by $\rho_1(\lambda)$, $\rho_2(\lambda)$, $\rho_3(\lambda)$, . . . , $\rho_n(\lambda)$, respectively. According to the invention, the rotation angles $\rho_1(\lambda)$, $\rho_2(\lambda)$, $\rho_3(\lambda)$, . . . , $\rho_n(\lambda)$ have to be in the ratios of integers over the wavelength range of the filter, preferably in the ratios of $1:2:4:8: \ldots :2^{n-1}$ disregarding the rotation sense, i.e. $|\rho_2(\lambda)|=2|\rho_1(\lambda)|$, $|\rho_3(\lambda)|=4|\rho_1(\lambda)|$, $|\rho_4(\lambda)|=8|\rho_1(\lambda)|$, . . . , and $|\rho_n(\lambda)|=2^{n-1}|\rho_1(\lambda)|$, as assumed for the embodiment of FIG. 11. This means that each of the rotators $50_1$, $50_2$, $50_3$, . . . , $50_n$ has a rotation angle twice that of its immediately preceding one disregarding the rotation sense. The polarizers $49_2$, $49_3$, . . . , $49_{n+1}$ preferably are oriented parallel to the polarizer $49_1$ ($P_1=0°$), i.e. $P_2=0°$, $P_3=0°$, $P_n=0°$ before tuning. When tuning, the polarize rotated, each relative to its preceding polarizer, such that their azimuths are in the same ratios as those of their immediately preceding rotation angles, i.e. $(P_2-P_1):(P_3-P_2):(P_4-P_3): \ldots :(P_{n+1}-P_n)=\rho_1(\lambda):\rho_2(\lambda):\rho_3(\lambda): \ldots :\rho_n(\lambda)$. The light intensity transmitted by each stage can be calculated by using Equation (4). Thus for $P_2-P_1=\psi$ the spectral transmission $I_n=I_n(\lambda)$ of the filter of FIG. 11 is found to be $$I_n=\cos^2(\rho_1(\lambda)+\psi)\cos^2 2(\rho_1(\lambda)+\psi)\cos^2 4(\rho_1(\lambda)+\psi)\ldots \\ \cos^2 2^{n-1}(\rho_1(\lambda)+\psi). \quad (15a)$$

Equation (15a) describes a Lyot geometry n-stage filter, with the basic spectral transmission profile determined by the dispersive rotation angles of the rotators used, which are in the ratios of $1:2:4:8: \ldots :2^{n-1}$ disregarding the rotation sense. The filter of FIG. 11 is tunable by simultaneously rotating the polarizers $49_2$, $49_3$, . . . , $49_{n+1}$ with the ratios of the azimuths $P_2-P_1$, $P_3-P_2$, . . . , and $P_{n+1}-P_n$ remaining unchanged and can further be tunable by varying the rotation angles $\rho_1(\lambda)$, $\rho_2(\lambda)$, $\rho_3(\lambda)$, . . . , $\rho_n(\lambda)$ with their ratios remaining unchanged if they are adjustable. Before tuning, the polarizers $49_2$, $49_3$, . . . , $49_{n+1}$ may be also perpendicular to the polarizer $49_1$, i.e. $P_2=90°$, $P_3=90°$, . . . , $P_{n+1}=90°$ and they are rotated for tuning with their azimuths $P_2-P_1-90°$, $P_3-P_2$, $P_4-P_3$, . . . , and $P_{n+1}-P_n$ in the same ratios as those of the preceding rotation angles. The transmission $I_n=I_n(\lambda)$ of the filter in this case is $$I_n=\sin^2(\rho_1(\lambda)+\psi)\cos^2 2(\rho_1(\lambda)+\psi)\cos^2 4(\rho_1(\lambda)+\psi) \ldots \\ \cos^2 2^{n-1}(\rho_1(\lambda)+\psi). \quad (15b)$$

The multiple-stage filter of FIG. 11 possesses the all features the single-stage filter of FIG. 7 has. Compared with a Lyot n-stage polarizer-rotating tunable filter of the prior art, which requires n achromatic quarter-wave plates for realizing the tuning, the filter of FIG. 11 has a simpler arrangement requiring no achromatic waveplate and therefore saves n achromatic waveplates. As no achromatic waveplate is used, the filter of FIG. 11 can transmits light to the transmission limit of the rotator material and the spectral range can be easily broadened by using broadband polarizers. In addition, the installation of the filter of FIG. 11 is simple, requiring only alignment of the polarizers. For a polarizer-rotating multiple-stage filter of the art, one serious liability is that rotation of the exit polarizer of one stage requires simultaneous rotation of the birefringent plates in the second and subsequent stages. This is not convenient and could practically cause severe problem. This disadvantage is avoided for the filter of FIG. 11 because the optical rotator is insensitive of mechanical rotation around the rotator axis.

The spectral transmission of a filter shows the (relative) light intensity transmitted by the filter as a function of the wavelength $\lambda$. A filter transmits light in accordance with its transmission curve. For example, a filter transmits light without any loss at wavelengths where the transmission peaks are and blocks light at wavelength where the transmission is equal or approximately equal to zero.

As an example, FIG. 12 presents measured spectral transmission of a two-stage filter in the wavelength range of 400 to 700 nm, which was constructed in accordance with the arrangement of FIG. 11 for n=2. The filter used two commercially available optical rotators (CASIX Corporation, Chatsworth, USA) with their rotation equal to 45° and 90° at the wavelength 1064 nm, respectively, and three linear polarizers (HN38S, Meadowlark Optics, Longmont, USA). The operating spectral range of the polarizers is 400–700 nm. The rotation angles of the two optical rotators were in opposite senses so that there were the ratios of $\rho_1(\lambda):\rho_2(\lambda) = (P_2-P_1):(P_3-P_2)=1:-2$. In FIG. 12$a$, the measured spectral transmission of the filter for $\psi=0°$ and $\psi=15°$ ($\psi=P_2-P_1$) are shown with the curve for $\psi=0°$ compared with its fit calculated according to the theory. The measured spectral transmission curves of the filter for $\psi=30°$, $\psi=45°$, $\psi=90°$ and $\psi=135°$ are presented in FIG. 12$b$ and FIG. 12$c$.

For the embodiment of FIG. 11, it is also preferable to use Faraday rotators, to which magnetic fields are respectively applied, as the polarization rotators $50_1, 50_2, 50_3, \ldots, 50_n$. The rotator thickness of the Faraday rotators and the applied magnetic fields are chosen such that the rotation angles $\rho_{f1}(\lambda), \rho_{f2}(\lambda), \rho_{f3}(\lambda), \ldots, \rho_{fn}(\lambda)$ preferably are in the ratios of $1:2:4:8:\ldots:2^{n-1}$ disregarding the rotation sense. The multiple-stage filter of FIG. 11 using Faraday rotators has its spectral transmission profile determined by the Faraday rotation angles and the filter can be electrically tunable by simultaneously changing the magnetic fields applied to the rotators such that the rotation angles are synchronously adjusted with their ratios remaining unchanged. The filter is further tunable, by mechanically rotating the polarizers $49_2, 49_3, \ldots, 49_{n+1}$, each relative to its immediately preceding polarizer, with the ratios of their azimuths remaining unchanged. This feature enables a compensation for the electric tuning. The polarizers $49_2, 49_3, \ldots, 49_{n+1}$ can be aligned preferably either parallel or perpendicular to the entrance polarizer $49_1$, i.e. $\psi=0°$ or $\psi=90°$ when no mechanical tuning is used. This makes the filter installation simple and is desired in many applications of the filter. The spectral transmission of the n-stage filter of FIG. 11 using Faraday rotators is written as $$I_n = \begin{cases} \cos^2\rho_{f1}(\lambda)\cos^2 2\rho_{f1}(\lambda)\cos^2 4\rho_{f1}(\lambda) \cdots \cos^2 2^{n-1}\rho_{f1}(\lambda), & \Psi = 0° \\ \sin^2\rho_{f1}(\lambda)\cos^2 2\rho_{f1}(\lambda)\cos^2 4\rho_{f1}(\lambda) \cdots \cos^2 2^{n-1}\rho_{f1}(\lambda), & \Psi = 90° \end{cases} \quad (16a, b)$$

The filter of FIG. 11 using Faraday rotators functions also in the reflection mode. For example, for $\psi=0°$ the transmission of the filter in the reflection mode is $$I_n = \cos^4\rho_{f1}(\lambda)\cos^4 2\rho_{f1}(\lambda) \cdots \cos^4 4\rho_{f1}(\lambda) \cdots \cos^4 2^{n-1}\rho_{f1}(\lambda). \quad (17)$$

The filter of FIG. 11 using Faraday rotators can further be electrically switchable with the magnetic fields applied to the Faraday rotators simultaneously turned on and off. With the polarizers $49_2, 49_3, \ldots, 49_{n+1}$ oriented parallel to the entrance polarizer $49_1$ ($\psi=0°$), the filter acts as a switch fully transmitting light when being unswitched and its transmission in two switched states is described by $$I_n = \begin{cases} 1 & \text{Unswitched} \\ \cos^2\rho_{f1}(\lambda)\cos^2 2\rho_{f1}(\lambda)\cos^2 4\rho_{f1}(\lambda) \cdots \cos^2 2^{n-1}\rho_{f1}(\lambda) & \text{Switched} \end{cases} \quad (18a)$$

So that the filter works in the off-state when being unswitched, the polarizer $49_2$ is oriented to be perpendicular to the entrance polarizer $49_1$, i.e. $\psi=90°$, while the other polarizers $49_3, 49_4, \ldots, 49_{n+1}$ may parallel or perpendicular to it. The transmission of the filter in this case is $$I_n = \begin{cases} 0 & \text{Unswitched} \\ \sin^2\rho_{f1}(\lambda)\cos^2 2\rho_{f1}(\lambda)\cos^2 4\rho_{f1}(\lambda) \cdots \cos^2 2^{n-1}\rho_{f1}(\lambda) & \text{Switched} \end{cases} \quad (18b)$$

The filter of FIG. 11 using Faraday rotators can further function as a one-direction device. For this purpose, the polarizer $49_2$ is preferably aligned to make an angle of 45° relative to the polarizer $49_1$, i.e. $|\psi|=45°$. The other polarizers are oriented such that the polarizer $49_3$ is perpendicular to the polarizer $49_2$, i.e. $P_3-P_2=90°$ or $P_3-P_2=-90°$, and the subsequent polarizers are parallel to the polarizer $49_3$. This means, for example, that relative to the entrance polarizer $49_1$ ($P_1=0°$), there will be $P_3=P_4=P_5\ldots=P_n=P_{n+1}=135°$ for $P_2=45°$ or $P_3=P_4=P_5\ldots=P_n=P_{n+1}=45°$ for $P_2=-45°$. The round trip transmission of the filter of FIG. 11 when working as a one-way device is $$I_{nr} = \cos^2(45° + \rho_{f1}(\lambda))\cos^2(45° - \rho_{f1}(\lambda))\cos^2 2(45° + \rho_{f1}(\lambda)) \times \cos^2 2(45° - \rho_{f1}(\lambda))\cos^4 4\rho_{f1}(\lambda) \cdots \cos^4 2^{n-1}\rho_{f1}(\lambda). \quad (19)$$

FIG. 13 presents the calculated round trip transmission curves of a single-stage Faraday filter of FIG. 7 and two multiple-stage Faraday filters, in accordance with the embodiment of FIG. 11 for n=2 and n=3, respectively, versus light wavelength $\lambda$ over the spectral range 500–650 nm. The round trip transmission curves $I_{1r}(\lambda)$, $I_{2r}(\lambda)$ and $I_{3r}(\lambda)$ (FIG. 13$a$) are compared with the forward transmission curves $I_1(\lambda)$, $I_2(\lambda)$ and $I_3(\lambda)$ (FIG. 13$b$). In the calculation, the Faraday rotators made of TGG (terbium Gallium Garnet) crystals were assumed. As required in current applications, the data of the Verdet constant for Faraday rotator glasses are available only for a few single wavelengths, e.g. V=0.75-0.46-0.12 min/Oe.cm at 500-633-1060 nm for TGG glass (e.g. IMPEX-HIGH-TECH Inc. Rheine, Germany). They could not be used for calculation of sufficient details of a spectral transmission profile required here. For this reason, the wavelength dependence of the Verdet constant of TGG glass was approximately fitted based on the data available. According to the fitting result, the Verdet constant V in the simulated calculation, with this the Faraday rotations $\rho_{f1}(\lambda)$, $\rho_{f2}(\lambda)=2\rho_{f1}(\lambda)$ and $\rho_{f3}(\lambda)=4\rho_{f1}(\lambda)$, was assumed to be inversely proportional to the square of wavelength $\lambda$ over the spectral range. This assumption does not affect the validity and generality of the calculated results and will be made also for the calculations below, in which Faraday rotators of TGG glass are used. For the curves of FIG. 13, furthermore, it was assumed that the Faraday rotation $\rho_{f1}(\lambda)$ has a value equal to 90° at $\lambda=1336.8$ nm so that the curves $I_1(\lambda)$, $I_2(\lambda)$ and $I_3(\lambda)$ have their principal maximum at 570 nm (FIG. 13$b$). As calculated, the round trip transmission curves $I_{1r}(\lambda)$, $I_{2r}(\lambda)$ and $I_{3r}(\lambda)$ have the maximum values respectively equal to 0.2499, 0.0365 and 0.0084, i.e. the minimum extinction ratios, expressed by 10*Log( ), of −6.0 dB, −14.3 dB and −20.8 dB. For the filter of FIG. 11, when the number n of individual stages increases, the maximum leaked intensity of the round trip transmission $I_{nr}(\lambda)$ (n>3) further decreases. As calculated, the maximum values of $I_{4r}(\lambda)$, $I_{5r}(\lambda)$ and $I_{6r}(\lambda)$ are respectively equal to 0.00210, 0.00051 and 0.00013 (the minimum extinction ratios: −26.8 dB, −32.9 dB and −38.9 dB).

Figure 14:
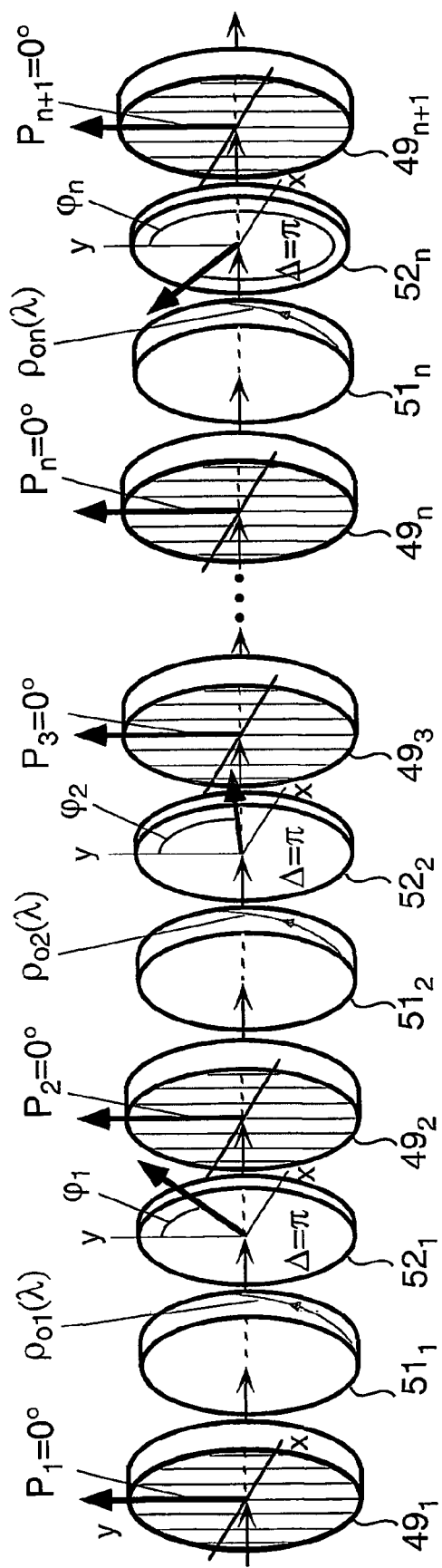
FIG. 14 depicts an n-stage (n=2, 3, 4, . . . ) tunable filter of the invention with each stage containing an optical rotator in combination with a half-wave retarder between polarizers in accordance with the embodiment of FIG. 8.

FIG. 14 schematically shows another n-stage (n=2, 3, 4, . . . ) filter of the present invention, which comprises an entrance polarizer $49_1$ ($P_1$=0°), n dispersive optical rotators $51_1$, $51_2$, $51_3$, . . . , $51_n$ (rotation angles: $\rho_{o1}(\lambda)$, $\rho_{o2}(\lambda)$, $\rho_{o3}(\lambda)$, . . . , $\rho_{on}(\lambda)$), n half-wave retarders $52_1$, $52_2$, $52_3$, . . . , $52_n$ and n subsequent polarizers $49_2$, $49_3$, . . . , $49_{n+1}$ (azimuth: $P_2$, $P_3$, . . . , $P_{n+1}$). They are arranged in series to form n stages, each containing an optical rotator and a half-wave retarder in accordance with the arrangement of FIG. 8. The optical rotators $51_1$, $51_2$, $51_3$, . . . , $51_n$ preferably are quartz rotators and have their rotation angles in the ratios of 1:2:4:8: . . . :$2^{n-1}$ disregarding the rotation sense, i.e. $|\rho_{o1}(\lambda)|:|\rho_{o2}(\lambda)|:|\rho_{o3}(\lambda)|: \ldots :|\rho_{on}(\lambda)|=1:2:4: \ldots :2^{n-1}$. For the embodiment of FIG. 14, the polarizers $49_2$, $49_3$, . . . , $49_{n+1}$ are oriented parallel to the polarizer $49_1$, i.e. $P_2$=0°. $P_3$=0°, . . . , $P_{n+1}$=0°. The half-wave retarders $52_1$, $52_2$, $52_3$, . . . , $52_n$ preferably are achromatic over the wavelength range of the filter and rotatable about the beam axis. They are positioned respectively behind (as in FIG. 14) or before the rotators $51_1$, $51_2$, $51_3$, . . . , $51_n$ and oriented, each relative to its preceding polarizer, with their orientation angles $\phi_1$, $\phi_2$, $\phi_3$, . . . , $\phi_1$ in the same ratios as those of their immediately preceding rotation angles, i.e. $\phi_1:\phi_2:\phi_3: \ldots : \phi_n = \rho_{o1}(\lambda):\rho_{o2}(\lambda):\rho_{o3}(\lambda): \ldots :\rho_{on}(\lambda)$. The light intensity $I_n=I_n(\lambda)$ transmitted by the filter of FIG. 14 can be calculated based on Equation (11) and it is found to be $$I_n = \cos^2(\rho_{o1}+2\phi_1)\cos^2 2(\rho_{o1}+2\phi_1)\cos^2 4(\rho_{o1}+2\phi_1) \ldots \cos^2 2^{n-1}(\rho_{o1}+2\phi_1). \quad (20)$$

The filter of FIG. 14 is of the Lyot structure with the basic spectral transmission profile determined by the rotation angles of the optical rotators, which are dispersive and in the ratios of 1:2:4:8: . . . :$2_{n-1}$ disregarding the rotation sense. The single stages of this filter are separated by the intermediate polarizers, which may remain stationary. The filter is tunable by simultaneously rotating the retarders $52_1$, $52_2$, $52_3$, . . . , $52_n$ relative to the entrance polarizer $49_1$ with the ratios of their orientation angles remaining unchanged. It is also considerable to tune the filter by rotating the polarizers $49_2$, $49_3$, . . . , $49_{n+1}$ with their azimuths, each relative to its preceding polarizer, in the same ratios of those of the rotation angles and remaining unchanged.

Figure 15:
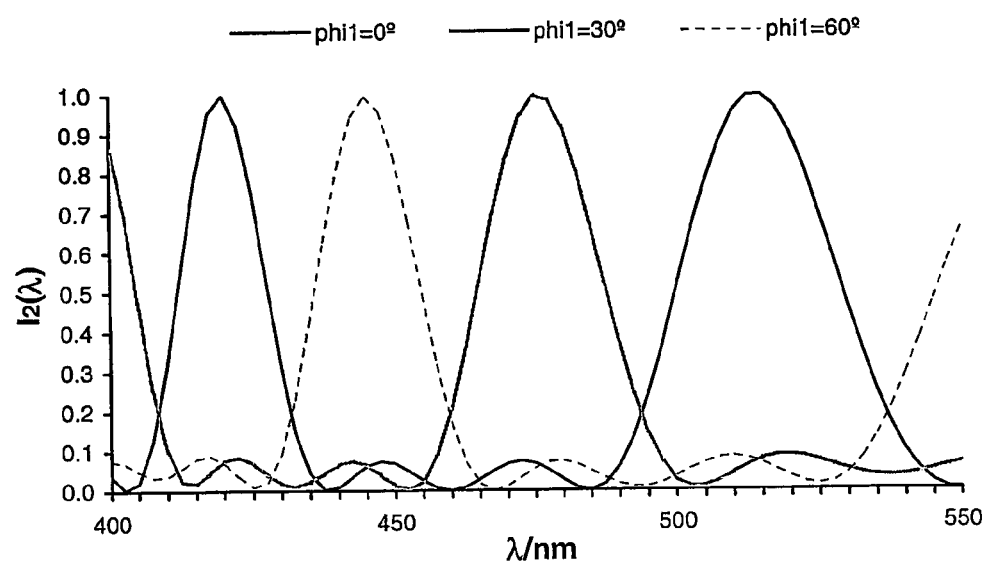
FIG. 15 is a graph showing a set of calculated tuned transmission profiles $I_2(\lambda)$ of a two-stage spectral filter in accordance with the embodiment of FIG. 14 for n=2 for tuning angles $\phi_1=0°$, $\phi_1=30°$ and $\phi_1=60°$ versus light wavelength $\lambda$ when using zero-order waveplates.

The tuning of the filter of FIG. 14 can be mechanical or electric depending on the retarders to be used, which are selected preferably from birefringent retarders and electrically rotatable LC retarders. For the mechanical tuning, it is desirable to use birefringent retarders, including achromatic and zero-order waveplates. As an example, FIG. 15 presents the calculated tuned spectral transmission $I_2(\lambda)$ of a two-stage filter, in accordance with the embodiment of FIG. 14 for n=2, using two quartz rotators and two identical zero-order half-wave plates for $\phi_1$=0°, $\phi_1$=30° and $\phi1$=60° over the spectral range 400–550 nm. The quartz rotators have the rotation angles assumed to be proportional to the square of the wavelength $\lambda$. This assumption will be made also for the calculations below, in which quarts rotators are used. The zero-order waveplates are assumed to have the retardation equal to 180° at $\lambda$=463 nm, which is dispersive as described by Equation (2). Compared with a polarizer-fixed Lyot n-stage tunable filter of the prior art, the filter of FIG. 14 requires n achromatic quarter-wave plates less than the former.

For the filter of FIG. 14, it is preferable to use equivalent electrically rotatable LC retarders if the electric tuning is desired. The LC retarders are oriented such that their zero-field orientation angles $\phi_{off1}$, $\phi_{off2}$, $\phi_{off3}$, . . . , $\phi_{offn}$ relative to the entrance polarizer $49_1$, are in the same ratios as those of the rotation angles, i.e. $\phi_{off1}:\phi_{off2}:\phi_{off3}: \ldots :\phi_{offn} = \rho_{o1}(\lambda):\rho_{o2}(\lambda):\rho_{o3}(\lambda): \ldots :\rho_{on}(\lambda)$. As they are switched, their optic axes are rotated and the control voltages are chosen such that their rotated angles $\phi_{lc1}$, $\phi_{lc2}$, $\phi_{lc3}$, . . . , $\phi_{lcn}$ are also in the same ratios as those of the rotation angles, i.e. $\phi_{lc1}:\phi_{lc2}:\phi_{lc3}: \ldots :\phi_{lcn} = \rho_{o1}(\lambda):\rho_{o2}(\lambda):\rho_{o3}(\lambda): \ldots :\rho_{on}(\lambda)$. The filter of FIG. 14 when using electrically rotatable LC retarders has its spectral profile determined by the optical rotation angles and the filter is electrically tunable by simultaneously rotating the LC retarders, with the ratios of their orientation angles remaining unchanged. The tuning may be either continuous or discrete depending on whether continuously or discretely rotatable LC retarders are used. The filter of FIG. 13 using electrically rotatable LC retarders can further be mechanically tunable, if so desired, by simultaneously rotating the LC retarders with the ratios of their orientation angles remaining unchanged.

FIG. 16 schematically illustrate a further n-stage filter of the present invention, which comprises an entrance polarizer $49_1$($P_1$=0°), n dispersive optical rotators $51_1$, $51_2$, $51_3$, . . . , $51_n$ (rotation angles: $\rho_{o1}(\lambda)$, $\rho_{o2}(\lambda)$, $\rho_{o3}(\lambda)$, . . . , $\rho_{on}(\lambda)$), n active polarization rotators $53_1$, $53_2$, $53_3$, . . . , $53_n$ (rotation angles: $\rho_{a1}$, $\rho_{a2}$, $\rho_{a3}$, . . . , $\rho_{an}$) and n subsequent polarizers $49_2$, $49_3$, . . . , $49_{n+1}$ (azimuth: $P_2$, $P_3$, . . . , $P_{n+1}$). They are arranged in series to form n stages, each containing an optical rotator and an active polarization rotator in accordance with the arrangement of FIG. 9. The optical rotators $51_1$, $51_2$, $51_3$, . . . , $51_n$ preferably are quartz rotators, having their rotation angles in the ratios of 1:2:4:8: . . . :$2^{n-1}$ disregarding the rotation sense, i.e. $|\rho_{o1}(\lambda)|:|\rho_{o2}(\lambda)|:|\rho_{o3}(\lambda)|: \ldots :|\rho_{on}(\lambda)|=1:2:4: \ldots :2^{n-1}$. The active polarization rotators $53_1$, $53_2$, $53_3$, . . . , $53_n$ preferably are Faraday rotators or proper LC polarization rotators, e.g. twisted-nematic polarization rotators, with their rotation angles in the same ratios as those of their immediately preceding passive rotation angles. For the embodiment of FIG. 16, the polarizers $49_2$, $49_3$, . . . , $49_{n+1}$ are oriented such that polarizer azimuths $P_2$-$P_1$, $P_3$-$P_2$, $P_4$-$P_3$, . . . , and $P_n$-$P_{n-1}$ are in the same ratios of the optical rotation angles. The spectral transmission of the n-stage filter of FIG. 16 can be calculated based on Equation (12) and for $P_2$-$P_1=\psi$ it is found to be $$I_n = \cos^2(\rho_{o1}(\lambda)+\rho_{a1}+\psi)\cos^2 2(\rho_{o1}(\lambda)+\rho_{a1}+\psi)\cos^2 4(\rho_{o1}(\lambda)+\rho_{a1}+\psi) \ldots \cos^2 2^{n-1}(\rho_{o1}(\lambda)+\rho_{a1}+\psi). \quad (21)$$

The filter of FIG. 16 is of the Lyot geometry and possesses the all features of the filter 9. The spectral profile $I_n(\lambda)$ of the filter of FIG. 16 when using Faraday rotators is determined by the optical rotations and Faraday rotations. The filter is electrically tunable by adjusting the magnetic fields applied to the Faraday rotators to simultaneously change the Faraday rotation angles with their ratios remaining unchanged. The filter can function also as a one-way device. For this purpose, it is desirable to choose passive optical rotators with their rotation angles similar to or ideally equal to the Faraday rotation angles, respectively, such that the round trip transmission of the filter approaches the minimum depending on agreement between the rotation angles $\rho_{o1}(\lambda)$ and $\rho_{f1}(\lambda)$. The polarizers $49_2$, $49_3$, $49_{n+1}$ are aligned, relative to the entrance polarizer $49_1$, to satisfy the condition $P_2=45°$ and $P_3=P_4=\ldots=P_n=P_{n+1}=-45°$.

For the embodiment of FIG. 16 it is also preferable to use LC polarization rotators, e.g. twisted-nematic LC polarization rotators, as the active polarization rotators $53_1$, $53_2$, $53_3$, ..., $53_n$. The twisted-nematic LC rotators produce no rotation when appropriate control voltages are applied and they have their rotation angles equal to $\rho_{lc1}$, $\rho_{lc2}$, $\rho_{lc3}$, ..., $\rho_{lcn}$, respectively, when they are unswitched such that $\rho_{lc1}:\rho_{lc2}:\rho_{lc3}:\ldots:\rho_{lcn}=\rho_{o1}(\lambda):\rho_{o2}(\lambda):\rho_{o3}(\lambda):\ldots:\rho_{on}(\lambda)$. For $P_2-P_1=\psi$, the spectral transmission of the n-stage filter of FIG. 16 when using twisted-nematic LC polarization rotators is given by $$I_n = \begin{cases} \cos^2(\rho_{o1}(\lambda)+\rho_{lc1}+\Psi)\cos^2 2(\rho_{o1}(\lambda)+\rho_{lc1}+\Psi)\cdots\cos^2 2^{n-1}(\rho_{o1}(\lambda)+\rho_{lc1}+\Psi) & \text{Unswitched} \\ \cos^2(\rho_{o1}(\lambda)+\Psi)\cos^2 2(\rho_{o1}(\lambda)+\Psi)\cdots\cos^2 2^{n-1}(\rho_{o1}(\lambda)+\Psi) & \text{Switched} \end{cases} \quad (22)$$

The spectral profile $1_n(\lambda)$ of the filter of FIG. 16 when using twisted-nematic LC polarization rotators is determined by the passive optical rotations. The filter can be discretely tuned in two states by simultaneously switching or unswitching the LC polarization rotators. In addition, the filter is capable of mechanically tuning, by simultaneously rotating the polarizers $49_2$, $49_3$, ..., $49_{n+1}$ with the ratios of their azimuths remaining unchanged or such that they are parallel to the polarizer $49_1$.

FIG. 17 schematically illustrates a further n-stage filter of the invention, comprising n+1 polarizers $49_1$, $49_2$, $49_3$, ..., $49_{n+1}$ ($P_1$, $P_2$, $P_3$, ..., $P_{n+1}$), n variable retarders $55_1$, $55_2$, $55_3$, ..., $55_n$ and 2n optical rotators $51_1$, $51_2$, $51_3$, ..., $51_n$ ($\rho_{o1}(\lambda)$, $\rho_{o2}(\lambda)$, $\rho_{o3}(\lambda)$, ..., $\rho_{on}(\lambda)$) and $54_1$, $54_2$, $54_3$, ..., $54_n$ ($-\rho_{o1}(\lambda)$, $-\rho_{o2}(\lambda)$, $-\rho_{o3}(\lambda)$, ..., $-\rho_{on}(\lambda)$). They are arranged to form n single stages in series, each in accordance with the arrangement of FIG. 10. The optical rotators $51_i$ and $54_i$ (i=2, 3, 4, ...) in each stage have equal and opposite rotation angles, i.e. $\rho_i(\lambda)=-\rho_i(\lambda)$. The rotation angles $\rho_{o1}(\lambda)$, $\rho_{o2}(\lambda)$, $\rho_{o3}(\lambda)$, ..., $\rho_{on}(\lambda)$ preferably are in the ratios of 1:2:4:8: ... :$2^{n-1}$ disregarding the rotation sense over the wavelength range of the filter. The polarizers $49_2$, $49_3$, ..., $49_{n+1}$ are oriented preferably parallel to the entrance polarizer $49_1$. i.e. $P_1=0°$, $P_2=0°$, $P_3=0°$, ..., and $P_{n+1}=0°$. The retarders $55_1$, $55_2$, $55_3$, ..., $55_n$ are identical, each preferably a LC variable retarder, e.g. a nematic or homeotropically aligned nematic LC cell, whose retardation is variable by application of a control voltage. They are operated to have the retardation switchable between two states $\Delta_{off}$ and $\Delta_{on}$, in which the retardation is equal or approximately equal to 0° and 180°, respectively, over the wavelength range of the filter. The retarders $55_1$, $55_2$, $55_3$, ..., $55_n$ are oriented to have the orientation angles of their optic axes (the switched state of non-zero retardation) ($\phi_{v1}$, $\phi_{v2}$, $\phi_{v3}$, ..., $\phi_{vn}$ in the same ratios as those of the rotation angles, i.e. $\phi_{v1}:\phi_{v2}:\phi_{v3}:\ldots:\phi_{vn}=\rho_{o1}(\lambda):\rho_{o2}(\lambda):\rho_{o3}(\lambda):\ldots:\rho_{on}(\lambda)$. The filter of FIG. 17 is electrically switchable by simultaneously operating the retarders $55_1$, $55_2$, $55_3$, ..., $55_n$ with their retardation synchronously switched between $\Delta_{off}$ and $\Delta_{on}$. Based on the Equation (14), the spectral transmission $I_n=I_n(\lambda)$ of the n-stage filter of FIG. 17 can be written as $$I_n = \begin{cases} 1 & \text{Off-State} \\ \cos^2 2(\rho_{o1}(\lambda)+\varphi_{v1})\cos^2 4(\rho_{o1}(\lambda)+\varphi_{v1})\cdots\cos^2 2^{n-1}(\rho_{o1}(\lambda)+\varphi_{v1}) & \text{On-State} \end{cases} \quad (23a)$$

The filter of FIG. 17 can block light in the off-state, when the polarizer $49_2$ is oriented perpendicular to the polarizer $49_1$, i.e. $P_2-P_1=90°$, and the subsequent polarizers $49_3$, ..., $49_{n+1}$ are parallel or perpendicular to it. For $P_1=0°$, $P_2=90°$, $P_3=0°$, ..., and $P_{n+1}=0°$, the spectral transmission $I_n$ becomes $$I_n = \begin{cases} 0 & \text{Off-State} \\ \sin^2 2(\rho_{o1}(\lambda)+\varphi_{v1})\cos^2 4(\rho_{o1}(\lambda)+\varphi_{v1})\cdots\cos^2 2^{n-1}(\rho_{o1}(\lambda)+\varphi_{v1}) & \text{On-State} \end{cases} \quad (23b)$$

The filter of FIG. 17 works as a switch by electrically simultaneously switching the LC variable retarders. The spectral transmission of the filter (the switched state) can further be tuned by mechanically rotating the LC retarders to simultaneously change their orientation angles with their ratios remaining unchanged. It is obvious that the LC retarders $55_1$, $55_2$, $55_3$, ..., $55_n$ can be replaced by equivalent phase modulators such as electro-optical, photo-elastic and magnetic modulators.

The present invention further provides tunable spectral filters developed based on the tuners of FIG. 6, which employ no intermediate polarizer. A common feature of the lossless filters of the invention or the filters without intermediate polarizer is that they are basically mechanically tunable. They can further be electrically tunable or switchable when active components such as Faraday rotators or LC electrically rotatable or variable retarders are used. When using Faraday rotators, a filter of the invention can further function as a one-way tunable filter with the retarders properly oriented. In addition, a filter can further be electrically switchable with Faraday rotators if the filter's arrangement is invariant to a rotation of 180° about an axis perpendicular to the beam axis. For a filter having such arrangement, it can further become electrically switchable by using LC variable retarders operated as switch. Depending on the polarization rotators and retarders selected for use, thus a single filter arrangement of the invention below can generate several versions of filters, which operate in different tuning and/or switching mechanisms.

In the embodiments below, the basic arrangements of the lossless filters of the invention are described and they are designed to have broad blocking bands with narrow transmission peaks, which are desirable for traditional filtering applications. According to the invention, each of the filters can have its spectral transmission inverted by rotating the exit polarizer by 90° to work as a notch filter, which has broad transmission bands with narrow notches blocking the unwanted wavelengths and is useful especially in the areas such as telecommunication and color display. The spectral transmission of a notch filter is equal to one minus the transmission of its initial filter, i.e. the inverse of the latter, so that the notch filter tunably transmits and blocks light at wavelengths where the initial filter blocks and transmits light, respectively. A notch filter has the all features as its initial filter has, except the inverted transmission, with the constituent elements to be selected preferably in the same way as the initial filter.

FIG. 18 schematically illustrates the arrangement of a tunable spectral filter of the present invention without intermediate polarizer, which employs two retarder-tuners in accordance with the embodiment of FIG. 6c. The filter comprises an entrance polarizer 61 ($P_1$=45°), a first polarization rotator 62 (−ρ(λ)), a first retarder 63 (Δ, −φ), a second polarization rotator 64 (2ρ(λ)), a second retarder 65 (Δ, φ), a third polarization rotator 66 (−ρ(λ)) and an exit polarizer 67 ($P_2$=45°). They are arranged in cascade along a light beam axis with their axis orientations as specified in FIG. 18. The polarizers 61 and 67 are parallel oriented, having the axes at an angle of 45° relative to a selected reference axis, say the y-axis. The polarization rotators 62, 64, and 66 have their rotation angles −ρ(λ), 2ρ(λ) and −ρ(λ) in the ratios of 1:−2:1 and they may be optical rotators, each a quartz optical rotator for instance, or Faraday rotators or other equivalents. The rotators 62 and 66 are identical and their rotation angles are in the opposite sense to that of the rotator 64. Two optical rotators whose rotation angles are in opposite senses can be manufactured by using dextro- are laevo-rotatory quartz, respectively. The sense of a Faraday rotation is governed by the direction of the magnetic field and therefore can be changed by changing the direction of the magnetic field. The retarders 63 and 65 are identical, having the retardation Δ equal or approximately equal to a predetermined value selected preferably between 80° and 115° over the wavelength range of the filter or more generally, valued such that the condition 80°≦Δ≦150° is satisfied. The rotator 64 is equivalent to two identical cascaded polarization rotators, each having the rotation angle ρ(λ). Thus, the combination of the rotators 62, 64, and 66 and the retarders 63 and 65 is equivalent to a series connection of two retarder-tuners 68 and 69 according to the embodiment of FIG. 6c having identical retardation Δ and their orientation angles respectively equal to −(ρ(λ)+φ) and (ρ(λ)+φ). By means of the Mueller matrix formulation, the relative light intensity $I_2=I_2$(λ) transmitted by the filter of FIG. 18 can be expressed and calculated as given by $$I_2 = \frac{1}{2}\begin{bmatrix}1\\0\\1\\0\end{bmatrix}^{-1} \tag{24}$$

$$\begin{bmatrix} 1 & 0 & 0 & 0 \\ 0 & \cos 4(\rho+\varphi)\sin^2\frac{\Delta}{2}+\cos^2\frac{\Delta}{2} & \sin 4(\rho+\varphi)\sin^2\frac{\Delta}{2} & -\sin 2(\rho+\varphi)\sin\Delta \\ 0 & \sin 4(\rho+\varphi)\sin^2\frac{\Delta}{2} & \cos^2\frac{\Delta}{2}-\cos 4(\rho+\varphi)\sin^2\frac{\Delta}{2} & \cos 2(\rho+\varphi)\sin\Delta \\ 0 & \sin 2(\rho+\varphi)\sin\Delta & -\cos 2(\rho+\varphi)\sin\Delta & \cos\Delta \end{bmatrix}$$

$$\begin{bmatrix} 1 & 0 & 0 & 0 \\ 0 & \cos 4(\rho+\varphi)\sin^2\frac{\Delta}{2}+\cos^2\frac{\Delta}{2} & -\sin 4(\rho+\varphi)\sin^2\frac{\Delta}{2} & \sin 2(\rho+\varphi)\sin\Delta \\ 0 & -\sin 4(\rho+\varphi)\sin^2\frac{\Delta}{2} & \cos^2\frac{\Delta}{2}-\cos 4(\rho+\varphi)\sin^2\frac{\Delta}{2} & \cos 2(\rho+\varphi)\sin\Delta \\ 0 & -\sin 2(\rho+\varphi)\sin\Delta & -\cos 2(\rho+\varphi)\sin\Delta & \cos\Delta \end{bmatrix}$$

$$\begin{bmatrix}1\\0\\1\\0\end{bmatrix} = \left[1+4\sin^2\frac{\Delta}{2}\cos^2 2(\rho(\lambda)+\varphi)\left(\sin^2\frac{\Delta}{2}\cos^2 2(\rho(\lambda)+\varphi)-1\right)\right].$$

Because of the dispersion of the rotation angle $\rho=\rho(\lambda)$, the transmission $I_2=I_2(\lambda)$ described by Equation (24) shows a wavelength-dependent profile. The transmission $I_2(\lambda)$ is tunable by simultaneously rotating the retarders 63 and 65, relative to the entrance polarizer 61, with their axes keeping symmetrical about the axis y, i.e. to change the angle $\phi$ in Equation (24), and further tunable by varying the rotation angles of the rotators 62, 64, and 66 with their ratios of 1:−2:1 remaining unchanged, i.e. to vary the parameter $\rho(\lambda)$ in Equation (24). When the exit polarizer 67 is rotated by 90° from its orientation shown in FIG. 18, i.e. $P_2=-45°$, the filter becomes a notch filter with its spectral transmission $I_{2notch}(\lambda)$ equal to $1-I_2(\lambda)$ where $I_2(\lambda)$ is described by Equation (24). The transmission $I_2(\lambda)$ in Equation (24) is also a function of the parameter $\Delta$. For $\Delta=90°$, from Equation (24) the light intensity $I_2$ transmitted by the filter of FIG. 18 is $$I_2=\sin^4 2(\rho(\lambda)+\phi) \quad (25)$$

Figure 19:
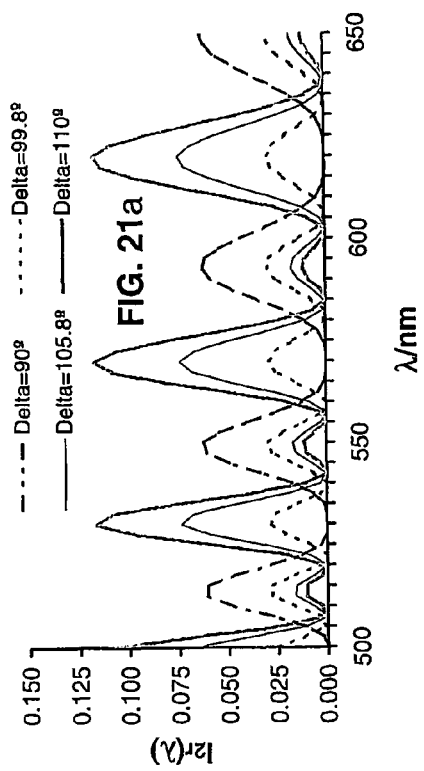
FIG. 19 is a graph showing a set of calculated transmission profiles $I_2(\lambda)$ of a spectral filter in accordance with the embodiment in FIG. 18 for the retardation $\Delta=80°$, $\Delta=90°$, $\Delta=105.8°$, $\Delta=110°$ and $\Delta=115°$, respectively, versus light wavelength $\lambda$.

Equation (25) exactly describes the transmission of a standard Šolc two-plate filter having its basic profile determined by the rotation angle $\rho=\rho(\lambda)$ and a phase shift equal to the angle $\phi$. FIG. 19 presents a set of calculated transmission curves $I_2(\lambda)$ according to Equation (24) for $\phi=0°$ for $\Delta=80°$, $\Delta=90°$, $\Delta=105.8°$, $\Delta=110°$ and $\Delta=150°$, respectively, in the wavelength range of 400–550 nm. As shown, the transmission $I_2(\lambda)$ of the filter of FIG. 18 for $\Delta=90°$ is equivalent to that of a standard Šolc two-plate filter. The bandwidth of the main transmission peaks of $I_2(\lambda)$ is narrowed when the $\Delta$ value goes up from 90° and a sidelobe appears between two main peaks, whose amplitude increases as the $\Delta$ value increases. Provided the value for $\Delta$ is not too high, for example not larger than about 115°, the sidelobe amplitude will be controlled in a technically acceptable arrange. For $\Delta=105.8$ for example, the amplitude of the sidelobe becomes as large as that of a standard two-stage Lyot type filter. It is flexible to choose the value for $\Delta$ to provide modified filters equivalent to the standard Šolc type two-plate filter to better meet requirements of different applications. For the transmission spectrums given in FIG. 19, the rotators 62, 64, and 66 are assumed to be quartz optical rotators with the rotation angle $\rho(\lambda)=90°$ at $\Delta=800$ nm. As a calculation confirmed, the profiles $I_2(\lambda)$ are tunable by simultaneously rotating the retarders 63 and 65 to change the angle $\phi$ or by varying the rotation angles of the rotators with the ratios of the rotation angle remaining unchanged.

Figure 20:
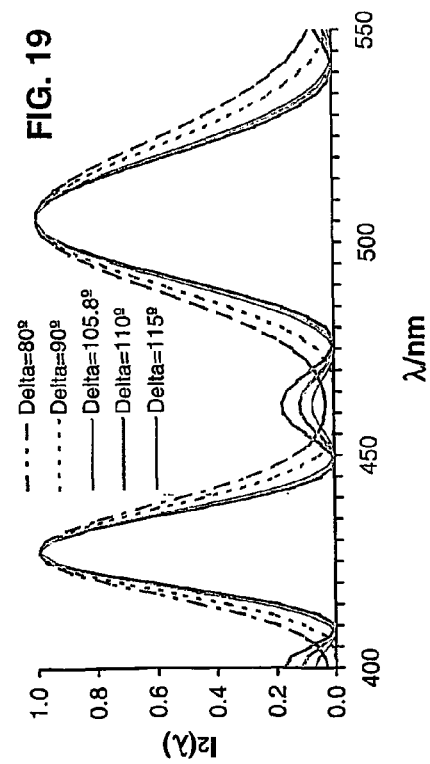
FIG. 20 is a graph showing a set of calculated tuned transmission profiles $I_2(\lambda)$ of a spectral filter in accordance with the embodiment in FIG. 18 for tuning angles $\phi=0°$, $\phi=30°$ and $\phi=60°$ when using zero-order waveplates versus light wavelength $\lambda$.

For the embodiment of FIG. 18, the polarization rotators 62, 64, and 66 are selected preferably from optical rotators and Faraday rotators and the suitable candidates for the retarders 63 and 65 include birefringent retarders, LC electrical rotatable retarders and LC variable retarders. The filter of FIG. 18 is mechanically tunable and can be further electrically tunable, electro-magnetically tunable and/or one-way tunable, or electrically switchable, depending on the polarization rotators and retarders selected for use. If only the mechanical tuning is desired, it is preferable to use quartz optical rotators as the rotators 62, 64, and 66 and birefringent retarders as the retarder 63 and 65. The filter can be tuned mechanically, by simultaneously rotating the birefringent retarders with their optic axes keeping symmetric about the reference axis. The birefringent retarders to be used preferably are achromatic with the retardation as required. Achromatic waveplates manufactured by the existing techniques usually are quarter-wave and half-wave plates. A birefringent achromatic waveplate having the retardation other than 90° or 180° can be manufactured by two or more birefringent plates in analog with the method reported by Beckers (Beckers, J. M. (1971) Appl. Opt. 10:973). Construction of a (mechanically) tunable Šolc two-plate filter according to the prior art requires at least four achromatic waveplates (using a double tuner of Carl F. Buhrer, which comprises four achromatic quarter-wave plates) and two birefringent plates. In comparison, the filter of FIG. 18 uses only two achromatic waveplates and three birefringent plates (quartz optical rotators). For some applications, where the wavelength range of the filter is not very broad and/or the requirement on the spectrum waveform or sidelobe suppression is not very high, it is desirable to use zero-order waveplates to replace the achromatic retarders. FIG. 20 presents a set of calculated tuned transmission curves $I_2(\lambda)$ of the filter of FIG. 18 when using two identical zero-order waveplates as the retarders 63 and 65 for $\phi=0°$, $\phi=30°$, and $\phi=60°$. The calculation in FIG. 20 is made under the same conditions as in FIG. 19 and the zero-order waveplates are assumed to have the retardation equal to 90° at $\lambda=503$ nm. As shown, in a moderately broad wavelength range, the waveform deformation of $I_2(\lambda)$ produced by using the zero-order waveplates is negligible or does not affect its practical use in applications such as color display and imaging and projection.

The filter of FIG. 18 is electrically tunable when using proper LC electrically rotatable retarders as the retarder 63 and 65, still with quartz optical rotators as the rotators 62, 64, and 66. The LC retarders are oriented with their optic axes symmetric about the reference axis. The filter is tunable by operating the LC retarders with their axes electrically rotated, keeping symmetric about the reference axis and further by mechanically rotating the LC retarders. The filter of FIG. 18 can further be electrically switchable when proper LC variable retarders are used as the retarders 63 and 65 and operated to have the retardation switchable between two alternative states. In one switched state, the variable retarders have the retardation equal or approximately equal to 0° over the spectral range of the filter. In the other state they have the retardation equal or approximately equal to a value selected preferably between 80° and 115°. In the zero retardation state, the variable retarders act as isotropic mediums so that the rotators 62, 64, and 66 are compensated for with each other and the filter will fully transmit light. In the non-zero retardation state, the filter has its spectral transmission described by Equation (24). The filter is electrically switchable by simultaneously switching the variable retarders and further tunable by mechanically rotating them with their optic axes remaining symmetric about the reference axis. For the filter of FIG. 18 when using variable retarders, an additional benefit obtained is that the bandwidth of its transmission peaks becomes adjustable by electrically varying the retardation of the variable retarders (ref. FIG. 19), preferably in a range roughly from 80° to 115°.

With equivalent Faraday rotators as the polarization rotators 62, 64, and 66, the filter of FIG. 18 will be electromagnetically tunable. The filter is electrically tunable by changing the magnetic flux density applied to the Faraday rotators to vary the Faraday rotation angles with their ratios of 1:−2:1 remaining unchanged. In this case, the retarders 63 and 65 preferably are achromatic or zero-order birefringent retarders, oriented respectively at $\phi$ and $-\phi$ with respect to the selected reference axis. The angle $\phi$ can be adjusted mechanically. The filter can further function as a one-direction device that transmits and tunably filters light in one direction and blocks the backward light. For such one-way device, it is preferable to have the retarders 63 and 65 stationary and oriented at $\phi=22.5°$ and $-\phi=-22.5°$, respectively. In this case, the round trip transmission $I_{2r}=I_{2r}(\lambda)$ of the filter is $$I_{2r} = \left[1 + 4\sin^2\frac{\Delta}{2}\cos^2 2(\rho_f(\lambda) + 22.5°)\right. \quad (26)$$

$$\left.\left(\sin^2\frac{\Delta}{2}\cos^2 2(\rho_f(\lambda) + 22.5°) - 1\right)\right] \times$$

$$\left[1 + 4\sin^2\frac{\Delta}{2}\cos^2 2(\rho_f(\lambda) - 22.5°)\left(\sin^2\frac{\Delta}{2}\cos^2 2(\rho_f(\lambda) - 22.5°) - 1\right)\right].$$

Figure 21A:
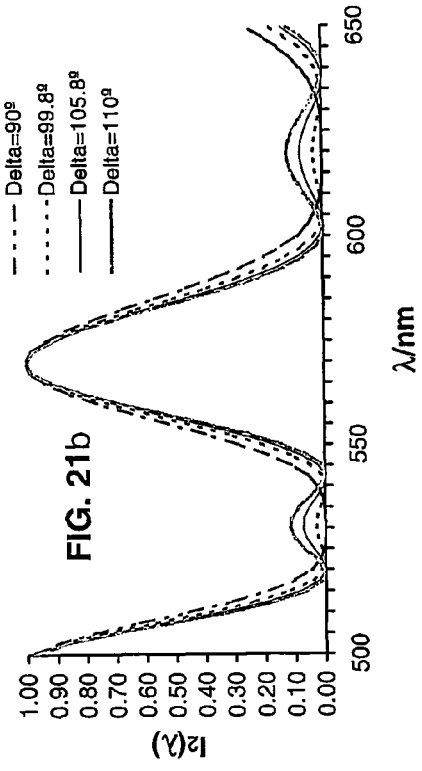
FIGS. 21a–21b, shows the calculated round trip transmission curves $I_{2r}(\lambda)$ of a one-direction filter using Faraday rotators in accordance with the embodiment of the invention in FIG. 18 versus light wavelength $\lambda$ as a function of the retardation $\Delta=90°$, $\Delta=99.8°$, $\Delta=105.8°$ and $\Delta=110°$ (FIG. 21a), compared with the forward transmission $I_2(\lambda)$ (FIG. 21b).
Figure 21B:
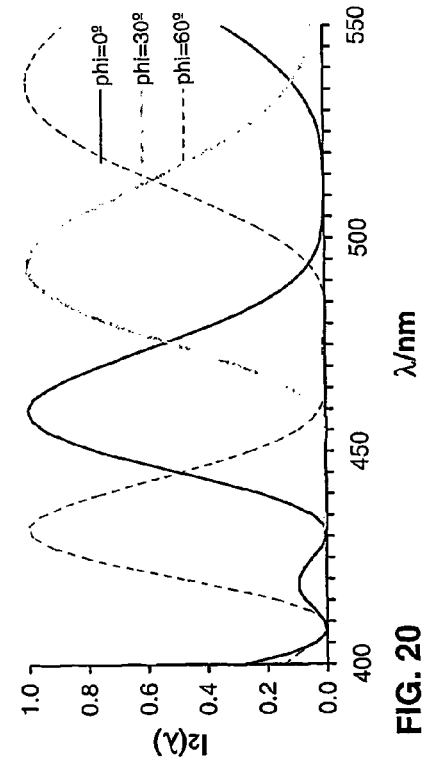

FIG. 21 presents the theoretical round trip transmission curves $I_{2r}(\lambda)$ of the filter of FIG. 18 when working as one-way device in the wavelength range of 500–650 nm calculated according to Equation (26). The two retarders of the filter are assumed to be achromatic, having the retardation $\Delta$, and the three Faraday rotators are assumed to be made of TGG glass with the Faraday rotation $\rho_f(\lambda)$ is assumed to be equal to 45° at $\lambda=1453$ nm. The round trip transmission curves $I_{2r}(\lambda)$ for $\Delta=90°$, $\Delta=99.8°$, $\Delta=105.8°$, and $\Delta=110°$ (FIG. 21a) are compared with the corresponding forward transmission curves $I_2(\lambda)$ (FIG. 21b) calculated according to Equation (24). For $\Delta=99.8°$, the isolation $I_{2r}(\lambda)$ reaches the optimal result with the maximum round trip transmission equal to 0.029 (minimum extinction: −15.4 dB).

FIG. 22 schematically illustrates the arrangement of another spectral filter of the present invention, which is equivalent to a lossless Lyot two-stage filter. The filter comprises an entrance polarizer 71 ($P_1=0°$), a first polarization rotator 72 ($\rho(\lambda)$), a first quarter-wave retarder 73 ($\Delta=90°$, $\phi_1$), a second polarization rotator 74 ($\rho(\lambda)$), a second quarter-wave retarder 75 ($\Delta=90°$, $\phi_2$), a third polarization rotator 76 ($-\rho(\lambda)$), and an exit polarizer 77 ($P_2$). They are arranged in cascade along a light beam axis with their axis orientations as specified. The rotators 72, 74, and 76 may be quartz optical rotators or Faraday rotators, having their dispersive rotation angles $\rho(\lambda)$, $\rho(\lambda)$ and $-\rho(\lambda)$ in the ratios of 1:1:−1 over the wavelength range of the filter. The retarders 73 and 75 preferably are achromatic or zero-order birefringent retarders. The rotator 74 can be considered equivalent to a series combination of rotations of $-\rho(\lambda)$ and $2\rho(\lambda)$, while the rotator 76 equivalent to a series combination of rotations of $-2\rho(\lambda)$ and $\rho(\lambda)$. Thus the combination of the rotators 72, 74, and 76 and the retarders 73 and 75 are equivalent to a series connection of two retarder-tuners 78 and 79 in accordance with the embodiment of FIG. 6c and a polarizer-tuner 80 as described by FIG. 6a. As specified, the tuners 78 and 79 have identical retardation $\Delta=90°$ and their orientation angles respectively equal to $\theta_1=\phi_1+\rho(\lambda)$ and $\theta_2=\phi_2+2\rho(\lambda)$, while the tuner 80 has its azimuth equal to $P_2+\rho(\lambda)$. Thus the light intensity $I_3=I_3(\lambda)$ transmitted by the filter of FIG. 22 is expressed and calculated as given by $$I_3 = \qquad (27)$$

$$\frac{1}{2}\begin{bmatrix} 1 \\ \cos 2(P_2+\rho(\lambda)) \\ \sin 2(P_2+\rho(\lambda)) \\ 0 \end{bmatrix}^{-1}\begin{bmatrix} 1 & 0 & 0 & 0 \\ 0 & \cos^2 2\theta_2 & \sin 2\theta_2\cos 2\theta_2 & -\sin 2\theta_2 \\ 0 & \sin 2\theta_2\cos 2\theta_2 & \sin^2 2\theta_2 & \cos 2\theta_2 \\ 0 & \sin 2\theta_2 & -\cos 2\theta_2 & 0 \end{bmatrix}$$

-continued $$\begin{bmatrix} 1 & 0 & 0 & 0 \\ 0 & \cos^2 2\theta_1 & \sin 2\theta_1\cos 2\theta_1 & -\sin 2\theta_1 \\ 0 & \sin 2\theta_1\cos 2\theta_1 & \sin^2 2\theta_1 & \cos 2\theta_1 \\ 0 & \sin 2\theta_1 & -\cos 2\theta_1 & 0 \end{bmatrix}\begin{bmatrix} 1 \\ 1 \\ 0 \\ 0 \end{bmatrix} =$$

$$\frac{1}{2}[1 + \cos 2(P_2 + \rho(\lambda) - \theta_2)\cos 2\theta_1\cos 2(\theta_2 - \theta_1) +$$

$$\sin 2\theta_1\sin 2(P_2 + \rho(\lambda) - \theta_2)].$$

The retarders 73 and 75 and the exit polarizer 77 are oriented, relative to the entrance polarizer 71 ($P_1=0°$), such that their orientation angles and azimuth are in the ratios of $\phi_1:\phi_2:P_2=1:2:1$, i.e. $\phi_2=2\phi_1$ and $P_2=\phi_1$, or $\phi_1:(\phi_2-90°):(P_2-90°)=1:2:1$, i.e. $\phi_2=90°+2\phi_1$ and $P_2=90°+\phi_1$. With $\theta_1=\rho(\lambda)+\phi_1$ and $\theta_2=2\rho(\lambda)+2\phi_1$ and for $\phi_2=\phi_1$ and $P_2=\phi_1$, Equation (27) is simplified as $$I_3 = \frac{1}{2}[1 + \cos^3 2(\rho(\lambda) + \varphi_1) - \sin^2 2(\rho(\lambda) + \varphi_1)] = \qquad (28a)$$

$$\cos^2(\rho(\lambda) + \varphi_1)\cos^2 2(\rho(\lambda) + \varphi_1),$$

$$\text{or for } \varphi_2 = 90° + 2\varphi_1 \text{ and } P_2 = 90° + \varphi_1$$

$$I_3 = \frac{1}{2}[1 - \cos^3 2(\rho(\lambda) + \varphi_1) - \sin^2 2(\rho(\lambda) + \varphi_1)] = \qquad (28b)$$

$$\sin^2(\rho(\lambda) + \varphi_1)\cos^2 2(\rho(\lambda) + \varphi_1).$$

The transmissions described by Equations (28a) and (28b) are identical to each other except that they are shifted by $\rho/2$ related to each other. Equations (28a) or (28b) exactly describes the transmission spectrum of a Lyot two-stage filter having its basic profile determined by the rotation angle $\rho=\rho(\lambda)$ with a phase shift equal to the angle $\phi_1$.

Figure 23A:
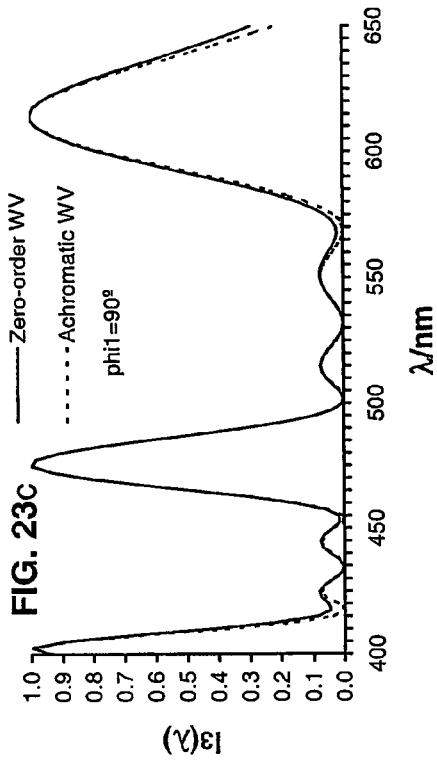
FIGS. 23a–23d, shows a set of calculated tuned transmission profiles $I_3(\lambda)$ of a filter in accordance with the embodiment in FIG. 22 when using zero-order waveplates (solid line) or achromatic quarter-wave plates (dotted line) for tuning angle ($\phi_1=0°$ (FIG. 23a), $\phi_1=45°$ (FIG. 23b), $\phi_1=90°$ (FIG. 23c) and $\phi_1=135°$ (FIG. 23d) versus light wavelength $\lambda$.
Figure 23C:
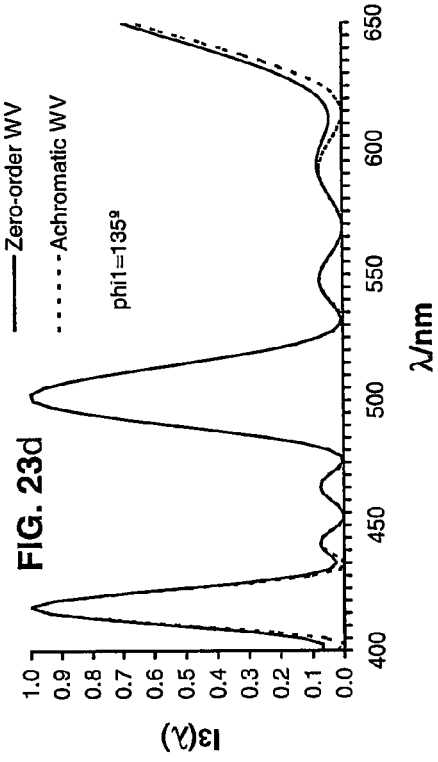
Figure 23B:
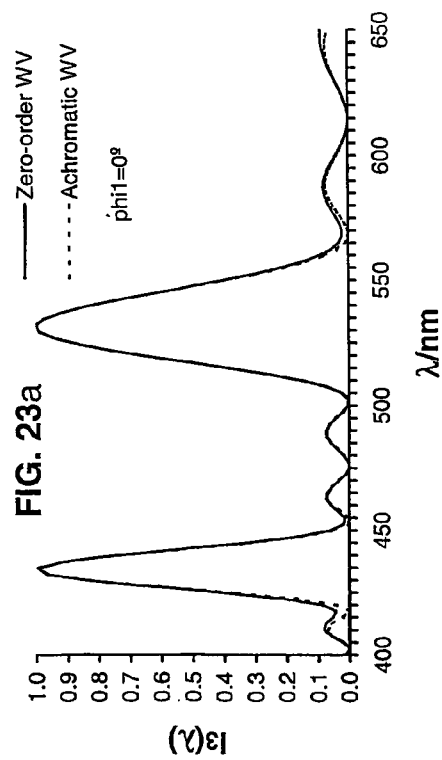
Figure 23D:
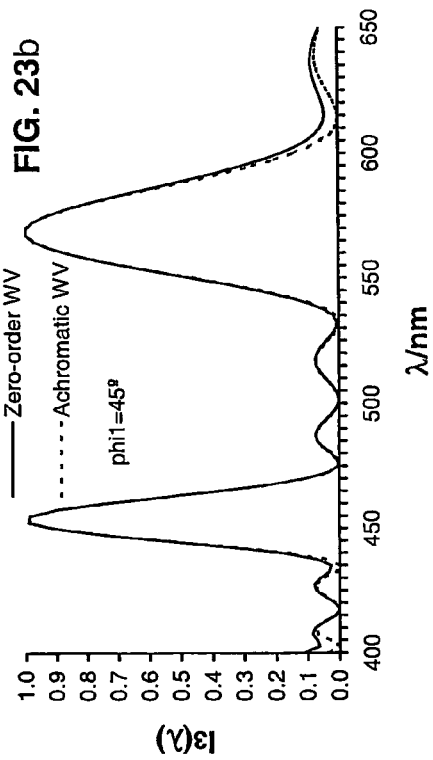

With birefringent zero-order waveplates as the retarders 73 and 75, the transmission spectrum of the filter of FIG. 22 will slightly differ from what described by Equation (28a) or (28b), depending on the wavelength range of interest and the zero-order waveplates to be used. As an example, FIG. 23 presents a set of calculated tuned transmission curves $I_3(\lambda)$ of a filter in accordance with the arrangement of FIG. 22 for $\phi_2=2\phi_1$, and $P_2=\phi_1$ in the wavelength range of 400–650 nm, which is assumed to comprise two zero-order waveplates and three quartz rotators. The transmission curves $I_3(\lambda)$ are compared with the curves produced when using achromatic quarter-wave plates for $\phi_1=0°$ (FIG. 23a), $\phi_1=45°$ (FIG. 23b), $\phi_1=90°$ (FIG. 23c) and $\phi_1=135°$ (FIG. 23d). The rotation angles of the quartz rotators are in the ratios of 1:1:−1 with $\rho(\lambda)=90°$ at $\lambda=1064$ nm assumed and the zero-order waveplates are assumed to have the retardation equal to 90° at $\lambda=496.3$ nm.

When using optical rotators, the filter of FIG. 22 is mechanically tunable by simultaneously rotating the retarders 73 ($\phi_1$) and 75 ($\phi_2$) and the polarizer 77 ($P_2$) about the z-axis with the ratios $\phi_1:\phi_2:P_2=1:2:1$ or $\phi_1:(\phi_2-90°):(P_2-90°)=1:2:1$ remaining unchanged. When the polarization rotators 72, 74, and 76 are Faraday rotators, the filter of FIG. 22 is electrically tunable by varying the Faraday rotation angles $\rho_f(\lambda)$, $\rho_f(\lambda)$ and $-\rho_f(\lambda)$ with their ratios of 1:1:−1 remaining unchanged. When using Faraday rotators, the retarders 73 and 75 and the exit polarizer 77 preferably are stationary, oriented at $\phi_1$, $\phi_2=2\phi_1$ and $P_2\phi_1$ or $\phi_2=90°+2\phi_1$ and $P_2=90°+\phi_1$. By adjusting the angles $\phi_1$, $\phi_2$ and $P_2$ with their ratios remaining unchanged, a mechanical tuning can be resulted. For $\phi_1=45°$, $\phi_2=-90°$ and $P_2=45°$ or $\phi_2=0°$ and $P_2=-45°$, the filter of FIG. 22 further functions as a one-direction electrically tunable filter. The round trip transmission of the filter of FIG. 22 is $$I_{3r}=\cos^2(\rho_f(\lambda)+45°)\cos^2 2(\rho_f(\lambda)+45°)\cos^2 2(\rho_f(\lambda)-45°) \cos^2(\rho_f(\lambda)-45°) \quad (29a)$$

for $\phi_1=45°$, $\phi_2 90°$ and $P_2=45°$, or $$I_{3r}=\sin^2(\rho_f(\lambda)+45°)\cos^2 2(\rho_f(\lambda)+45°)\cos^2 2(\rho_f(\lambda)-45°) \sin^2(\rho_f(\lambda)-45°) \quad (29b)$$

for $\phi_1=45°$, $\phi_2=0°$ and $P_2=-45°$.

The transmission of the filter of FIG. 22 can be inverted with the exit polarizer 77 rotated by 90° from its orientation $P_2=\phi_1$ or $P_2=90°+\phi_1$. For $\phi_2=2\phi_1$ and $P_2=90°+\phi_1$ or $\phi_2=90°+2\phi_1$ and $P_2=\phi_1$, the filter of FIG. 22 becomes a notch filter with its spectral transmission $I_{3notch}(\lambda)$ complementary to the initial spectrum $I_3(\lambda)$, i.e. $I_{3notch}(\lambda)=1-I_3(\lambda)$, where $I_3(\lambda)$ is described by Equation (28a) or (28b). The filter of FIG. 22 or its notch filter is tunable by simultaneously rotating the retarders 73 and 75 and the exit polarizer 77 to change the angle $\phi_1$.

Figure 24:
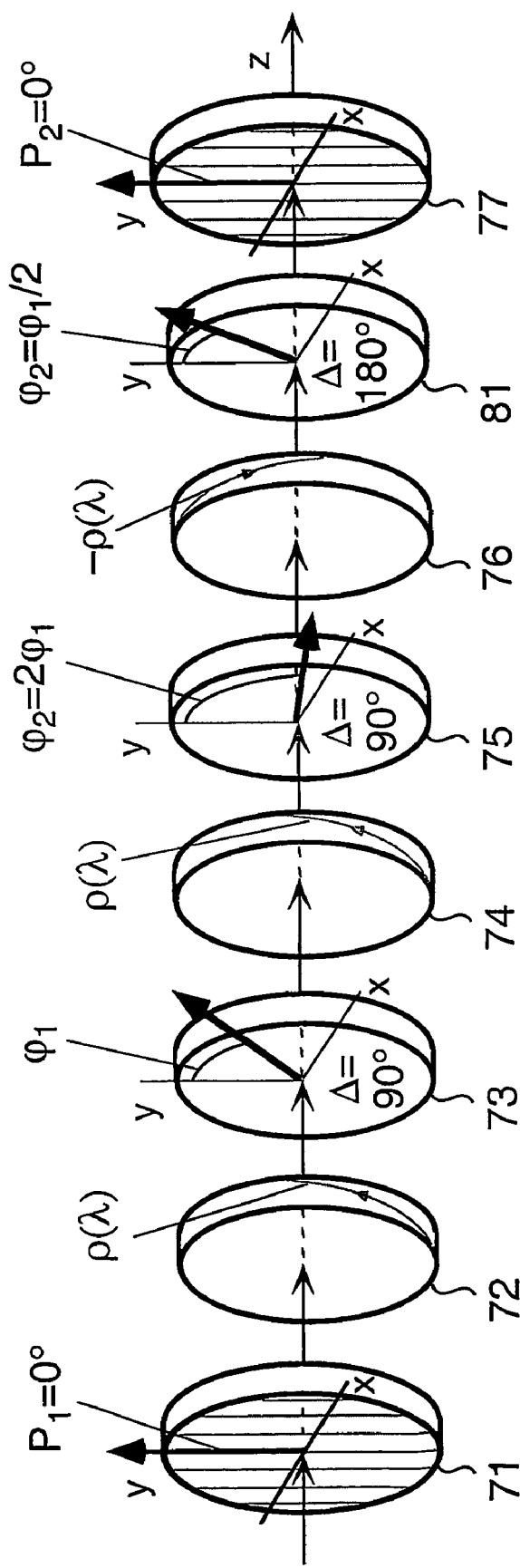
FIG. 24 depicts the arrangement of another three-tuner spectral filter in accordance with the present invention, which is formed from the embodiment of FIG. 22 by inserting a half-wave retarder immediately before the exit polarizer.

For the embodiment of FIG. 22, the exit polarizer 77 has to be rotated for the tuning when passive polarization rotators are used. The arrangement of FIG. 22 can be modified by inserting a rotatable half-wave retarder 81 immediately preceding the polarizer 77 to form a polarizer-fixed tunable filter as shown in FIG. 24. For this embodiment, the exit polarizer 77 is stationary, preferably oriented at $P_2=0°$ (as in FIG. 24) or $P_2=90°$. The added retarder 81 is oriented to have its axis at an angle $\phi_3=0.5\phi_1$ relative to the entrance polarizer 71 such that the orientation angles $\phi_1$, $\phi_2$ and $\phi_3$ of the retarders 73, 75 and 81 are in the ratios of $\phi_1:\phi_2:\phi_3=2:4:1$ for $P_2=0°$ or $\phi_1:(\phi_2-90°):\phi_3-90°)=2:4:1$ for $P_2=90°$. For this embodiment, the polarization rotators 72, 74, and 76 preferably are optical rotators and the retarders 73, 75 and 81 may be achromatic or zero-order birefringent retarders or equivalent LC retarders. The filter of FIG. 24 has the same spectral transmission as described by Equation (28) and is tunable by simultaneously rotating the retarders 73, 75 and 81 about the z-axis in the same direction relative to the polarizer 71 to change their orientation angles $\phi_1$, $\phi_2$ and $\phi_3$ with their ratios $\phi_1:\phi_2:\phi_3=2:4:1$ or $\phi_1:(\phi_2-90°):(\phi_3-90°)=2:4:1$ remaining unchanged. The tuning is mechanical or electrical when birefringent retarders or LC electrically rotatable retarders are used. The LC retarders are oriented such that the no-field orientation angles of their optic axes, relative to the entrance polarizer, are in the ratios of $\phi_1:\phi_2:\phi_3=2:4:1$ or $\phi_1:(\phi_2-90°):(\phi_{3-90°})=2:4:1$ and may be rotatable electrically and/or mechanically.

To this inventor's knowledge, to date there has been no device or optical arrangement reported, which acts as a Lyot two-stage filter requiring no intermediate polarizer. The so-called split-element filter (Evans, J. W. (1949) J. Opt. Soc. Am, 39:229), which is a wavelength-fixed filter comprising three identical birefringent plates, does not transmit light intensity exactly as a Lyot two-stage filter. To modify the transmission of the split-element filter into that of the Lyot two-stage filter, achromatic quarter-wave retardation shifts need to add to each split element and an achromatic half-wave retardation shift to the center element. Thus, to tune a split-element filter, at least a double tuner of Buhrer (four achromatic quarter-wave plates) and one or two additional achromatic waveplates are required. Sharp, et al (Sharp G. H. and Johnson K. M., U.S. Pat. No. 6,091,462) modified the split element filter of Evans by rotating one of the split elements by ninety degrees. The improved split element filter requires quarter-wave phase shift in each split element, one achromatic waveplate less than the initial structure, to produce the spectrum of a two-stage Lyot filter. Even the construction of a standard Lyot two-stage tunable filter, based on the arrangement of FIG. 2 for instance, requires an intermediate polarizer, two single birefringent plates and four achromatic waveplates, in addition to two polarizers. However, the tunable filters of the invention in FIG. 22 and FIG. 24 use no intermediate polarizer and require only three birefringent plates (optical rotators) and two (FIG. 22) or three achromatic waveplates (FIG. 24). In addition, the embodiments of the invention allow the use of zero-order waveplates in constructing lossless Lyot two-stage tunable filters in a moderately broad spectral range (e.g. ref. FIG. 23). Furthermore, the embodiments of the invention respectively enable the new-featured lossless Lyot two-stage filters using the Faraday rotator (FIG. 22), which is electro-magnetically tunable and can work as a one-way device, or using the LC retarders (FIG. 24), which is electrically tunable.

FIG. 25 schematically illustrates the arrangement of a three-tuner filter of the invention, which comprises an entrance polarizer 82 ($P_1=0°$), a first polarization rotator 83 ($-\rho$), a first retarder 84 ($\Delta_1$, $\phi_1$), a second polarization rotator 85 ($2\rho$), a second retarder 86 ($\Delta_2$, $\phi_2$), a third polarization rotator 87 ($-2\rho$), a third retarder 88 ($\Delta_3$, $\phi_3$), a fourth polarization rotator 89 ($\rho$) and an exit polarizer 90 ($P_2$). They are arranged in cascade along a light beam axis, i.e. the axis z, with their axes aligned relative to the axis y as specified in FIG. 25. The entrance polarizer 82 and the exit polarizer 90 are perpendicularly oriented, at $P_1=0°$ and $P_2=90°$ as in FIG. 25. The dispersive rotation angles $\rho(\lambda)$, $-2\rho(\lambda)$, $2\rho(\lambda)$ and $-\rho(\lambda)$ of the rotators 83, 85, 87 and 89 are in the ratios of $1:-2:2:-1$. The first and third retarders 84 and 88 are identical, having the retardation $\Delta_1=\Delta_3=\Delta$, which is equal or approximately equal to a predetermined value selected preferably between 60° and 100°. The retarders 84 and 88 have their axes parallel oriented at an angle $-\phi$ relative to the y axis, i.e. $\phi_1=\phi_3=-\phi$. The retarder 86 is a half-wave retarder ($\Delta_2=180°$ or $\Delta_2=180°$), aligned to have its axis at $\phi_2=\phi+45°$ relative to the axis y. The combination of the rotators 83, 85, 87 and 89 and the retarders 84, 86 and 88 is equivalent to a series connection of three retarder-tuners 91, 92 and 93 according to FIG. 6c. The tuners 91 and 93 are identical, having the retardation $\Delta$ and parallel oriented to have the orientation angle $\theta_2=-(\rho(\lambda)+\phi)$, while the central tuner 92 is characterized by its retardation $\Delta_2=180°$ and orientation angle $\theta_2=\rho(\lambda)+\phi+45°=-(\theta-45°)$. Thus the spectral transmission $I_3=I_3(\lambda)$ of the filter of FIG. 25 is expressed and calculated as given by $$I_3 = \frac{1}{2}\begin{bmatrix} 1 \\ \cos 2P_2 \\ \sin 2P_2 \\ 0 \end{bmatrix}^{-1} \begin{bmatrix} 1 & 0 & 0 & 0 \\ 0 & \cos 4\theta \sin^2\frac{\Delta}{2} + \cos^2\frac{\Delta}{2} & \sin 4\theta \sin^2\frac{\Delta}{2} & -\sin 2\theta \sin\Delta \\ 0 & \sin 4\theta \sin^2\frac{\Delta}{2} & \cos^2\frac{\Delta}{2} - \cos 4\theta \sin^2\frac{\Delta}{2} & \cos 2\theta \sin\Delta \\ 0 & \sin 2\theta \sin\Delta & -\cos 2\theta \sin\Delta & \cos\Delta \end{bmatrix} \quad (30)$$

$$\begin{bmatrix} 1 & 0 & 0 & 0 \\ 0 & -\cos 4\theta & \sin 4\theta & 0 \\ 0 & \sin 4\theta & \cos 4\theta & 0 \\ 0 & 0 & 0 & -1 \end{bmatrix}$$

$$\begin{bmatrix} 1 & 0 & 0 & 0 \\ 0 & \cos 4\theta \sin^2\frac{\Delta}{2} + \cos^2\frac{\Delta}{2} & \sin 4\theta \sin^2\frac{\Delta}{2} & -\sin 2\theta \sin\Delta \\ 0 & \sin 4\theta \sin^2\frac{\Delta}{2} & \cos^2\frac{\Delta}{2} - \cos 4\theta \sin^2\frac{\Delta}{2} & \cos 2\theta \sin\Delta \\ 0 & \sin 2\theta \sin\Delta & -\cos 2\theta \sin\Delta & \cos\Delta \end{bmatrix} \begin{bmatrix} 1 \\ \cos 2P_1 \\ \sin 2P_1 \\ 0 \end{bmatrix} =$$

$$\frac{1}{2}\Big\{ 1 - \cos^4\frac{\Delta}{2}\cos 2(P_2 + P_1 + 2\theta) - \sin^4\frac{\Delta}{2}\cos 2(P_2 + P_1 - 6\theta) -$$

$$\sin^2\frac{\Delta}{2}\cos^2\frac{\Delta}{2}(\cos 2(P_2 - P_1 - 4\theta) + \cos 2(P_2 - P_1 + 4\theta)) +$$

$$\sin 2(P_1 - \theta)\sin 2(P_2 - \theta)\sin^2\Delta \Big\}.$$

For the embodiment illustrated in FIG. 25, i.e. $P_1 = 0°$ and $P_2 = 90°$, and $\theta = -(\rho(\lambda) + \phi)$, it follow from Equation (30)

$$I_3 = \frac{1}{2}\Big\{ 1 + \cos^4\frac{\Delta}{2}\cos 4(\rho(\lambda) + \varphi) + \sin^4\frac{\Delta}{2}\cos 12(\rho(\lambda) + \varphi) + \quad (31a)$$
$$2\sin^2\frac{\Delta}{2}\cos^2\frac{\Delta}{2}\cos 8(\rho(\lambda) + \varphi) - \sin^2 2(\rho(\lambda) + \varphi)\sin^2\Delta \Big\}$$

The spectral transmission $I_3 = I_3(\lambda)$ of the filter of FIG. 25 described by Equation (31a) shows a wavelength-dependent profile due to the rotation angle $\rho = \rho(\lambda)$. According to the invention, the polarizers 82 and 90 can also be oriented at $P_1 = 45°$ and $P_2 = 135°$. For $P_1 = 45°$ and $P_2 = 135°$, from Equation (30) the transmission of the filter is $$I_3 = \frac{1}{2}\Big\{ 1 - \cos^4\frac{\Delta}{2}\cos 4(\rho(\lambda) + \varphi) - \sin^4\frac{\Delta}{2}\cos 12(\rho(\lambda) + \varphi) + \quad (31b)$$
$$2\sin^2\frac{\Delta}{2}\cos^2\frac{\Delta}{2}\cos 8(\rho(\lambda) + \varphi) - \sin^2 2(\rho(\lambda) + \varphi)\sin^2\Delta \Big\}$$

The spectrum described by Equation (31b) is identical to that of Equation (31a) except that they are shifted by $\pi/4$ related to each other. The transmission $I_3 = I_3(\lambda)$ described by Equation (31a) or Equation (31b) is also a function of the parameter $\Delta$. It is flexible to choose the value for the retardation $\Delta$ of the retarders 84 and 88 in designing the filter such that the condition $60° \leq \Delta \leq 100°$ is preferably satisfied. For $\Delta = 90°$, for example, Equations (31a) and (31b) are simplified with the light intensity $I_3$ given by $$I_3 = \quad (32a, b)$$
$$\begin{cases} \cos^2 2(\rho(\lambda) + \varphi)\cos^2 4(\rho(\lambda) + \varphi) & \text{for } P_1 = 0° \text{ and } P_1 = 90° \\ \sin^2 2(\rho(\lambda) + \varphi)\cos^2 4(\rho(\lambda) + \varphi) & \text{for } P_1 = 45° \text{ and } P_1 = 135° \end{cases}$$

Equation (32a) or (32b) exactly describes the transmission of a standard Lyot type two-stage filter. When the retardation $\Delta$ has a value other than 90°, the transmission spectrum $I_3(\lambda)$ of the filter of FIG. 25 will be modified, as described by Equation (31a) or (31b). FIG. 26 presents a set of transmission curves $I_3(\lambda)$ of the filter of FIG. 25 in the wavelength range of 400-700 nm, calculated according to Equation (31a) for $\phi = 0°$. In the calculation, it is assumed that the retarders 84, 86 and 88 are achromatic and the rotators 83, 85, 87 and 89 are quartz optical rotators with the optical rotation $\rho(\lambda) = 90°$ at $\lambda = 726.85$ nm such that $I_3(\lambda)$ has its principal maximum at 420 nm and 514 nm. As shown, when Δ=60° the transmission $I_3(\lambda)$ has no sidelobe at all, but with the broadest main transmission peaks. The bandwidth of the main transmission peaks is narrowed when the Δ value goes up from 60° and two sidelobes appear between the main peaks, whose amplitude increases as the Δ value increases. With Δ=75.52°, the transmission $I_3(\lambda)$ is identical to that of a Šolc type three-plate filter. For Δ=90°, the filter is equivalent to a Lyot two-stage filter with the curve $I_3(\lambda)$ described by Equation (32a). As the Δ value further goes up, the main transmission peaks are narrowed further, but with the sidelobe amplitude increased more rapidly. The embodiment of FIG. 25 provides a possibility for designing and constructing three-tuner spectral filters with the sidelobes suppressible as desired. Provided the value for Δ is not too high, for example not larger than 100°, the sidelobe amplitude will be controlled in a technically acceptable arrange. The amplitude of the sidelobes is up to 0.154 for Δ=100° and it decreases continuously until it is equal to zero when Δ=60°. It is flexible to select the parameter Δ to design and provide tunable filters with the sidelobes suppressible as desired to better meet requirements of different applications, which include the standard Šolc three-plate filter and the lossless Lyot two-stage filter. The filter of FIG. 25 is tunable by synchronously rotating the retarders 84 and 88 in one direction and the retarder 86 in the opposite direction about the axis z at the same speed, related to the polarizer 97, to change their orientation angles ($\phi_1=\phi_3=-\phi$ and $\phi_2=\phi+45°$ with the described relationship remaining unchanged. The filter can also be tuned by simultaneously varying the rotation angles of the rotators 83, 85, 87 and 89 with the ratios 1:−2:2:−1 remaining unchanged.

The arrangement of FIG. 25 is a notch filter when the exit polarizer 90 is oriented to be parallel to the entrance polarizer 82. The spectral transmission $I_{3notch}(\lambda)$ of the filter of FIG. 25 when working as a notch filter is given by $I_{3notch}(\lambda)=1-I_3(\lambda)$ where $I_3(\lambda)$ is described by Equation (31a) for $P_2=P_1=0°$ or Equation (31b) for $P_2=P_1=45°$. The arrangement of FIG. 25 is invariant to a rotation of 180° about an axis perpendicular to the beam axis. For this embodiment, the polarization rotators 83, 85, 87 and 89 are preferably selected from optical rotators, e.g. quartz rotators, and Faraday rotators. The suitable candidates for the retarders 84, 86 and 88 include birefringent achromatic and zero-order retarders, LC variable retarders and LC electrical rotatable retarders. Depending on the polarization rotators and retarders selected for use, the filter of FIG. 25 can be constructed to be mechanically tunable, electrically tunable, electro-magnetically tunable and/or one-way tunable, or electrically switchable.

When the rotators 83, 85, 87 and 89 are quartz optical rotators, it is desirable to use equivalent birefringent retarders, preferably achromatic or zero-order retarders, or LC electrically rotatable retarders as the retarder 84, 86 and 88. The filter can be tuned, mechanically and/or electrically, by simultaneously rotating the birefringent retarders or LC electrically rotatable retarders in the way as described. Zero-order retarders may be used when the wavelength range of the filter is not very broad and/or the requirement on the spectrum waveform or sidelobe suppression is not very high. FIG. 27 presents a set of tuned transmission curves $I_3(\lambda)$ of the filter calculated in FIG. 26 with the retarders 84 and 86 replaced by two zero-order quarter-wave plates at λ=457.7 nm. The transmission curves $I_3(\lambda)$ are compared with the curves produced when using achromatic quarter-wave plates for the tuning angle $\phi=0°$ (FIG. 27a), $\phi=30°$ (FIG. 27b), and $\phi=60°$ (FIG. 27c). The calculation in FIG. 27 is made under the same conditions as in FIG. 26. As shown, the main effects produced by using the zero-order waveplates are broadening of the main transmission peak of $I_3(\lambda)$ and increasing of the sidelobe amplitude respectively at longer and shorter wavelength regions. However, the waveform deformation shall not be critical for some applications.

Furthermore, the filter of FIG. 25 can be electrically switchable and mechanically tunable when proper LC variable retarders are used as the retarders 84, 86 and 88. The LC retarders are oriented as required and operated to have the retardation switchable between two alternative states. In one switched state, the all LC retarders have the retardation equal or approximately equal to 0° over the spectral range of the filter. In the other state the LC retarder replacing the retarder 86 has the retardation equal or approximately equal to 180°, while those replacing the retarders 84 and 88 have the identical retardation Δ, valued such that 60°≦Δ≦100°. In the zero retardation state, the LC retarders act as isotropic mediums so that the rotation angles of the rotators 83, 85, 87 and 89 are compensated for and the filter fully blocks light for $P_1=0°$ and $P_2=90°$ or $P_1=45°$ and $P_2=-45°$. In the non-zero retardation state, the filter has its spectral transmission described by Equation (32a). The filter is electrically switchable by simultaneously switching the LC retarders and further tunable by mechanically rotating them with the relationship of their orientation angles remaining unchanged. For the filter of FIG. 25 using LC variable retarders, an additional benefit obtained is that the bandwidth of its transmission peaks becomes adjustable by electrically varying the retardation of the first and third LC retarders (ref. FIG. 26), preferably in a range roughly from 60° to 100°.

When the rotators 83, 85, 87 and 89 are Faraday rotators, the filter of FIG. 25 can be electro-magnetically tunable. Magnetic fields are applied to the Faraday rotators such that their rotation angles are equal to $\rho_f(\lambda)$, $-2\rho_f(\lambda)$, $2\rho_f(\lambda)$ and $-\rho_f(\lambda)$. The filter is electrically tunable by changing the magnetic flux densities to vary the Faraday rotation angles simultaneously with their ratios of 1:−2:2:−1 remaining unchanged. In this case, the retarders 84, 86 and 88 preferably are birefringent achromatic or zero-order waveplates, oriented at $\phi_1=\phi_3=-\phi$ and $\phi_2=\phi+45°$ as required. The angle $\phi$ can be adjusted mechanically if so desired. For the version of the one-way device, it is preferable to have the retarders 84, 86 and 88 oriented at $\phi_1=\phi_3=-22.5°$ and $\phi_2=\phi+45°=67.5°$, respectively. For $P_1=0°$ and $P_2=90°$, the round trip transmission of the filter of FIG. 25 when using Faraday rotators is $$I_{3r} = \qquad (33)$$
$$\frac{1}{4}\left\{1 + \cos^4\frac{\Delta}{2}\cos 4(\rho_f(\lambda) + 22.5°) + \sin^4\frac{\Delta}{2}\cos 12(\rho_f(\lambda) + 22.5°) + \right.$$
$$2\sin^2\frac{\Delta}{2}\cos^2\frac{\Delta}{2}\cos 8(\rho_f(\lambda) + 22.5°) -$$
$$\left. \sin^2 2(\rho_f(\lambda) + 22.5°)\sin^2\Delta\right\}$$
$$\left\{1 + \cos^4\frac{\Delta}{2}\cos 4(\rho_f(\lambda) - 22.5°) + \sin^4\frac{\Delta}{2}\cos 12(\rho_f(\lambda) - 22.5°) + \right.$$
$$2\sin^2\frac{\Delta}{2}\cos^2\frac{\Delta}{2}\cos 8(\rho_f(\lambda) - 22.5°) -$$
$$\left. \sin^2 2(\rho_f(\lambda) - 22.5°)\sin^2\Delta\right\}.$$

FIG. 28 presents the calculated round trip transmission curves $I_{3r}(\lambda)$ of the filter of FIG. 25 when using Faraday rotators in the wavelength range of 500-650 nm calculated according to Equation (33). The three retarders of the filter are assumed to be achromatic with the first and third ones having the retardation $\Delta$, and four Faraday rotators of TGG glass have the Faraday rotation $\rho_f(\lambda)$ assumed to be equal to 45° at $\lambda$=1453 nm. The round trip transmission curves $I_{3r}(\lambda)$ for $\Delta$=60°, $\Delta$=70.5°, $\Delta$=80°, $\Delta$=90°, and $\Delta$=100° (FIG. 28a) are compared with the corresponding forward transmission curves $I_3(\lambda)$ (FIG. 28b) calculated according to Equation (31a). For $\Delta$=70.5°, the isolation $I_{3r}(\lambda)$ reaches the optimal result in blocking the backward light with the maximum leaked intensity of $I_{3r}(\lambda)$ equal to 0.003 (minimum extinction: −25.1 dB).

Compared with the embodiment of FIG. 22, the exit polarizer of the filter of FIG. 25 may remain stationary. The cost for this is its requiring one tuner more than the former. Compared with the embodiment of FIG. 24, the filter of FIG. 25 is flexible in its transmission spectrum having suppressible or adjustable sidelobes to be determined by the designer. In addition, the arrangement of FIG. 25 permits working as an electrically switchable and mechanically tunable filter just like the embodiment of FIG. 18 by using proper switchable retarders, e.g. LC variable retarders. This tunability is not feasible for the arrangement of FIG. 24. As the cost for having the features the filter of FIG. 25 requires one polarization rotator more than the filter of FIG. 24. Both the arrangements of FIG. 22 and FIG. 25 can be used for constructing a one-way filter having the transmission exactly equivalent to that of a Lyot two-stage filter. The arrangement of FIG. 22 requires less constitution elements and therefore is simpler than that of FIG. 25 for $\Delta$=90°. However, the arrangement of FIG. 25 is flexible and allows reaching better extinction result.

Figure 29:
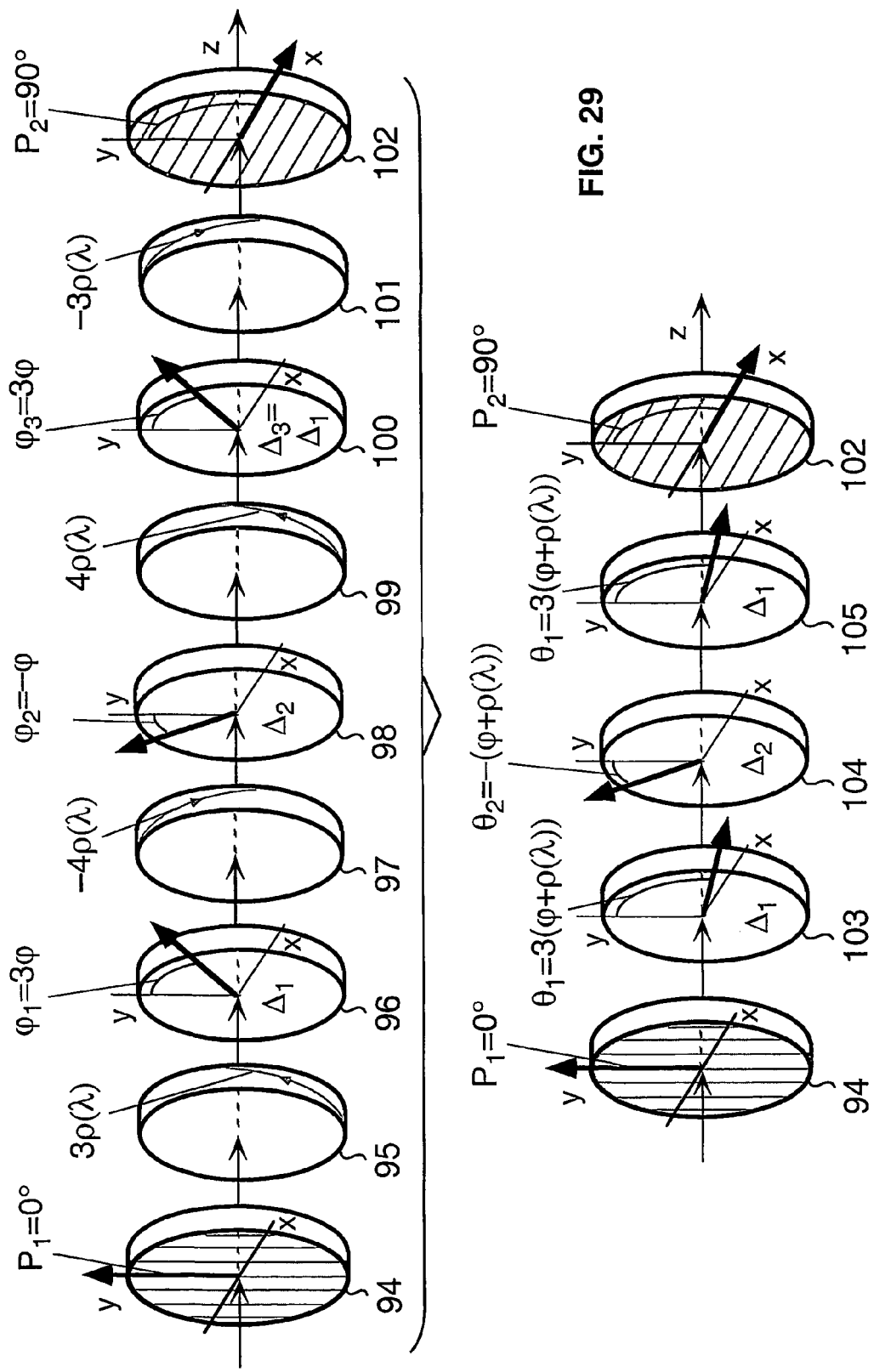
FIG. 29 depicts the arrangement of a further three-tuner spectral filter in accordance with the present invention, containing four dispersive polarization rotators and three optical retarders arranged between polarizers. The filter has a band-pass transmission profile of approximate square-waveform and is mechanically tunable and can be further electrically tunable, switchable or one-way-electrically tunable depending on the constituent elements selected for use.

According to the present invention, it is also feasible to use the tuners of the invention to construct spectral filters having special transmission waveforms. As an example, the present invention further provides a three-tuner filter, which has a flattop band-pass transfer function. FIG. 29 schematically illustrates the arrangement of this filter, which comprises an entrance polarizer 94 ($P_1$=0°), a first polarization rotator 95 (3$\rho$), a first retarder 96 ($\Delta_1$, $\phi_1$), a second polarization rotator 97 (−4$\rho$), a second retarder 98 ($\Delta_2$, $\psi_2$), a third polarization rotator 99 (4$\rho$), a third retarder 100 ($\Delta_3$, $\phi_3$), a fourth polarization rotator 101 (−3$\rho$) and an exit polarizer 102 ($P_2$). They are arranged in cascade along the axis z, with their axes aligned relative to the axis y as specified in FIG. 29. The entrance polarizer 94 and the exit polarizer 102 are perpendicularly oriented, i.e. $P_1$=0° and $P_2$=90°. The polarization rotators 95, 97, 99 and 101 have their dispersive rotation angles 3$\rho(\lambda)$, −4$\rho(\lambda)$, 4$\rho(\lambda)$ and −3$\rho(\lambda)$ in the ratios of 3:−4:4:−3 over the wavelength range of the filter. The retarder 98 has its retardation $\Delta_2$ preferably achromatic and it is oriented to have its axis at an angle $\phi_2$=−$\phi$ relative to the y-axis. The retarders 96 and 100 are identical, having the retardation $\Delta_1$=$\Delta_3$, preferably achromatic over the same wavelength-range. They are parallel oriented with their axes at the opposite side of the retarder 98 relative to the y-axis, an angle three times the angle $\phi$ apart from, i.e. $\phi_1$=$\phi_3$=3$\phi$, as viewed along the light propagation direction. The combination of the rotators 95, 97, 99 and 101 and the retarders 96, 98 and 100 is equivalent to a series connection of three retarder-tuners 103, 104 and 105 in accordance with the embodiment of FIG. 6c. The tuners 103 and 105 are identical, having the retardation $\Delta_1$ and parallel oriented to have the orientation angle $\theta_1$=3($\rho(\lambda)$+$\phi$), while the tuner 104 is characterized by its retardation $\Delta_2$ and orientation angle $\theta_2$=−($\rho(\lambda)$+$\phi$). Thus the transmission spectrum $I_3$=$I_3(\lambda)$ of the filter of FIG. 29 is expressed and calculated as given by $$I_3 = \frac{1}{2}\begin{bmatrix}1\\-1\\0\\0\end{bmatrix}^{-1}\begin{bmatrix}1 & 0 & 0 & 0\\0 & \cos^2\frac{\Delta_1}{2}+\cos4\theta_1\sin^2\frac{\Delta_1}{2} & \sin4\theta_1\sin^2\frac{\Delta_1}{2} & -\sin2\theta_1\sin\Delta_1\\0 & \sin4\theta_1\sin^2\frac{\Delta_1}{2} & \cos^2\frac{\Delta_1}{2}-\cos4\theta_1\sin^2\frac{\Delta_1}{2} & \cos2\theta_1\sin\Delta_1\\0 & \sin2\theta_1\sin\Delta_1 & -\cos2\theta_1\sin\Delta_1 & \cos\Delta_1\end{bmatrix}$$

$$\begin{bmatrix}1 & 0 & 0 & 0\\0 & \cos^2\frac{\Delta_2}{2}+\cos4\theta_2\sin^2\frac{\Delta_2}{2} & \sin4\theta_2\sin^2\frac{\Delta_2}{2} & -\sin2\theta_2\sin\Delta_2\\0 & \sin4\theta_2\sin^2\frac{\Delta_2}{2} & \cos^2\frac{\Delta_2}{2}-\cos4\theta_2\sin^2\frac{\Delta_2}{2} & \cos2\theta_2\sin\Delta_2\\0 & \sin2\theta_2\sin\Delta_2 & -\cos2\theta_2\sin\Delta_2 & \cos\Delta_2\end{bmatrix}$$

$$\begin{bmatrix}1 & 0 & 0 & 0\\0 & \cos^2\frac{\Delta_1}{2}+\cos4\theta_1\sin^2\frac{\Delta_1}{2} & \sin4\theta_1\sin^2\frac{\Delta_1}{2} & -\sin2\theta_1\sin\Delta_1\\0 & \sin4\theta_1\sin^2\frac{\Delta_1}{2} & \cos^2\frac{\Delta_1}{2}-\cos4\theta_1\sin^2\frac{\Delta_1}{2} & \cos2\theta_1\sin\Delta_1\\0 & \sin2\theta_1\sin\Delta_1 & -\cos2\theta_1\sin\Delta_1 & \cos\Delta_1\end{bmatrix}\begin{bmatrix}1\\1\\0\\0\end{bmatrix}$$

$$= \frac{1}{2}\left\{1-L_2\left(\cos^2\frac{\Delta_1}{2}+\cos4\theta_1\sin^2\frac{\Delta_1}{2}\right)-L_3\sin^2\frac{\Delta_1}{2}\sin4\theta_1+L_4\sin\Delta_1\sin2\theta_1\right\}, \text{ where} \quad (34)$$

$$L_2 = \cos^2\frac{\Delta_1}{2}\cos^2\frac{\Delta_2}{2}+\sin^2\frac{\Delta_1}{2}\cos^2\frac{\Delta_2}{2}\cos4\theta_1+\sin^2\frac{\Delta_2}{2}\cos^2\frac{\Delta_1}{2}\cos4\theta_2+ \quad (35a)$$

$$\sin^2\frac{\Delta_1}{2}\sin^2\frac{\Delta_2}{2}\cos4(\theta_2-\theta_1)-\sin\Delta_1\sin\Delta_2\sin2\theta_1\sin2\theta_2,$$

-continued $$L_3 = \cos^2\frac{\Delta_1}{2}\sin^2\frac{\Delta_2}{2}\sin 4\theta_2 + \sin^2\frac{\Delta_1}{2}\sin^2\frac{\Delta_2}{2}\sin 4(\theta_2 - \theta_1) + \qquad (35b)$$

$$\sin^2\frac{\Delta_1}{2}\cos^2\frac{\Delta_2}{2}\sin 4\theta_1 + \sin\Delta_1\sin\Delta_2\sin 2\theta_1\cos 2\theta_2,$$

$$L_4 = \cos^2\frac{\Delta_1}{2}\sin\Delta_2\sin 2\theta_2 - \sin^2\frac{\Delta_1}{2}\sin\Delta_2\sin 2(2\theta_1 - \theta_2) + \sin\Delta_1\cos\Delta_2\sin 2\theta_1. \qquad (35c)$$

For $\theta_1 = 3(\rho(\lambda)+\phi)$ and $\theta_2 = -(\rho(\lambda)+\phi)$ Equation (34) can be written as $$I_3 = \left[\cos^2\frac{\Delta_1}{2}\sin\frac{\Delta_2}{2}\sin 2(\rho(\lambda)+\varphi) - \sin\Delta_1\cos\frac{\Delta_2}{2}\sin 6(\rho(\lambda)+\varphi) + \qquad (36a)\right.$$

$$\left.\sin^2\frac{\Delta_1}{2}\sin\frac{\Delta_2}{2}\sin 14(\rho(\lambda)+\varphi)\right]^2.$$

According to the invention, the polarizers 94 and 102 may also be aligned at $P_1 = 45°$ and $P_2 = 135°$. For $P_1 = 45°$ and $P_2 = 135°$ the transmission $I_3 = I_3(\lambda)$ of the filter of FIG. 29 is found to be $$I_3 = \left[\cos^2\frac{\Delta_1}{2}\sin\frac{\Delta_2}{2}\cos 2(\rho(\lambda)+\varphi) + \sin\Delta_1\cos\frac{\Delta_2}{2}\cos 6(\rho(\lambda)+\varphi) - \qquad (36b)\right.$$

$$\left.\sin^2\frac{\Delta_1}{2}\sin\frac{\Delta_2}{2}\cos 14(\rho(\lambda)+\varphi)\right]^2.$$

The spectrum described by Equation (36b) is identical to that of Equation (36a) except that they are shifted by $\pi/4$ related to each other. Because of the dispersion of the orientation angles $\theta_1 = 3(\rho(\lambda)+\phi)$ and $\theta_2 = -(\rho(\lambda)+\phi)$, the transmission $I_3 = I_3(\lambda)$ of the filter of FIG. 29 varies as a function of wavelength $\lambda$. The transmission profile $I_3(\lambda)$ is also a function of the design parameters $\Delta_1$ and $\Delta_2$, which should be predetermined. According to the invention, the spectral transmission $I_3(\lambda)$ of the filter of FIG. 29 has an approximate square-waveform when the retardation $\Delta_1$ and $\Delta_2$ have values such that the conditions $30° \leq \Delta_1 \leq 50°$ and $170° \leq 2\Delta_1 + \Delta_2 \leq 220°$ are preferably satisfied. FIG. 30 presents a set of tuned transmission curves $I_3(\lambda)$ calculated according to Equation (36a) for $\phi = 0°$, 22.5°, 45° and 67.5° in the wavelength range of 400-550 nm. As preferably required, in the calculation the retarders 96, 98 and 100 are assumed to be achromatic with the retardation $\Delta_1 = 44°$ and the retardation $\Delta_2 = 97°$ ($2\Delta_1 + \Delta_2 = 185°$). For the rotators 95, 97, 99 and 101 quartz optical rotators are assumed with the rotation angle $\rho(\lambda) = 90°$ at $\lambda = 726.85$ nm such that the curve $I_3(\lambda)$ for $\phi = 0°$ has a pass-band centered at about 460 nm with the full width at half maximum (FWHM) of about 29 nm. The largest secondary maximum of $I_3(\lambda)$ is about 0.036. By changing the values for $\Delta_1$ and/or $\Delta_2$, the curves will be correspondingly modified with the maximum transition slope decreased or increased and the secondary maximum increased or decreased. The curves $I_3(\lambda)$ in FIG. 30 are compared with those produced when the retarders 96, 98 and 100 are zero-order waveplates, which has the retardation $\Delta_1 = 44°$ or $\Delta_2 = 97°$, both at 463 nm. Compared with the curves produced when using achromatic retarders, the waveform of the transmission when using zero-order retarders is slightly deformed. However, as the calculation confirmed, the filter can still work well in a moderately broad wavelength range.

The filter of FIG. 29 is tunable by synchronously rotating the retarders 96 and 100 in one direction and the retarder 98 in the opposite direction about the axis z, related to the polarizer 110, to change their orientation angles $\phi_1 = \phi_3 = 3\phi$ and $\phi_2 = -\phi$ with the described relationship remaining unchanged. The filter can also be tuned by simultaneously varying the rotation angles of the rotators 95, 97, 99 and 101 with the ratios of 3:–4:4:–3 remaining unchanged. For the embodiment of FIG. 29, the polarization rotators 95, 97, 99 and 101 are preferably selected from optical rotators, e.g. quartz rotators, and Faraday rotators. The suitable candidates for the retarders 96, 98 and 100 include birefringent achromatic and zero-order retarders, LC variable retarders and LC electrical rotatable retarders. Depending on the polarization rotators and retarders selected for use, the filter of FIG. 29 can be constructed to be mechanically tunable, electrically tunable, electro-magnetically tunable and/or one-way tunable, or electrically switchable.

The filter of FIG. 29 is a notch filter when the exit polarizer 102 is oriented to be parallel to the entrance polarizer 94 with the spectral transmission $I_{3notch}(\lambda) = 1 - I_3(\lambda)$ where $I_3(\lambda)$ is described by Equation (36a) for $P_2 = P_1 = 0°$ or Equation (36b) for $P_2 = P_1 = 45°$. The arrangement of the filter of FIG. 29 is invariant of 180° about an axis perpendicular to the beam axis. Its preferable way in selecting constituent polarization rotators and retarders for construction of filters having different tuning mechanisms is just as the same as that described above for the embodiments of FIG. 19 and FIG. 25. For the filter of FIG. 29 it is preferable to use quartz optical rotators and birefringent retarders or LC electrically rotatable retarders so that the filter of FIG. 29 can be tuned, mechanically and/or electrically. The filter of FIG. 29 can further be electrically switchable by using proper LC variable retarders as retarders 96, 98 and 100, which are operated to have the retardation switchable between two alternative states. The LC retarders have their retardation equal or approximately equal to 0° in one switched state and valued such that the conditions $30° \leq \Delta_1 \leq 50°$ and $170° \leq 2\Delta_1 + \Delta_2 \leq 220°$ are preferably satisfied over the spectral range of the filter in the other state. In the zero retardation state, the LC retarders act as isotropic mediums so that the rotators 95, 97, 99 and 101 are compensated for with one another and the filter fully blocks light for $P_1 = 0°$ and $P_2 = 90°$ or $P_1 = 45°$ and $P_2 = 135°$. In the non-zero retardation state, the filter has its spectral transmission described by Equation (36a). The filter of FIG. 29 is electrically switchable by simultaneously switching the LC retarders and further tunable by mechanically rotating them with the relationship of their orientation angles remaining unchanged. Additionally, the bandwidth of the main transmission peaks of $I_3(\lambda)$ when using LC variable retarders is adjustable by electrically varying the retardation of the LC retarders, preferably under the conditions of $30°\leq\Delta_1\leq 50°$ and $170°\leq 2\Delta_1+\Delta_2\leq 220°$. With equivalent Faraday rotators as the polarization rotators 95, 97, 99 and 101, the filter of FIG. 29 is electro-magnetically tunable by simultaneously varying the Faraday rotation angles with their ratios of 3:−4:4:−3 unchanged. For working as a one-direction device, it is preferable to have the retarders 96, 98 and 100 stationary and oriented at $\phi_1=\phi_3=3\phi=67.5°$ and $\phi_2=-\phi=-22.5°$, respectively, i.e. to have the angle $\phi=22.5°$. For $P_1=0°$ and $P_2=90°$, the round trip transmission of the filter of FIG. 29 using Faraday rotators is $$I_{3_r} = \left[\cos^2\frac{\Delta_1}{2}\sin\frac{\Delta_2}{2}\sin 2(\rho_f(\lambda)+22.5°) - \sin\Delta_1\cos\frac{\Delta_2}{2}\sin 6(\rho_f(\lambda)+22.5°) + \sin^2\frac{\Delta_1}{2}\sin\frac{\Delta_2}{2}\sin 14(\rho_f(\lambda)+22.5°)\right]^2 \left[\cos^2\frac{\Delta_1}{2}\sin\frac{\Delta_2}{2}\sin 2(\rho_f(\lambda)-22.5°) - \sin\Delta_1\cos\frac{\Delta_2}{2}\sin 6(\rho_f(\lambda)-22.5°) + \sin^2\frac{\Delta_1}{2}\sin\frac{\Delta_2}{2}\sin 14(\rho_f(\lambda)-22.5°)\right]^2. \quad (37)$$

FIG. 31 presents the calculated round trip transmission curves $I_{3r}(\lambda)$ of the filter of FIG. 29 when using Faraday rotators according to Equation (37) in the wavelength range of 500-650 nm. For the calculation, it is assumed that the retarders are achromatic with the retardation $\Delta_1$ and $\Delta_2$ satisfying the conditions $30°\leq\Delta_1\leq 50°$ and $170°\leq_{2\Delta_1}+\Delta_2\leq 220°$ and the Faraday rotators of TGG glass, having $\rho_f(\lambda)$ equal to 45° at $\lambda=1437$ nm. The round trip transmission curves $I_3(\lambda)$ for $\Delta_1=44°$ and $\Delta_2=97°$ and $\Delta_1=38.4°$ and $\Delta_2=108.2°$ (FIG. 31*a*) are compared with their forward transmission curves (FIG. 31*b*). For $\Delta_1=38.4°$ and $\Delta_2=108.2°$, the isolation $I_3(\lambda)$ reaches the optimal results of blocking the backward light with the maximum value for the leaked intensity $I_3(\lambda)$ equal to 0.0013 (minimum extinction: −28.9 dB).

Buhrer described in one of his patents (Buhrer Carl F., U.S. Pat. No. 4,678,287) a tunable band-pass spectral filter by using his double tuners, whose transmission has an approximate square-waveform. The filter comprises three birefringent waveplates (two double elements and a single one), seven achromatic waveplates (one half-wave plate and six quarter-wave plates). In comparison with the art, the embodiment of FIG. 29 requires only four birefringent plates (optical rotators) and three achromatic retarders. Furthermore, the embodiment of FIG. 29 allows the use of zero-order waveplates when the spectral range is not very broad. Additionally, the invention enables the new-featured filters including that using the Faraday rotator, which is electro-magnetically tunable and can work as a one-way device, or that using the LC retarders, which is electrically tunable and switchable.

Further lossless filters and filters comprising more than three tuners of the invention are possible and they will be described in subsequent patent applications. The present invention may be embodied or adapted in other specific form and/or further embodiments without departing from the spirit and basic characteristics thereof. The embodiments given in this description shall be considered in all respects as illustrative and not restrictive. Variations will be apparent to those skilled in the art.

The invention claimed is:

1. A spectral filter over a wavelength range comprising elements arranged in cascade along a light beam axis characterized by an entrance polarizer;

at least a dispersive polarization rotator with the rotation angle varying as a function of light wavelength over said wavelength range;

at least an orientation-sensitive polarization element; and means for rotating said orientation-sensitive polarization element(s) about said light beam axis or/and varying said rotation angle(s); whereby said polarization element or at least one of said polarization elements is a polarizer, said polarization rotator(s) and polarization element(s) are arranged behind said entrance polarizer along said beam axis to form tuner(s) such that said polarization element that is a polarizer works as the exit polarizer of said filter, and said filter has its spectral transmission determined by said rotation angle(s) and tunable by rotating said exit polarizer or/and the other(s) of said polarization element(s) about said beam axis and further tunable by varying said rotation angle(s);

the filter being a single-stage spectral filter over said wavelength range comprising elements arranged in cascade along said light beam axis including an entrance polarizer (40);

a dispersive polarization rotator (41) with the rotation angle varying as a function of light wavelength over said wavelength range, selected from optical rotators and Faraday rotators;

an exit polarizer (42); and means for rotating said exit polarizer about said light beam axis;

whereby said polarization rotator (41) is sandwiched between said entrance and exit polarizers (40, 42) with the combination of said polarization rotator (41) and polarizer (42) equivalent to a polarizer-tuner and said filter has its spectral transmission determined by said rotation angle and tunable by rotating said exit polarizer about said beam axis relative to said entrance polarizer and further tunable by varying said rotation angle;

the polarization rotator (41) being a dispersive Faraday rotator, to which a magnetic field is applied, having the rotation angle changeable by adjusting the magnetic flux density of said magnetic field, and said filter further comprises means for changing the rotation angle of said Faraday rotator by adjusting the magnetic flux density of said magnetic field; and the filter having its spectral transmission determined by said Faraday rotation angle and tunable by varying said Faraday rotation angle or switchable by switching said Faraday rotation angle in at least two alternative states, further tunable by rotating said exit polarizer (42) about said beam axis relative to said entrance polarizer (40), and functions as a one-direction device that transmits and tunably filters light in one direction, but blocks the backward light, with said exit polarizer fixed and oriented at 45° relative to said entrance polarizer.

2. The spectral filter of claim 1 is characterized in that said polarization rotator is a dispersive optical rotator, a quartz optical rotator, or a dispersive Faraday rotator, to which a magnetic field is applied, that has the rotation angle changeable by adjusting a magnetic flux density of said magnetic field.

3. The spectral filter of claim 1 is characterized in that said polarization element is a polarizer (32), used as an exit or entrance polarizer of said filter and having its azimuth P relative to the reference axis of said filter, said polarization rotator (31) and said polarizer (32) are arranged in said spectral filter along said light beam axis with said polarization rotator followed or preceded by said polarizer, and said tuner is a polarizer-tuner (33), which is equivalent to a polarizer having the azimuth equal to $P+\rho(\lambda)$ or $P-\rho(\lambda)$ varying as a function of light wavelength $\lambda$ over said wavelength range, and is operated by changing said azimuth P or/and rotation angle $\rho(\lambda)$ to change said azimuth $P+\rho(\lambda)$ or $P-\rho(\lambda)$ of said polarizer-tuner.

4. The spectral filter of claim 1 is characterized in that said polarization element is a retarder (34), having its retardation $\Delta$ equal or approximately equal to a predetermined value related to the structure of said spectral filter over said wavelength range, said polarization rotator (31) and retarder (34) are arranged in said spectral filter along said light beam axis with said retarder having its optic axis oriented at a predetermined angle $\phi$ related to the structure of said spectral filter in said filter, and said tuner is equivalent to a series connection of an equivalent optical rotator (36) of rotation angle $\rho(\lambda)$ and a retarder-tuner (35), which is equivalent to a retarder having its retardation equal to $\Delta$ and the orientation angle of its optic axis equal to $\phi+\rho(\lambda)$ or $\phi-\rho(\lambda)$ over said wavelength range, and operated by changing said orientation angle $\phi$ or/and said rotation angle $\rho(\lambda)$ to change said orientation angle $\phi+\rho(\lambda)$ or $\phi-\rho(\lambda)$ of said retarder-tuner or/and by changing said retardation $\Delta$.

5. The spectral filter of claim 4 is characterized in that said tuner further comprises a second dispersive polarization rotator (37) having its rotation angle $-\rho(\lambda)$ varying as a function of light wavelength $\lambda$ over said wavelength range, positioned on the opposite side of said retarder (34) from said rotator (31) of rotation angle $\rho(\lambda)$, said tuner is a retarder-tuner (35) equivalent to a retarder having its retardation equal to $\Delta$ and the orientation angle of its optic axis equal to $\phi+\rho(\lambda)$ or $\phi-\rho(\lambda)$ over said wavelength range, operated by changing said orientation angle $\phi$ or/and by simultaneously changing said rotation angles $\rho(\lambda)$ and $-\rho(\lambda)$ to change said orientation angle $\phi+\rho(\lambda)$ or $\phi-\rho(\lambda)$ of said retarder-tuner or/and by changing said retardation $\Delta$.

6. A spectral filter over a wavelength range comprising elements arranged in cascade along a light beam axis characterized by an entrance polarizer;

at least a dispersive polarization rotator with the rotation angle varying as a function of light wavelength over said wavelength range;

at least an orientation-sensitive polarization element; and means for rotating said orientation-sensitive polarization element(s) about said light beam axis or/and varying said rotation angle(s); whereby said polarization element or at least one of said polarization elements is a polarizer, said polarization rotator(s) and polarization element(s) are arranged behind said entrance polarizer along said beam axis to form tuner(s) such that said polarization element that is a polarizer works as the exit polarizer of said filter, and said filter has its spectral transmission determined by said rotation angle(s) and tunable by rotating said exit polarizer or/and the other(s) of said polarization element(s) about said beam axis and further tunable by varying said rotation angle(s);

the filter being an n-stage (n=2, 3, 4, . . .) spectral filter over said wavelength range comprising elements arranged in cascade along said light beam axis including an entrance polarizer ($49_1$);

n−1 intermediate polarizers ($49_2, 49_3, \ldots, 49_n$);

n dispersive polarization rotators ($50_1, 50_2, \ldots, 50_n$), which have their wavelength-dependent rotation angles in the ratios of integers, in the ratios of 1:2:4:8: . . . : $2^{n-1}$ disregarding the rotation sense over said wavelength range and are selected from optical rotators and Faraday rotators;

an exit polarizer ($49_{n+1}$);

means for rotating said exit polarizer and n−1 intermediate polarizers about said light beam axis; and whereby said n−1 intermediate polarizers ($49_2, 49_3, \ldots, 49_n$) and n polarization rotators ($50_1, 50_2, \ldots, 50_n$) are arranged between said entrance and exit polarizers ($49_1, 49_{n+1}$); along said light beam axis to form n stages in series, each containing a polarization rotator between polarizers, such that each of said intermediate polarizers $49_2, 49_3, \ldots, 49_n$) serves as the exit polarizer of one stage and the entrance polarizer of the following adjacent stage and such that the formed n stage exit polarizers ($49_2, 49_3, \ldots, 49_n, 49_{n+1}$) are oriented, each relative to its immediately preceding polarizer, with their azimuths in the same ratios as those of the rotation angles of the n polarization rotators ($50_1, 50_2, \ldots, 50_n$) which are immediately preceding said n stage exit polarizers, and said filter has its spectral transmission determined by said rotation angles and tunable by simultaneously rotating said n stage exit polarizers about said light beam axis with said ratios of their azimuths remaining unchanged or such that said n stage exit polarizers are parallel or perpendicular to said entrance polarizer and further tunable by simultaneously varying said rotation angles of said n polarization rotators with said ratios of said rotation angles remaining unchanged.

7. The spectral filter of claim 6 is characterized in that said polarization rotator(s) is or are dispersive optical rotator(s), quartz optical rotator(s), or Faraday rotator(s), to which magnetic field is or are applied, having the rotation angle(s) changeable by adjusting the magnetic flux density or densities of said magnetic field(s) and said polarization element (s) is or are polarizer(s), dichroic or birefringent polarizer(s), or retarder(s) selected from achromatic or zero-order birefringent retarders, equivalent liquid crystal electrically rotatable retarders, including FLC cells, SmA* cells, DHF liquid crystal cells, SSFLC cells, planar aligned smectic C* cells and ternary state antiferroelectric-effect LC cells, and variable retarders, including liquid crystal variable retarders such as nematic or homeotropically aligned smectic LC cells and phase modulators such as electro-optical, photo-elastic and magnetic modulators.

8. The spectral filter of claim 6 is characterized in that said filter is a single-stage spectral filter over said wavelength range comprising elements arranged in cascade along said light beam axis including an entrance polarizer (40);

a dispersive polarization rotator (41) with the rotation angle varying as a function of light wavelength over said wavelength range, selected from optical rotators and Faraday rotators;

an exit polarizer (42); and means for rotating said exit polarizer about said light beam axis;

whereby said polarization rotator (41) is sandwiched between said entrance and exit polarizers (40, 42) with the combination of said polarization rotator (41) and polarizer (42) equivalent to a polarizer-tuner and said filter has its spectral transmission determined by said rotation angle and tunable by rotating said exit polarizer about said beam axis relative to said entrance polarizer and further tunable by varying said rotation angle.

9. The single-stage filter of claim 8 is characterized in that said polarization rotator (41) is a dispersive optical rotator, a quartz optical rotator, and the spectral transmission of said filter is tunable by rotating said exit polarizer (42) about said beam axis relative to said entrance polarizer (40).

10. The single-stage filter of claim 8 is characterized in that said polarization rotator (41) is a dispersive Faraday rotator, to which a magnetic field is applied, having the rotation angle changeable by adjusting the magnetic flux density of said magnetic field, and said filter further comprises means for changing the rotation angle of said Faraday rotator by adjusting the magnetic flux density of said magnetic field.

11. The single-stage filter of claim 10 is characterized in that said filter has its spectral transmission determined by said Faraday rotation angle and tunable by varying said Faraday rotation angle or switchable by switching said Faraday rotation angle in at least two alternative states, further tunable by rotating said exit polarizer (42) about said beam axis relative to said entrance polarizer (40), and functions as a one-direction device that transmits and tunably filters light in one direction, but blocks the backward light, with said exit polarizer fixed and oriented at 45° relative to said entrance polarizer.

12. The single-stage filter of claim 8 is characterized in that said polarization rotator is a dispersive optical rotator (43), a quartz optical rotator, and said filter further comprises a rotatable half-wave retarder (44) having its retardation equal or approximately equal to 180° over said wavelength range, an equivalent achromatic or zero-order birefringent retarder or liquid crystal electrically rotatable retarder, positioned immediately behind or before said optical rotator (43).

13. The single-stage filter of claim 12 is characterized in that the combination of said optical rotator (43) and retarder (44) is equivalent to a tuner and said filter has its spectral transmission determined by said rotation angle of said optical rotator with and tunable by rotating said half-wave retarder about said light beam axis, mechanically or/and electrically, and further tunable by rotating said exit polarizer (42) relative to said entrance polarizer (40).

14. The single-stage filter of claim 8 is characterized in that said polarization rotator is a passive optical rotator (43), said filter further comprises an active polarization rotator (45) having its rotation angle adjustable over said wavelength range, positioned immediately before or behind said passive optical rotator (43), and means for changing the rotation angle of said active polarization rotator.

15. The single-stage filter of claim 14 is characterized in that the combination of said optical rotator (43), active polarization rotator (45) and polarizer (42) is equivalent to a polarizer-tuner and said filter has its spectral transmission tunable or switchable by changing said rotation angle of said active polarization rotator and further tunable by rotating said exit polarizer (42) relative to said entrance polarizer (42).

16. The single-stage filter of claim 15 is characterized in that said active polarization rotator (45) is a Faraday rotator, to which a magnetic field is applied, having the rotation angle changeable by adjusting the magnetic flux density of said magnetic field, or a liquid crystal polarization rotator, having the rotation angle continuously or discretely rotatable by application of a control voltage, a twisted-nematic liquid crystal polarization rotator, positioned immediately before said passive polarization rotator (43) and oriented with its entrance crystal axis parallel to the transmission axis of said entrance polarizer (40).

17. The single-stage filter of claim 8 is characterized in that said exit polarizer (42) is oriented parallel or perpendicular to said entrance polarizer (40) and said polarization rotator is a dispersive optical rotator (43), a quartz optical rotator, and said filter further comprises a second dispersive optical rotator (47), selected such that said second optical rotator and said initial optical rotator build up a pair of optical rotators having equal and opposite rotation angles over said wavelength range, a variable retarder (46) operated to work as a switchable retarder, having its retardation switchable between two alternative states such that said retarder has the retardation equal or approximately equal to zero in one of said states and 180° in the other, respectively, over said wavelength range, and means for operating said retarder with said retardation switchable in said states and rotating said retarder about said beam axis.

18. The single-stage filter of claim 17 is characterized in that said second optical rotator (47) and variable retarder (46) are arranged in series between said entrance and exit polarizers (40, 42) and positioned with said variable retarder (46) facing said initial optical rotator (43) and said filter has its spectral transmission determined by said rotation angles, with the combination of said optical rotator (43), variable retarder (46) and second optical rotator (47) equivalent to a retarder-tuner, and switchable by switching said retarder between said switched states and further tunable by rotating said retarder about said beam axis relative to said entrance polarizer.

19. The spectral filter of claim 6 is characterized in that said n polarization rotators ($50_1, 50_2, \ldots, 50_n$) are dispersive optical rotators with their wavelength-dependent rotation angles in said ratios of integers over said wavelength range and the spectral transmission of said filter is tunable by simultaneously rotating said n stage exit polarizers ($49_2, 49_3, \ldots, 49_{n+1}$) about said beam axis with said ratios of their azimuths remaining unchanged or such that said n stage exit polarizers are parallel or perpendicular to said entrance polarizer.

20. The spectral filter of claim 6 is characterized in that said n polarization rotators ($50_1, 50_2, \ldots, 50_n$) are dispersive Faraday rotators with their wavelength-dependent rotation angles in said ratios of integers over said wavelength range, to which magnetic fields are applied, respectively, and said filter further comprises means for changing said Faraday rotation angles by adjusting the magnetic flux densities of said magnetic fields.

21. The spectral filter of claim 20 is characterized in that said filter has its spectral transmission determined by said Faraday rotation angles and tunable by simultaneously varying said Faraday rotation angles or switchable by simultaneously switching said Faraday rotation angles in at least two alternative states such that said Faraday rotation angles have their said ratios remaining unchanged or said Faraday rotation angles are equal or approximately equal to zero over said wavelength range, further tunable by simultaneously rotating said n stage exit polarizers about said light beam axis with said ratios of their azimuths remaining unchanged or such that said n stage exit polarizers are parallel or perpendicular to said entrance filter, and functions as a one-direction device that transmits and tunably filters light in one direction, but blocks the backward light, with said n stage exit polarizers stationary and oriented such that the stage exit polarizer, which immediately follows the Faraday rotator of the smallest rotation angle among said n Faraday rotation angles, is oriented at 45° related to its immediately preceding polarizer and the rest n−1 stage exit polarizers are parallel or perpendicular to said entrance polarizer.

22. The spectral filter of claim 6 is characterized in that said n polarization rotators are dispersive optical rotators ($51_1$, $51_2$, . . . , $51_n$), quartz optical rotators, with their wavelength-dependent rotation angles in said ratios of integers over said wavelength range, said n stage exit polarizers ($49_2$, $49_3$, . . . , $49_{n+1}$) are oriented parallel or perpendicular to said entrance polarizer, and said spectral filter further comprises n rotatable half-wave retarders ($52_1$, $52_2$, . . . , $52_n$), each having its retardation equal or approximately equal to 180° over said wavelength range, positioned respectively immediately behind or before said arranged n optical rotators ($51_1$, $51_2$, . . . , $51_n$) such that each of said stages is oriented such that said n half-wave retarders are parallel to their immediately preceding polarizers, respectively, or have their orientation angles, each relative to its immediately preceding polarizer, in the same ratios as those of said rotation angles of said arranged n optical rotators.

23. The spectral filter of claim 22 is characterized in that said n retarders ($52_1$, $52_2$, . . . , $52_n$) are achromatic or zero-order birefringent retarders or equivalent liquid crystal electrically rotatable retarders oriented, each relative to its immediately preceding polarizer, such that their orientation angles in the same ratios as those of the rotation angles of said arranged n optical rotators ($51_1$, $51_2$, . . . , $51_n$) and the spectral transmission of said filter is determined by said rotation angles of said optical rotators and tunable by simultaneously rotating said n birefringent retarders or liquid crystal retarders about said light beam axis, mechanically or/and electrically, with said ratios of their said orientation angles remaining unchanged or such that said orientation angles are equal to zero and can further be tunable by simultaneously rotating said n stage exit polarizers with their azimuths, each relative to its immediately preceding polarizer, in said ratios of their immediately preceding optical rotation angles.

24. The spectral filter of claim 6 is characterized in that said n polarization rotators are dispersive optical rotators ($51_1$, $51_2$, . . . , $51_n$), typically quartz optical rotators, having their wavelength-dependent rotation angles in said ratios of integers over said wavelength range, said n stage exit polarizers ($49_2$, $49_3$, . . . , $49_{n+1}$) are stationary and oriented parallel or perpendicular to said entrance polarizer, and filter further comprises n active polarization rotators ($53_1$, $53_2$, . . . , $53_n$), which have their rotation angles adjustable over said wavelength and are positioned immediately before or behind said n passive optical rotators ($51_1$, $51_2$, . . . , $51_n$), respectively, the rotation angles of said arranged n active polarization rotators ($53_1$, $53_2$, . . . , $53_n$) are in the same ratios as those of their immediately following or preceding n optical rotators over said wavelength range, and means for changing the rotation angles of said n active polarization rotators, and said filter has its spectral transmission tunable or switchable by simultaneously changing said active rotation angles with said ratios of said active rotation angles remaining unchanged or equal or approximately equal to zero over said wavelength range and further tunable by simultaneously rotating said n stage exit polarizers ($49_2$, $49_3$, . . . , $49_{n+1}$) with their azimuths, each relative to its immediately preceding polarizer, in said ratios of their immediately preceding optical rotation angles.

25. The spectral filter of claim 24 is characterized in that said n active polarization rotators ($53_1$, $53_2$, . . . , $53_n$), are Faraday rotators, to which magnetic fields are respectively applied, having the rotation angles changeable by adjusting the magnetic flux densities of said magnetic fields, or equivalent liquid crystal polarization rotators, having their rotation angles continuously or discretely adjustable, positioned immediately before or behind said n optical rotators ($51_1$, $51_2$, . . . , $51_n$), respectively, such that said arranged n Faraday rotators or liquid crystal rotators have their rotation angles in the same ratios as those of their immediately following or preceding n optical rotators or equal or approximately equal to zero when being switched on or off over said wavelength range, and the spectral transmission of said filter is tunable or switchable by simultaneously adjusting said rotation angles of said Faraday rotators or liquid crystal rotators with said ratios of said rotation angles remaining unchanged or equal or approximately equal to zero over said wavelength range.

26. The spectral filter of claim 25 is characterized in that said n liquid crystal polarization rotators ($53_1$, $53_2$, . . . , $53_n$) are twisted-nematic liquid crystal polarization rotators, positioned respectively immediately before said n optical rotators ($51_1$, $51_2$, . . . , $51_n$) and oriented with the entrance crystal axis of each of said twisted-nematic rotators parallel to the transmission axis of its immediately preceding polarizer, said twisted-nematic rotators have their rotation angles equal or approximately equal to zero or in the same ratios as those of their immediately following n optical rotators over said wavelength range when said twisted-nematic rotators are switched on and off, respectively, and the spectral transmission of said filter is switchable by simultaneously switching said twisted-nematic liquid crystal polarization rotators on and off.

27. The spectral filter of claim 6 is characterized in that said formed n stage exit polarizers ($49_2$, $49_3$, . . . , $49_{n+1}$) are stationary and oriented parallel or perpendicular to said entrance polarizer ($49_1$) said n polarization rotators are dispersive optical rotators ($51_1$, $51_2$, . . . , $51_n$), typically quartz optical rotators, having their wavelength-dependent rotation angles in said ratios of integers over said wavelength range, and said filter further comprises another n dispersive optical rotators ($54_1$, $54_2$, . . . , $54_n$), selected such that said another n optical rotators ($54_1$, $54_2$, . . . , $54_n$), and said initial n optical rotators ($51_1$, $51_2$, . . . , $51_n$) build up n pairs of optical rotators, each having equal and opposite rotation angles over said wavelength range, and positioned such that each of said n stages contains a pair of optical rotators having equal and opposite rotation angles, n identical variable retarders ($55_1$, $55_2$, . . . , $55_n$), operated to work as switchable retarders, each having its retardation switchable between two alternative states such that its retardation is equal or approximately equal to zero in one of said states and 180° in the other, respectively, over said wavelength range, and positioned such that each of said n stages contains one of said retarders, sandwiched between the optical rotators of this stage, and means for switching said n retarders and rotating said n retarders about said beam axis.

28. The spectral filter of claim 27 is characterized in that said positioned n variable retarders ($55_1$, $55_2$, ..., $55_n$) are oriented parallel to said entrance polarizer or with their orientation angles, each relative to its immediately preceding polarizer, in the same ratios as those of the rotation angles of their immediately preceding optical rotators, and said filter has its spectral transmission determined by said rotation angles and switchable by simultaneously switching said n retarders ($55_1$, $55_2$, ..., $55_n$) in said switched states and further tunable by simultaneously rotating said n retarders about said beam axis with said ratios of said orientation angles remaining unchanged or such that each of said n retarders is parallel or perpendicular to its immediately preceding polarizer.

29. The spectral filter of claim 6 is characterized in that said filter is a two-tuner spectral filter comprising elements arranged in cascade along said light beam axis including an entrance polarizer (61);

a first polarization rotator (62), having its rotation angle $\rho_{s1}(\lambda)$ varying as a function of light wavelength $\lambda$;

a first retarder (63);

a second polarization rotator (64), having its rotation angle $\rho_{s2}(\lambda)$ varying as a function of light wavelength $\lambda$;

a second retarder (65);

a third polarization rotator (66), having its rotation angle $\rho_{s3}(\lambda)$ varying as a function of light wavelength $\lambda$;

an exit polarizer (67); and means for rotating said first and second retarders about said beam axis;

whereby said rotation angles $\rho_{s1}(\lambda)$, $\rho_{s2}(\lambda)$ and $\rho_{s3}(\lambda)$ are in the ratios of $\rho_{s1}(\lambda):\rho_{s2}(\lambda):\rho_{s3}(\lambda)=1:-2:1$ over said wavelength range, said first and second retarders (63, 65) are identical, having the retardation $\Delta$ equal or approximately equal to a predetermined value, selected between 80° and 115°, over said wavelength range, said entrance and exit polarizers are oriented parallel to each other, having their transmission axes at 45° relative to a selected reference axis, and said first polarization rotator (62), first retarder (63), second polarization rotator (64), second retarder (65) and third polarization rotator (66) are arranged in the recited order between said entrance and exit polarizers (61, 67), with said retarders (63, 65) oriented, having their optic axes symmetric about said reference axis, respectively at angles $\phi$ and $-\phi$ apart from, as viewed along said beam axis.

30. The spectral filter of claim 29 is characterized in that the combination of said rotators (62, 64, 66) and retarders (63, 65) is equivalent to a series connection of two retarder-tuners (68, 69) having identical retardation $\Delta$ and their orientation angles respectively equal to $-(\rho_{s1}(\lambda)+\phi)$ and $(\rho_{s1}(\lambda)+\phi)$ relative to said reference axis and said filter has its spectral transmission determined by said rotation angles, defined by Equation (24), and tunable by simultaneously rotating said retarders (63, 65) in opposite directions about said beam axis with their optic axes keeping symmetric about said reference axis and further tunable by simultaneously varying said rotation angles $\rho_{s1}(\lambda)$, $\rho_{s2}(\lambda)$ and $\rho_{s3}(\lambda)$ with their said ratios of 1:-2:1 remaining unchanged over said wavelength range, its spectral transmission equivalent to that of a Šolc type two-plate filter when said retarders (63, 65) have their retardation equal or approximately equal to 90° over said wavelength range, the bandwidth of its transmission peaks adjustable by simultaneously varying said retardation of said retarders in the range if from 80° to 115° over said wavelength range, and its spectral transmission inverted to work as a notch filter that tunably transmits and blocks light at wavelengths where said initial filter blocks and transmits light, respectively, when said exit polarizer (67) is rotated by 90° from said initial orientation to be perpendicular to said entrance polarizer (61).

31. The spectral filter of claim 29 is characterized in that said first, second and third polarization rotators (62, 64, 66) are dispersive optical rotators with their rotation angles in said ratios of 1:-2:1 over said wavelength range and said retarders (63, 65) are equivalent birefringent retarders or liquid crystal electrically rotatable retarders with their optic axes oriented symmetric about said reference axis, and said filter has its spectral transmission tunable by simultaneously rotating said birefringent retarders or liquid crystal retarders, mechanically or/and electrically, in opposite directions about said beam axis with their optic axes keeping symmetric about said reference axis or such that said birefringent retarders or liquid crystal retarders are parallel to said entrance polarizer (61).

32. The spectral filter of claim 29 is characterized in that said first, second and third polarization rotators (62, 64, 66) are dispersive Faraday rotators, to which magnetic fields are respectively applied, having their rotation angles in said ratios of 1:-2:1 over said wavelength range and said retarders (63, 65) are equivalent birefringent retarders with their optic axes oriented symmetric about said reference axis, respectively at angles $\phi$ and $-\phi$ apart from, as viewed along said beam axis, and said filter further comprises means for varying said Faraday rotation angles by adjusting the magnetic flux densities of said magnetic fields.

33. The spectral filter of claim 32, is characterized in that said filter has its spectral transmission tunable or switchable by simultaneously varying said Faraday rotation angles or switching said Faraday rotation angles in at least two alternative states with said ratios of 1:-2:1 of said Faraday rotation angles remaining unchanged over said wavelength range and functions as a one-direction device that transmits and tunably filters light in one direction, but blocks the backward light, with said birefringent retarders having their retardation equal or approximately equal to 99.8° over said wavelength range and oriented with their optic axes at $\phi=22.5°$ and $-\phi=-22.5°$ relative to said reference axis, respectively.

34. The spectral filter of claim 29 is characterized in that said first, second and third polarization rotators (62, 64, 66) are equivalent dispersive optical rotators and said retarders (63, 65) are variable retarders oriented with their optic axes symmetric about said reference axis, each having its retardation variable in the range from 80° to 115° or/and switchable in at least two alternative states such that said variable retarders have their retardation equal or approximately equal to 0° in one of said switched states and equal or approximately equal to value(s), selected between 80° and 115°, in the other state(s) over said wavelength range.

35. The spectral filter of claim 34 is characterized in that said filter has the bandwidth of its spectral transmission peaks adjustable by simultaneously varying said retardation of said variable retarders (63, 65), and its spectral transmission tunable by simultaneously rotating said variable retarders in opposite directions with their optic axes keeping symmetric about said reference axis and switchable by simultaneously switching said variable retarders (63, 65) with their said retardation switched in said states.

36. The spectral filter of claim 6 is characterized in that said filter is a three-tuner spectral filter comprising elements arranged in cascade along said light beam axis including
- an entrance polarizer (71);
- a first polarization rotator (72), having its rotation angle $\rho_{11}(\lambda)$ varying as a function of light wavelength $\lambda$;
- a first quarter-wave retarder (73);
- a second polarization rotator (74), having its rotation angle $\rho_{12}(\lambda)$ varying as a function of light wavelength $\lambda$;
- a second quarter-wave retarder (75);
- a third polarization rotator (76), having its rotation angle $\rho_{13}(\lambda)$ varying as a function of light wavelength $\lambda$;
- an exit polarizer (77); and
- means for rotating said retarders and said exit polarizer about said light beam axis;

said rotation angles $\rho_{11}(\lambda)$, $\rho_{12}(\lambda)$ and $\rho_{13}(\lambda)$ are in the ratios of $\rho_{11}(\lambda) : \rho_{12}(\lambda) : \rho_{13}(\lambda) = 1:1:-1$ over said wavelength range, said first and second quarter-wave retarders (73, 75) are achromatic or zero-order retarders, having the retardation equal or approximately equal to 90° over said wavelength range, and said first polarization rotator (72), first quarter-wave retarder (73), second polarization rotator (74), second quarterwave retarder (75) and third polarization rotator (76) are arranged in the recited order between said entrance and exit polarizers (71, 77), with said first and second quarter-wave retarder (73, 75) and said exit polarizer (77) oriented such that the orientation angles $\rho_1$ and $\rho_2$ of said first and second retarders (73, 75) and the azimuth $P_2$ of said exit polarizer (77), relative to said entrance polarizer (71), are in the ratios of $\phi_1:\phi_2:P_2=1:2:1$.

37. The spectral filter of claim 36 is characterized in that the combination of said rotators (72, 74, 76), retarders (73, 75) and exit polarizer (77) is equivalent to a series connection of two retarder-tuners (78, 79) and a polarizer-tuner (80) with said retarder-tuners having identical retardation equal or approximately equal to 90° and their orientation angles respectively equal to $-(\rho_{11}(\lambda)+\phi_1)$ and $(2\rho_{11}(\lambda)+P_2$, and said polarizer-tuner having its azimuth equal to $\rho_{11}(\lambda)+P_2$, and said filter has its spectral transmission determined by said rotation angles, equivalent to that of a Lyot two-stage filter, and tunable by simultaneously rotating said first and second quarter-wave retarders (73, 75) and exit polarizer (77) about said light beam axis with said ratios of 1:2:1 of their orientation angles and azimuth remaining unchanged or such that said first and second quarter-wave retarders (73, 75) and exit polarizer (77) are parallel to said entrance polarizer, and its spectral transmission inverted to work as a notch filter that tunably transmits and blocks light at wavelengths where said initial filter blocks and transmits light, respectively, when said exit polarizer (77) is oriented such that the orientation angles of said first and second retarders (73, 75) relative to said entrance polarizer (71) and the azimuth of said exit polarizer (77) relative to an axis perpendicular to said entrance polarizer (71) are in said ratios of 1:2:1.

38. The spectral filter of claim 36 is characterized in that said first, second and third polarization rotators (72, 74, 76) are dispersive optical rotators with their rotation angles in said ratios of 1:1:-1 over said wavelength range, and said first and second quarter-wave retarders (73, 75) are equivalent birefringent retarders, oriented with their orientation angles and the azimuth of said exit polarizer (77), relative to said entrance polarizer (71), in said ratios of 1:2:1, and said filter has its spectral transmission tunable by simultaneously rotating said birefringent retarders (73, 75) and exit polarizer (77) about said light beam axis with their said ratios of 1:2:1 of their said orientation angles and azimuth remaining unchanged.

39. The spectral filter of claim 36 is characterized in that said first, second and third polarization rotators (72, 74, 76) are dispersive Faraday rotators with their rotation angles in said ratios of 1:1:-1 over said wavelength range, to which magnetic fields are applied, respectively, and said first and second quarter-wave retarders (73, 75) are equivalent birefringent retarders, oriented with their orientation angles and the azimuth of said exit polarizer (77), relative to said entrance polarizer (71), in said ratios of 1:2:1 and said filter further comprises means for electrically changing said Faraday rotation angles by adjusting the magnetic flux densities of said magnetic fields.

40. The spectral filter of claim 36 is characterized in that said filter has its spectral transmission tunable by simultaneously changing said Faraday rotation angles with their said ratios of 1:1:-1 remaining unchanged and further tunable by simultaneously rotating said first and second birefringent retarders (73, 75) and exit polarizer (77) about said light beam axis with said ratios of 1:2:1 of their said orientation angles and azimuth remaining unchanged or such that said birefringent retarders (73, 75) and exit polarizer (77) are parallel to said entrance polarizer (71) and functions as a one-direction device that transmits and tunably filters light in one direction, but blocks the backward light, with said birefringent retarders (73, 75) and said exit polarizer (77) stationary and oriented relative to said entrance polarizer (71) at 45°, 90° and 45°, respectively.

41. The spectral filter of claim 36 is characterized in that said first, second and third polarization rotators (72, 74, 76) are dispersive optical rotators with their rotation angles in said ratios of 1:1:-1 over said wavelength range and said exit polarizer (77) is stationary and oriented parallel or perpendicular to said entrance polarizer, and said filter further comprises a rotatable half-wave retarder (81), having its retardation equal or approximately equal to 180° over said wavelength range, positioned between said third polarization rotator (76) and said exit polarizer (77) and oriented at angle $\phi_3$ relative to said entrance polarizer (71) such that said first and second quarter-wave retarders (73, 75) and said half-wave retarder (81) are parallel to said entrance polarizer or have their orientation angles $\phi_1$, $\phi_2$ and $\phi_3$ in the ratios of $\phi_1:\phi_2:\phi_3=2:4:1$.

42. The spectral filter of claim 41 is characterized in that said filter has its spectral transmission equivalent to that of a Lyot two-stage filter and tunable by simultaneously rotating said, quarter-wave retarders (73, 75) and said half-wave retarder (81) about said light beam axis with said ratios of 2:4:1 of their said orientation angles remaining unchanged or such that said quarter-wave retarders (73, 75) and said half-wave retarder (81) are parallel to said entrance polarizer (71), and said quarter-wave retarders (73, 75) and said half-wave retarder (81) are equivalent achromatic and zero-order birefringent retarders or liquid crystal electrically rotatable retarders.

43. The spectral filter of claim 6 is characterized in that said filter is a three-tuner spectral filter comprising elements arranged in cascade along said light beam axis including
- an entrance polarizer (82);
- a first polarization rotator (83), having its rotation angle $\rho_{p1}(\lambda)$ varying as a function of light wavelength $\lambda$;
- a first retarder (84);

a second polarization rotator (85), having its rotation angle $\rho_{p2}(\lambda)$ varying as a function of light wavelength $\lambda$;

a second retarder (86);

a third polarization rotator (87), having its rotation angle $\rho_{p3}(\lambda)$ varying as a function of light wavelength $\lambda$;

a third retarder (88);

a fourth polarization rotator (89), having its rotation angle $\rho_{p4}(\lambda)$ varying as a function of light wavelength $\lambda$;

an exit polarizer (90); and means for rotating said first, second and third retarders about said beam axis;

said rotation angles $\rho_{p1}(\lambda), \rho_{p2}(\lambda), \rho_{p3}(\lambda)$ and $\rho_{p4}(\lambda)$ are in the ratios of $\rho_{p1}(\lambda):\rho_{p2}(\lambda):\rho_{p3}(\lambda):\rho_{p4}(\lambda)=1:-2:2:-1$ over said wavelength range, said first and third retarders (84, 88) are identical, having the retardation $\Delta$ equal or approximately equal to a predetermined value selected between 60° and 100° over said wavelength range, said second retarder (86) is a half-wave retarder, having its retardation equal or approximately equal to 180° over said wavelength range, and said first polarization rotator (83), first retarder (84), second polarization rotator (85), second retarder (86), third polarization rotator (87), third retarder (88) and fourth polarization rotator (89) are arranged in the recited order between said entrance and exit polarizers (82, 90) and oriented such that said entrance polarizer (82) is parallel or at 45° relative to a selected reference axis, said exit polarizer (90) is perpendicular to said entrance polarizer (82), and said first and third retarders (84, 88) are parallel to each other and their optic axes and the optic axis of said second retarder (86) are at the opposite side of said reference axis, respectively at angles $-\phi$ and $\phi+45°$ apart from, as viewed along said beam axis.

44. The spectral filter of claim 43 is characterized in that the combination of said rotators (83, 85, 87, 89) and retarders (84, 86, 88) is equivalent to a series connection of three retarder-tuners (91, 92, 93) with the first and third ones (91, 93) having identical retardation equal to $\Delta$ and parallel oriented at angle of $-(\rho_{p1}(\lambda)+\phi)$, and the central one (92) having the retardation equal or approximately equal to 180° and orientation angle $\rho_{p1}(\lambda)+\phi+45°$ and said filter has its spectral transmission determined by said rotation angles and defined by Equation (31A) or (31b) and tunable by simultaneously rotating said first, second and third retarders (84, 86, 88) about said beam axis in the same speed with said first and third retarders (84, 88) synchronously in one direction and said second retarder (86) in the opposite direction to change said angle $\phi$, and further tunable by simultaneously varying said rotation angles $\rho_{p1}(\lambda), \rho_{p2}(\lambda), \rho_{p3}(\lambda)$ and $\rho_{p4}(\lambda)$ with their said ratios of 1:−2:2:−1 remaining unchanged over said wavelength range, its spectral transmission equivalent to that of a Šolc type three-plate filter or a Lyot two-stage filter when said predetermined value for the retardation of said first and third retarders (84, 88) is 75.52° or 90°, the bandwidth of its spectral transmission peaks adjustable by simultaneously varying said retardation of said first and third retarders (84, 88) in the range from 60° to 100° over said wavelength range, and its spectral transmission inverted to work as a notch filter that tunably transmits and blocks light at wavelengths where said initial filter blocks and transmits light, respectively, when said exit polarizer (90) is rotated by 90° from said initial orientation to be parallel to said entrance polarizer (82).

45. The spectral filter of claim 43 is characterized in that said first, second, third and fourth polarization rotators (83, 85, 87, 89) are dispersive optical rotators with their rotation angles in said ratios of 1:−2:2:−1 over said wavelength range and said first, second and third retarders (84, 86, 88) are equivalent birefringent retarders or liquid crystal electrically rotatable retarders with their optic axes oriented relative to said reference axis at $-\phi$, $\phi+45°$ and $-\phi$, respectively, and said filter has its spectral transmission tunable by simultaneously rotating said birefringent retarders or liquid crystal retarders, mechanically or/and electrically, about said beam axis to change said angle $\phi$ with the relationship of their orientation angles $-\phi$, $\phi+45°$ and $-\phi$ remaining unchanged.

46. The spectral filter of claim 43 is characterized in that said first, second, third and fourth polarization rotators (83, 85, 87, 89) are dispersive Faraday rotators, to which magnetic fields are respectively applied, having their rotation angles in said ratios of 1:−2:2:−1 over said wavelength range, and said first, second and third retarders (84, 86, 88) are equivalent birefringent retarders with their optic axes oriented relative to said reference axis at $-\phi$, $\phi+45°$ and $-\phi$, respectively, and said filter further comprises means for varying said Faraday rotation angles by adjusting the magnetic flux densities of said magnetic fields.

47. The spectral filter of claim 46 is characterized in that said filter has its spectral transmission tunable or switchable by simultaneously varying said Faraday rotation angles or switching said Faraday rotation angles in at least two alternative states with said ratios of 1:−2:2:−1 of said Faraday rotation angles remaining unchanged and functions as a one-direction device that transmits and tunably filters light in one direction, but blocks the backward light, with said birefringent retarders stationary and oriented relative to said reference axis such that their optic axes are at $-\phi=-22.5°$, $\phi+45°=67.5°$ and $-\phi=-22.5°$, respectively, and said birefringent retarders at $-\phi=-22.5°$ having their retardation $\Delta$ equal or approximately equal to 70.5° over said wavelength range.

48. The spectral filter of claim 43 is characterized in that said first, second, third and fourth polarization rotators (83, 85, 87, 89) are equivalent dispersive optical rotators and said first and third retarders (84, 88) are variable retarders with their optic axes oriented parallel at $-\phi$ relative to said reference axis, each having the retardation $\Delta$ variable in the range from 60° to 100° and said third retarder (86) is a birefringent half-wave retarder oriented at $\phi+45°$ relative to said reference axis, and said filter has the bandwidth of its spectral transmission peaks adjustable by simultaneously varying said retardation $\Delta$ of variable retarders and its spectral transmission tunable by simultaneously rotating said variable retarders and said half-wave retarder in the saws speed with said variable retarders synchronously in one direction and said half-wave retarder in the opposite direction to change said angle $\phi$.

49. The spectral filter of claim 43 is characterized in that said first, second, third and fourth polarization rotators (83, 85, 87, 89) are equivalent dispersive optical rotators and said first and third retarders (84, 86, 88) are variable retarders oriented relative to said reference axis with their optic axes at $-\phi$, $\phi+45°$ and $-\phi$, respectively, which are operated to have their the retardation switchable in at least two alternative states such that in one of said switched states said variable retarders have their retardation equal or approximately equal to 0° and in the other state(s) said variable retarders at $-\phi$ have their retardation valued in the range from 60° to 100°, and said variable retarder at $\phi+45°$ has its retardation equal or approximately equal to 180° over said wavelength range.

50. The spectral filter of claim 49 is characterized in that said filter has its spectral transmission switchable by simultaneously switching said variable retarders with their said retardation switched in said switched states, the bandwidth of its spectral transmission peaks adjustable by simultaneously varying said retardation of said variable retarders at $-\phi$ with said variable retarder at $\phi+45°$ operated to have the retardation equal or approximately equal to 180° over said wavelength range, and its spectral transmission tunable by simultaneously rotating said variable retarders about said beam axis in the same speed with said variable retarders at $-\phi$ synchronously in one direction and said variable retarder at $\phi+45°$ in the opposite direction to change the angle $\phi$.

51. The spectral filter of claim 6 is characterized in that said filter is a three-tuner spectral filter comprising elements arranged in cascade along said light beam axis including
   an entrance polarizer (94);
   a first polarization rotator (95), having its rotation angle $\rho_{b1}(\lambda)$ varying as a function of light wavelength $\lambda$;
   a first retarder (96)
   a second polarization rotator (97), having its rotation angle $\rho_{b2}(\lambda)$ varying as a function of light wavelength $\lambda$;
   a second retarder (98);
   a third polarization rotator (99), having its rotation angle $\rho_{b3}(\lambda)$ varying as a function of light wavelength $\lambda$;
   a third retarder (100);
   a fourth polarization rotator (101), having its rotation angle $\rho_{b4}(\lambda)$ varying as a function of light wavelength $\lambda$;
   an exit polarizer (102); and
   means for rotating said retarders (96, 98, 100) about said beam axis;
   said rotation angles $\rho_{b1}(\lambda), \rho_{b2}(\lambda), \rho_{b3}(\lambda)$ and $\rho_{b4}(\lambda)$ are in the ratios of $\rho_{b1}(\lambda):\rho_{b2}(\lambda):\rho_{b3}(\lambda)\ \rho_{b4}(\lambda)=3:-4:4:-3$ over said wavelength range, said first, second and third retarders (96, 98, 100) have their retardation $\Delta_1$, $\Delta_2$ and $\Delta_3$ valued such that the conditions $30°\leq\Delta_1=\Delta_3\leq50°$ and $170°\leq2\Delta_1+_2\leq220°$ are satisfied over said wavelength range, and said first polarization rotator (95), first retarder (96), second polarization rotator (97), second retarder (98), third polarization rotator (99), third retarder (100) and fourth polarization rotator (101) are arranged in the recited order between said entrance and exit polarizers (94, 102) and oriented such that said entrance and exit polarizers (94, 102) are perpendicular to each other and the orientation angles of said first, second and third retarders (96, 98, 100) relative to said entrance polarizer (94) are $3\phi$, $-\phi$, and $3\phi$, respectively, and in the ratios of $3\phi:-\phi:3\phi=3:-1:3$.

52. The spectral filter of claim 51 is characterized in that the combination of said polarization rotators (95, 97, 99, 101) and retarders (96, 98, 100) is equivalent to a series connection of three retarder-tuners (103, 104, 105) with the first and third ones (103, 105) having identical retardation equal to $\Delta_1$ and parallel oriented at angle of $3(\rho_{b1}(\lambda)+\phi)$ and the central one (104) having the retardation equal to $\Delta_2$ and orientation angle $-(\rho_{b1}(\lambda)+\phi)$ and said filter has
   its spectral transmission determined by said rotation angles and defined by Equation (36a) or (36b) and tunable by simultaneously rotating said first, second and third retarders (96, 98, 100) about said beam axis with said first and third retarders (96, 100) synchronously in one direction and said second retarder (98) in the opposite direction to change their said orientation angles with said ratios of $3:-1:3$ remaining unchanged or such that said first, second and third retarders (96, 98, 100) are parallel to said entrance polarizer, and further tunable by simultaneously varying said rotation angles $\rho_{b1}(\lambda), \rho_{b2}(\lambda), \rho_{b3}(\lambda)$ and $\rho_{b4}(\lambda)$ with said their ratios of
   $3:-4:4:-3$ remaining unchanged over said wavelength range,
   its spectral transmission of square-waveform or approximate square-waveform with said retardation $\Delta_1$, $\Delta_2$ and $\Delta_3$ valued such that $30°\leq\Delta_1=\Delta_3\leq50°$ and $170°\leq2\Delta_1=\Delta_2\leq220°$,
   the slope of its maximum transmission peaks and the secondary maximum adjustable by simultaneously varying said retardation $\Delta_1$, $\Delta_2$ and $\Delta_3$, with the conditions $30°\leq\Delta_1=\Delta_3\leq50°$ and $170°\leq2\Delta_1+\Delta_2\leq220°$ maintained, and its spectral transmission inverted to work as a notch filter that tunably transmits and blocks light at wavelengths where said initial filter blocks and transmits light, respectively, when said exit polarizer (102) is rotated by 90° from said initial orientation to be parallel to said entrance polarizer (94).

53. The spectral filter of claim 51 is characterized in that said first, second, third and fourth polarization rotators (95, 97, 99, 101) are dispersive optical rotators with. their rotation angles in said ratios of $3:-4:4:-3$ over said wavelength range and said first, second and third retarders (96, 98, 100) are equivalent birefringent retarders or liquid crystal electrically rotatable retarders, oriented such that their orientation angles relative to said entrance polarizer are in said ratios of $3:-1:3$, and said filter is tunable by simultaneously rotating said birefringent retarders or liquid crystal retarders, mechanically or/and electrically, about said beam axis, with said ratios of $3:-1:3$ of their said orientation angles remaining unchanged or such that said birefringent retarders or liquid crystal retarders are parallel to said entrance polarizer (94).

54. The spectral filter of claim 51 is characterized in that said first, second, third and fourth polarization rotators (95, 97, 99, 101) are dispersive Faraday rotators, to which magnetic fields are respectively applied, having their rotation angles in said ratios of $3:-1:3$ over said wavelength range and said first, second and third retarders (96, 98, 100) are equivalent birefringent retarders with their optic axes oriented such that their orientation angles relative to said entrance polarizer (94) are in said ratios of $3:-1:3$, and said filter further comprises means for varying said Faraday rotation angles by adjusting the magnetic flux densities of said magnetic field.

55. The spectral filter of claim 54 is characterized in that said filter has its spectral transmission tunable or switchable by simultaneously varying said Faraday rotation angles or switching said Faraday rotation angles in at least two alternative states with said ratios of $3:-4:4:-3$ said Faraday rotation angles remaining unchanged over said wavelength range, and functions as a one-direction device that transmits and tunably filters light in one direction, but blocks the backward light, with said birefringent retarders stationary and oriented relative to said entrance polarizer (94) such that their optic axes are at $3\phi=67.5°$, $-\phi=-22.5°$ and $3\phi=67.5°$, respectively, and said retardation $\Delta_1$ and $\Delta_3$ equal or approximately equal to 38.4° and said retardation $\Delta_2$ equal or approximately equal to 108.2° over said wavelength range.

56. The spectral filter of claim 51 is characterized in that said first, second, third and fourth polarization rotators (95,

97, 99, 101) are equivalent dispersive optical rotators and said first, second and third retarders (96, 98, 100) are variable retarders, which are oriented relative to said entrance polarizer with the orientation angles of their optic axes in said ratios of 3:−1:3 and operated to have their retardation switchable in at least two alternative states such that in one of said switched states said variable retarders have their retardation equal or approximately equal to 0° and in the other state(s) the variable retarders have their retardation valued to satisfy said conditions for the retardation over said wavelength range.

57. The spectral filter of claim 56 is characterized in that said filter has its spectral transmission switchable by simultaneously switching said variable retarders with their said retardation switched in said switched states, the slope of its maximum transmission peaks and the secondary maximum adjustable by simultaneously varying said retardation of said variable retarders with said conditions remaining satisfied, and its spectral transmission tunable by simultaneously rotating said variable retarders about said beam axis with said ratios of 3:−1:3 of their orientation angles remaining unchanged.

58. A method for wavelength-tunably filtering light over a wavelength range, comprising the steps of:

providing a spectral filter over a wavelength range comprising elements arranged in cascade along a light beam axis characterized by an entrance polarizer;

at least a dispersive polarization rotator with the rotation angle varying as a function of light wavelength over said wavelength range;

at least an orientation-sensitive polarization element; and means for rotating said orientation-sensitive polarization element(s) about said light beam axis or and varying said rotation angle(s); whereby said polarization element or at least one of said polarization elements is a polarizer, said polarization rotator(s) and polarization element(s) are arranged behind said entrance polarizer along said beam axis to form tuner(s) such that said polarization element that is a polarizer works as the exit polarizer of said filter, and said filter has its spectral transmission determined by said rotation angle(s) and tunable by rotating said exit polarizer or/and the other(s) of said polarization element(s) about said beam axis and further tunable by varying said rotation angle(s);

the filter being an n-stage (n=2, 3, ... ) spectral filter over said wavelength range comprising elements arranged in cascade along said light beam axis including an entrance polarizer ($49_1$);

n−1 intermediate polarizers ($49_2, 49_3, \ldots, 49_n$);

n dispersive polarization rotators ($50_1, 50_2, \ldots, 50_n$), which have their wavelength-dependent rotation angles in the ratios of integers, in the ratios of $1:2:4:8:\ldots:2^{n-1}$ disregarding the rotation sense over said wavelength range and are selected from optical rotators and Faraday rotators;

an exit polarizer ($49_{n+1}$);

means for rotating said exit polarizer and n−1 intermediate polarizers about said light beam axis; and whereby said n−1 intermediate polarizers ($49_2, 49_3, \ldots, 49_n$) and n polarization rotators ($50_1, 50_2, \ldots, 50_n$) are arranged between said entrance and exit polarizers ($49_2, 49_{n+1}$); along said light beam axis to form n stages in series, each containing a polarization rotator between polarizers, such that each of said intermediate polarizers ($49_2, 49_3, \ldots, 49_n$) serves as the exit polarizer of one stage and the entrance polarizer of the following adjacent stage and such that the formed n stage exit polarizers ($49_2, 49_3, \ldots, 49_n, 49_{n+1}$) are oriented, each relative to its immediately preceding polarizer, with their azimuths in the same ratios as those of the rotation angles of the n polarization rotators ($50_1, 50_2, \ldots, 50_n$), which are immediately preceding said n stage exit polarizers, and said filter has its spectral transmission determined by said rotation angles and tunable by simultaneously rotating said n stage exit polarizers about said light beam axis with said ratios of their azimuths remaining unchanged or such that said n stage exit polarizers are parallel or perpendicular to said entrance polarizer and further tunable by simultaneously varying said rotation angles of said n polarization rotators with said ratios of said rotation angles remaining unchanged;

providing a spectral filter comprising an entrance polarizer, at least a dispersive polarization rotator and at least an orientation-sensitive polarization element; and tuning said spectral filter by rotating said polarization element(s) or/and by varying the rotation angle(s) of said polarization rotator(s).

59. The method of claim 58 is characterized in that said filter is a single-stage spectral filter, comprising an entrance polarizer, a rotatable exit polarizer, and a dispersive polarization rotator, and said method comprises the step of tuning said single-stage filter by rotating said exit polarizer relative to said entrance polarizer or/and by varying the rotation angle of said dispersive polarization rotator.

60. The method of claim 59 is characterized in that said single-stage filter is modified to further comprise a rotatable half-wave retarder or an active polarization rotator, and said method further comprises the step of tuning said filter by rotating said retarder or varying the rotation angle of said active polarization rotator.

61. The method of claim 59 is characterized in that said single-stage filter is modified to further comprise a second dispersive polarization rotator and a variable retarder having its retardation switchable between two alternative states; and said method further comprises the step of tuning said filter by switching said retarder in said switched states.

62. The method of claim 58 is characterized in that said filter is an n-stage (n=2, 3, 4, ... .) spectral filter, the n-stage spectral filter comprising an entrance polarizer, n rotatable polarizers, and n dispersive polarization rotators with said entrance polarizer, n rotatable polarizers and n polarization rotators arranged and said n rotatable polarizers is oriented, said method comprising the step of tuning said n-stage filter by simultaneously rotating said n rotatable polarizers with the ratios of their azimuths remaining unchanged or so that said n rotatable polarizers are parallel or perpendicular to said entrance polarizer and further by simultaneously varying said rotation angles of said n polarization rotators with the ratios of their rotation angles remaining unchanged.

63. The method of claim 62 is characterized in that said n-stage filter is modified to further comprise n rotatable half-wave retarders or n active polarization rotators, and said method further comprises the step tuning said n-stage filter by simultaneously rotating said n half-wave retarders with the ratios of their orientation angles remaining unchanged or such that said orientation angles are equal to zero or by simultaneously varying the rotation angles of said n active polarization rotators with their ratios remaining unchanged or equal or approximately equal to zero over said wavelength range.

64. The method of claim 62 is characterized in that said n-stage filter is modified to further comprise another n dispersive polarization rotators and n identical variable retarders, each having its retardation switchable between two alternative states, and said method further comprises the step of tuning said filter by simultaneously switching said n variable retarders in said switched states or/and by simultaneously rotating said n retarders with the ratios of their said orientation angles remaining unchanged or such that each of said n retarders is parallel to its immediately preceding polarizer.

65. The method of claim 58 wherein said method comprises tuning said filter by simultaneously rotating said retarders or said retarders and exit polarizer with the ratios of their orientation angles remaining unchanged or/and by simultaneously varying the rotation angles of said polarization rotators with the ratios of said rotation angles remaining unchanged over said wavelength range or/and adjusting the transmission profile of said filter by varying the retardation of said retarders in a predetermined range.

* * * * *